(12) United States Patent
Lou et al.

(10) Patent No.: US 11,153,908 B2
(45) Date of Patent: *Oct. 19, 2021

(54) ENHANCEMENTS FOR RESOURCE ALLOCATION IN WLAN SYSTEMS

(71) Applicant: InterDigital Patent Holdings, Inc., Wilmington, DE (US)

(72) Inventors: Hanqing Lou, Syosset, NY (US);
Guodong Zhang, Woodbury, NY (US);
Xiaofei Wang, Cedar Grove, NJ (US);
Juan Fang, Portland, OR (US);
Oghenekome Oteri, San Diego, CA (US); Pengfei Xia, San Diego, CA (US); Monisha Ghosh, Chicago, IL (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/596,365

(22) Filed: Oct. 8, 2019

(65) Prior Publication Data

US 2020/0053783 A1    Feb. 13, 2020

Related U.S. Application Data

(63) Continuation of application No. 15/948,869, filed on Apr. 9, 2018, now Pat. No. 10,440,750, which is a (Continued)

(51) Int. Cl.
*H04W 4/00* (2018.01)
*H04W 74/08* (2009.01)
(Continued)

(52) U.S. Cl.
CPC ....... *H04W 74/0816* (2013.01); *H04L 1/0003* (2013.01); *H04L 1/0026* (2013.01);
(Continued)

(58) Field of Classification Search
None
See application file for complete search history.

(56) References Cited

U.S. PATENT DOCUMENTS 8,989,161 B2    3/2015   Kim et al.
9,113,313 B2    8/2015   Cheong et al.
(Continued)

FOREIGN PATENT DOCUMENTS

CN    101656644 A    2/2010
WO    2012/028034 A1    3/2012

OTHER PUBLICATIONS

Breit et al., "IEEE P802.11 Wireless LANs: TGac Channel Model Addendum," IEEE 802.11-09/0308r5 (May 2009).
(Continued)

*Primary Examiner* — Elisabeth Benoit Magloire
(74) *Attorney, Agent, or Firm* — Volpe Koenig

(57) ABSTRACT

A STA may comprise a receiver configured to receive an MU RTS frame transmitted to a plurality of STAs. The MU RTS frame may indicate, in a duration field, a duration of one or more frames to follow. The STA may further comprise a transmitter configured to transmit a CTS frame in response to receiving the MU RTS frame. Another frame comprising UL transmission information may be received by the STA which includes MCS indicators and allocates frequency resources for the plurality of STAs. A data frame may be modulated in accordance with an MCS indicator of the MCS indicators, and may be transmitted on frequency resources of the frequency resources allocated for the plurality of STAs.
(Continued)

An acknowledgement frame, which acknowledges receipt of the data frame, may be received.

20 Claims, 31 Drawing Sheets

Related U.S. Application Data continuation of application No. 15/026,666, filed as application No. PCT/US2014/058633 on Oct. 1, 2014, now abandoned.

(60) Provisional application No. 61/979,099, filed on Apr. 14, 2014, provisional application No. 61/885,400, filed on Oct. 1, 2013.

(51) Int. Cl.
| | |
|---|---|
| *H04L 1/00* | (2006.01) |
| *H04L 1/16* | (2006.01) |
| *H04L 1/18* | (2006.01) |
| *H04L 5/00* | (2006.01) |
| *H04W 72/04* | (2009.01) |
| *H04W 84/12* | (2009.01) |

(52) U.S. Cl.
CPC .............. *H04L 1/16* (2013.01); *H04L 1/1664* (2013.01); *H04L 1/1685* (2013.01); *H04L 1/1887* (2013.01); *H04L 5/0055* (2013.01); *H04W 72/0453* (2013.01); *H04L 1/1671* (2013.01); *H04W 84/12* (2013.01)

(56) References Cited

U.S. PATENT DOCUMENTS

| | | | |
|---|---|---|---|
| 9,173,234 B2 | 10/2015 | Merlin et al. | |
| 9,338,789 B2 | 5/2016 | Wang et al. | |
| 9,363,753 B2 | 6/2016 | Damnjanovic et al. | |
| 2005/0141448 A1 | 6/2005 | Bolinth et al. | |
| 2005/0151448 A1 | 6/2005 | Bolinth et al. | |
| 2007/0171933 A1* | 7/2007 | Sammour | H04L 67/12 370/447 |
| 2007/0211620 A1 | 9/2007 | McBeath et al. | |
| 2007/0291674 A1 | 12/2007 | Cheng et al. | |
| 2009/0238095 A1 | 9/2009 | Blackwell et al. | |
| 2010/0080173 A1* | 4/2010 | Takagi | H04L 27/0006 370/328 |
| 2010/0260138 A1 | 10/2010 | Liu et al. | |
| 2011/0002319 A1* | 1/2011 | Husen | H04W 72/042 370/338 |
| 2011/0150004 A1* | 6/2011 | Denteneer | H04L 5/0046 370/476 |
| 2011/0194644 A1* | 8/2011 | Liu | H04L 5/0044 375/295 |
| 2011/0205969 A1 | 8/2011 | Ahmad et al. | |
| 2011/0261708 A1 | 10/2011 | Grandhi | |
| 2012/0020243 A1 | 1/2012 | Gong | |
| 2012/0099555 A1 | 4/2012 | Yoshii et al. | |
| 2012/0163483 A1 | 6/2012 | Stacey et al. | |
| 2012/0230317 A1 | 9/2012 | Kim et al. | |
| 2013/0145224 A1 | 6/2013 | Kim et al. | |
| 2013/0286959 A1 | 10/2013 | Lou et al. | |
| 2013/0301569 A1* | 11/2013 | Wang | H04L 1/1854 370/329 |
| 2013/0301605 A1* | 11/2013 | Kim | H04W 72/042 370/330 |
| 2013/0315211 A1 | 11/2013 | Balan et al. | |
| 2014/0003414 A1* | 1/2014 | Choudhury | H04W 74/006 370/347 |
| 2014/0098724 A1* | 4/2014 | Park | H04W 52/0235 370/311 |
| 2014/0119288 A1 | 5/2014 | Zhu et al. | |
| 2015/0003422 A1 | 1/2015 | Jin et al. | |
| 2015/0103767 A1* | 4/2015 | Kim | H04W 74/06 370/329 |
| 2015/0244619 A1* | 8/2015 | Zheng | H04W 40/34 370/392 |
| 2015/0249529 A1* | 9/2015 | Zheng | H04L 1/1896 370/336 |
| 2015/0250003 A1 | 9/2015 | Seok et al. | |
| 2016/0255656 A1* | 9/2016 | Lou | H04L 1/16 370/335 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D4.0 (Apr. 2013).

Erceg et al., "IEEE P802.11 Wireless LANs: TGn Channel Models," IEEE 802.11-03/940r4 (May 10, 2004).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmb/D12 (Nov. 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Lou et al., "Multi-user Parallel Channel Access for high efficiency carrier grade wireless LANs," IEEE International Conference on Communications (Jun. 10-14, 2014).

Lou et al., "Sub-channel selection for multi-user channel access in next generation Wi-Fi," IEEE 25th Annual International Symposium on Personal, Indoor, and Mobile Radio Communication (PIMRC) (Sep. 2-5, 2014).

Nguyen et al., "Uplink multi-user MAC protocol for 11ax," IEEE 11-14/0598r0 (May 11, 2014).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).

(56) References Cited

OTHER PUBLICATIONS

Third Generation Partnership Project, "Technical Specification Group Radio Access Network; Evolved Universal Terrestrial Radio Access (E-UTRA); Physical Channels and Modulation (Release 11)," 3GPP TS 36.211 V11.4.0 (Sep. 2013).
Third Generation Partnership Project, "Technical Specification Group Radio Access Network; Evolved Universal Terrestrial Radio Access (E-UTRA); Physical channels and modulation (Release 11)," 3GPP TS 36.211 V11.6.0 (Sep. 2014).
Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).

* cited by examiner

ENHANCEMENTS FOR RESOURCE ALLOCATION IN WLAN SYSTEMS

CROSS REFERENCE TO RELATED APPLICATIONS

This application is a continuation of U.S. application Ser. No. 15/948,869 filed on Apr. 9, 2018 which is a continuation of U.S. Ser. No. 15/026,666 filed on Apr. 1, 2016, which is a National Stage Entry of PCT/US2014/058633, filed Oct. 1, 2014, which claims the benefit of U.S. Provisional Application Ser. No. 61/885,400 filed on Oct. 1, 2013 and U.S. Provisional Application Ser. No. 61/979,099 filed on Apr. 14, 2014, the contents of which are hereby incorporated by reference herein.

BACKGROUND

A wireless local area network (WLAN) in an infrastructure basic service set (BSS) mode may include an access point (AP) for the BSS and one or more stations (STAs), i.e., wireless transmit/receive units (WTRUs), associated with the AP. The AP may have access to or interface with a Distribution System (DS) or another type of wired/wireless network that may carry traffic in and out of the BSS. Traffic to STAs originating from outside the BSS may arrive through the AP and may be delivered to the STAs. Traffic to destinations outside the BSS originating from STAs may be transmitted to the AP to be delivered to the respective destinations. Traffic between STAs within the BSS may also be transmitted through the AP, where the source STA may transmit traffic to the AP, and the AP may deliver the traffic to the destination STA. Such traffic between STAs within a BSS may be referred to as peer-to-peer (P2P) traffic. P2P traffic may also be transmitted directly between the source and destination STAs with a direct link setup (DLS) using an Institute of Electrical and Electronics Engineers (IEEE) 802.11e DLS or an IEEE 802.11z tunneled DLS (TDLS). A WLAN in independent BSS (IBSS) mode may not include an AP, and thus the STAs may communicate directly with each other. This mode of communication may be referred to as an "ad-hoc" mode of communication.

In an IEEE 802.11 infrastructure operation mode, the AP may transmit a beacon on a fixed channel known as the primary channel. The primary channel may be 20 MHz wide and may be the operating channel of the BSS. The primary channel may also be used by the STAs to establish a connection with the AP.

The channel access mechanism in an IEEE 802.11 system may be Carrier Sense Multiple Access with Collision Avoidance (CSMA/CA). In this operation mode, every STA, including the AP, may sense the primary channel. If the channel is detected to be busy, the STA may back off. Therefore, only one STA may transmit at any given time in a given BSS.

SUMMARY

A method and apparatus for use in an IEEE 802.11 station (STA) for receiving data from an IEEE 802.11 access point (AP) via a coordinated orthogonal block resource allocation (COBRA) is described. The STA may receive a COBRA schedule from the AP and transmit an acknowledgement (ACK) to the AP in the COBRA TXOP. The STA may receive a first data packet in the COBRA TxOP based on the COBRA schedule. The STA may determine whether the first data packet is received successfully and on a condition that the first data packet is not received successfully, the STA may transmit a negative acknowledgement (NACK) to the AP in the COBRA TxOP.

A STA may comprise a receiver configured to receive a multi-user (MU) request to send (RTS) frame transmitted to a plurality of STAs. The MU RTS frame may indicate, in a duration field, a duration of one or more frames to follow. The STA may further comprise a transmitter configured to transmit a clear to send (CTS) frame in response to receiving the MU RTS frame. Another frame comprising uplink (UL) transmission information may be received by the STA which includes modulation and coding scheme (MCS) indicators and allocates frequency resources for the plurality of STAs. A data frame may be modulated in accordance with an MCS indicator of the MCS indicators, and may be transmitted on frequency resources of the frequency resources allocated for the plurality of STAs. An acknowledgement frame, which acknowledges receipt of the data frame, may be received.

BRIEF DESCRIPTION OF THE DRAWINGS

A more detailed understanding may be had from the following description, given by way of example in conjunction with the accompanying drawings wherein.

DETAILED DESCRIPTION

Figure 1A:
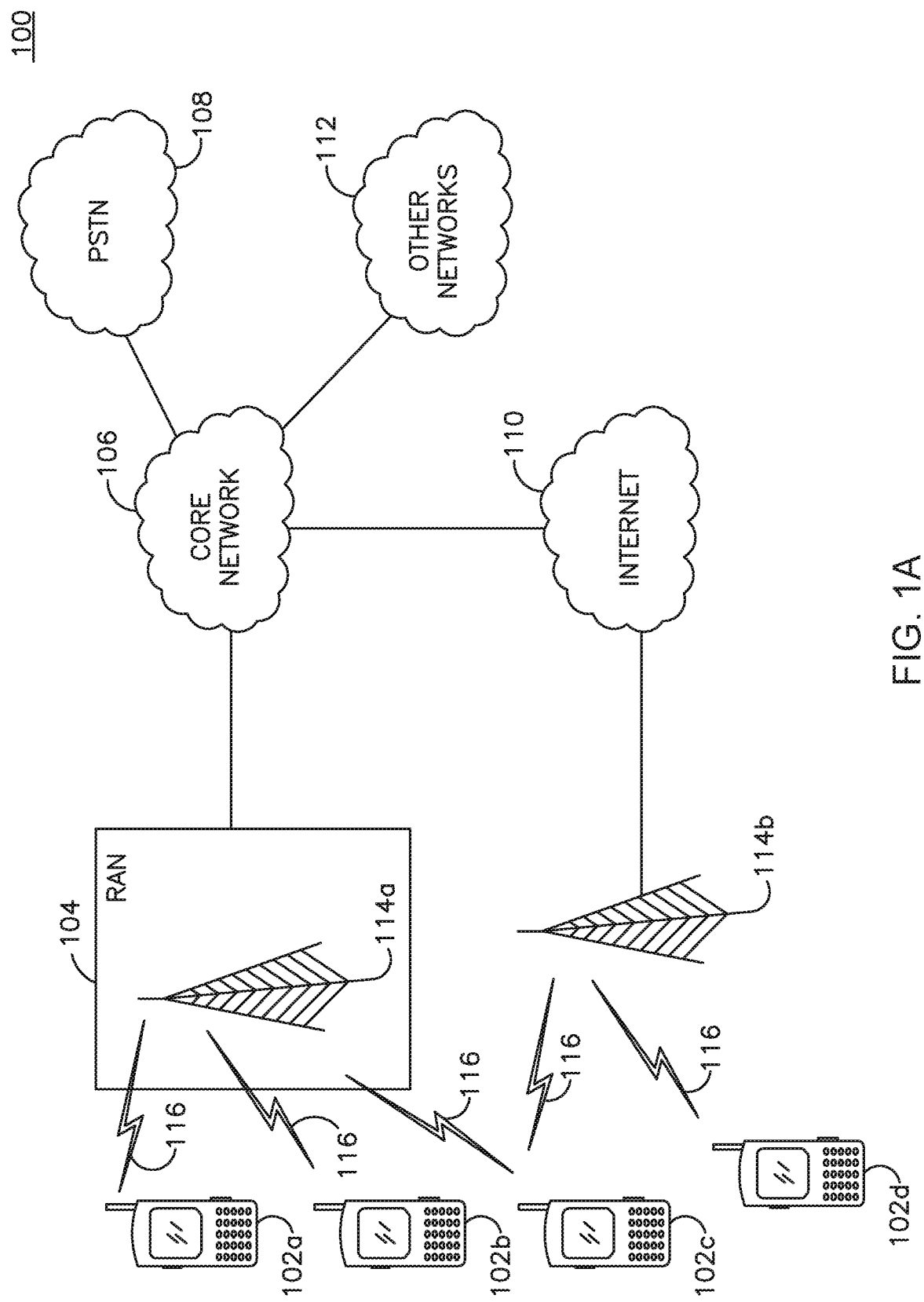
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
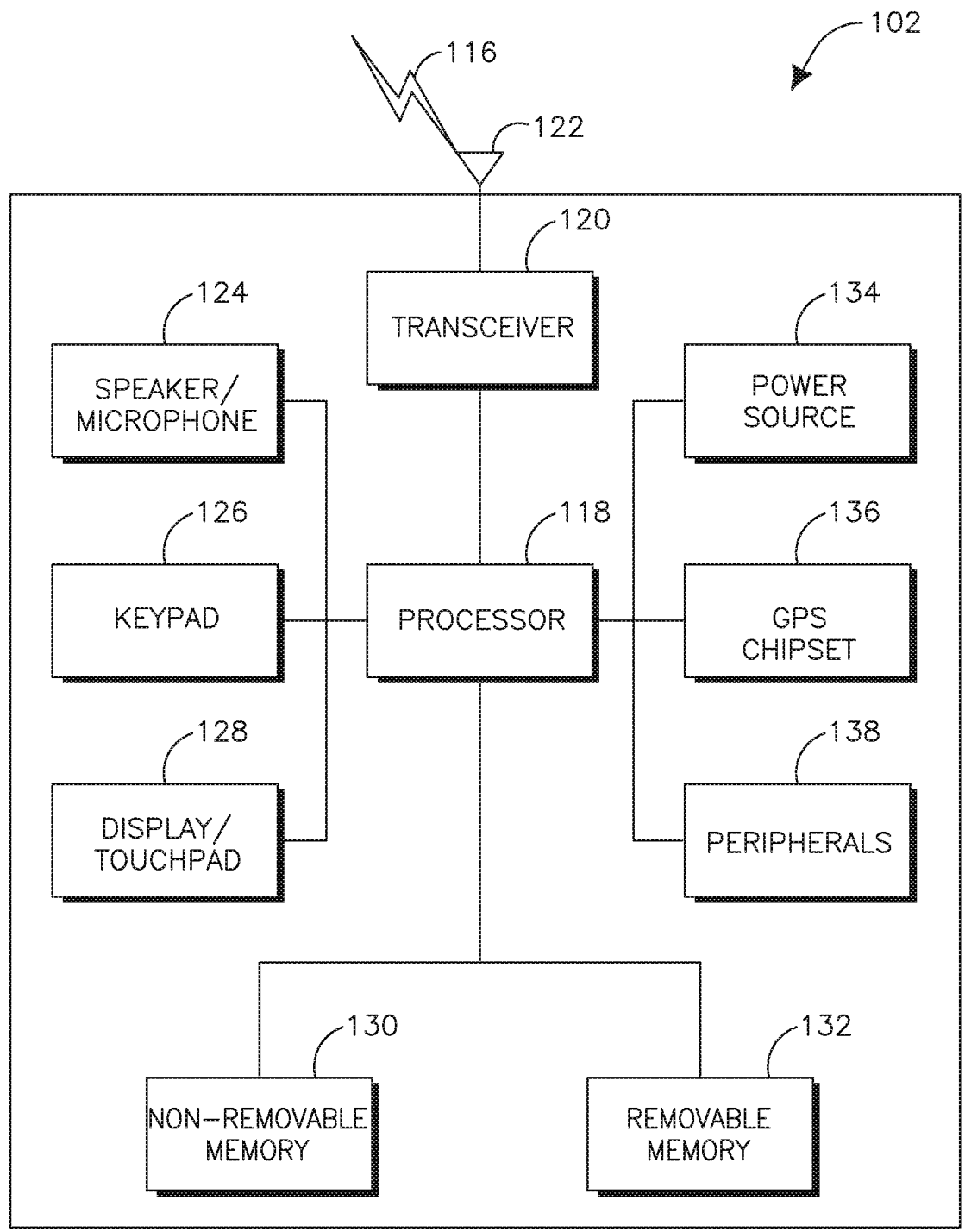
FIG. 1B is a system diagram of an example wireless transmit/receive unit (WTRU) that may be used within the communications system illustrated in FIG. 1A.
Figure 1C:
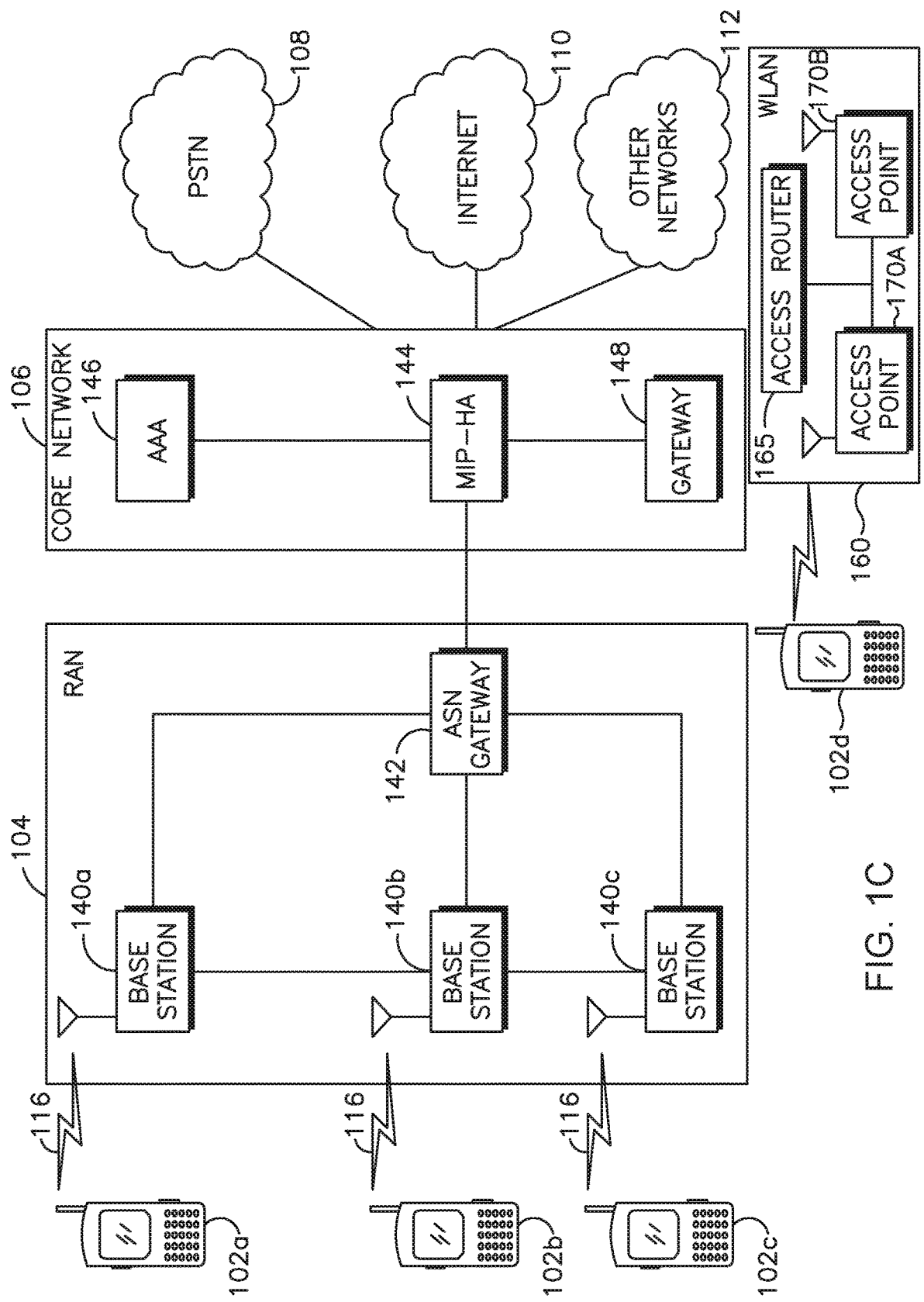
FIG. 1C is a system diagram of an example radio access network and an example core network that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10:
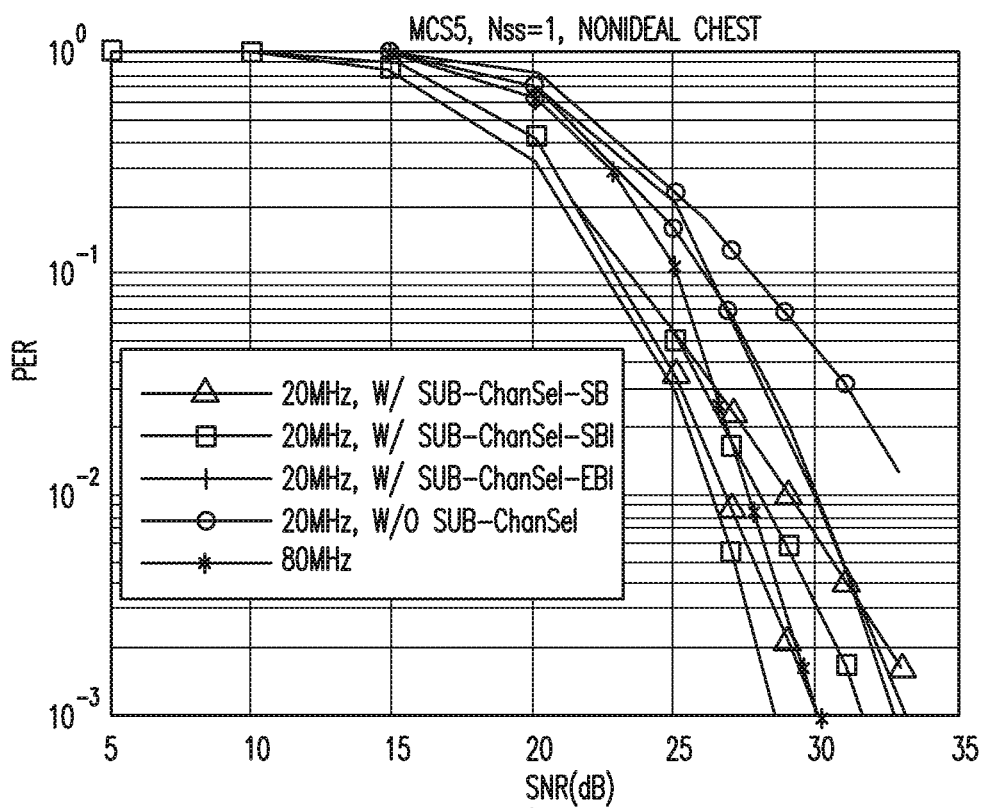
FIG. 10 is a graphical representation of simulation results of multi-user sub-channel selection with simulation scenario 1 with one data stream transmission in both channel B and channel D.

FIG. 10 is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 10, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 142 may be defined as an R6 reference point. The R6 reference point may include protocols for facilitating mobility management based on mobility events associated with each of the WTRUs 102a, 102b, 100c.

As shown in FIG. 10, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 10, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Herein, the terminology "STA" includes but is not limited to a wireless transmit/receive unit (WTRU), a user equipment (UE), a mobile station, a fixed or mobile subscriber unit, a pager, a cellular telephone, a personal digital assistant (PDA), a computer, a mobile Internet device (MID) or any other type of user device capable of operating in a wireless environment. The STAs referenced herein may be COBRA capable STAs, unless otherwise indicated.

Herein, the terminology "AP" includes but is not limited to a base station, a Node-B, a site controller, or any other type of interfacing device capable of operating in a wireless environment. The APs referenced herein may be COBRA capable APs, unless otherwise indicated.

References to COBRA, in addition to those descriptions cited herein, may refer to any block based coordinated reference allocation method which may be backward compatible to the CSMA air interface procedures and protocols.

For reference, IEEE 802.11n and IEEE 802.11ac may operate in frequencies from 2 to 6 GHz. In 802.11n, high throughput (HT) STAs may use a 40 MHz wide channel for communication. This may be achieved by combining a primary 20 MHz channel with another adjacent 20 MHz channel to form a 40 MHz wide channel. In 802.11ac, very high throughput (VHT) STAs may support 20 MHz, 40 MHz, 80 MHz and 160 MHz wide channels. While 40 MHz and 80 MHz channels may be formed by combining contiguous 20 MHz channels, similar to 802.11n, a 160 MHz channel may be formed either by combining 8 contiguous 20 MHz channels or two non-contiguous 80 MHz channels (i.e., "80+80" configuration). As an example, for the "80+80" configuration, the data, after channel encoding, may be passed through a segment parser that divides it into two streams. Inverse fast Fourier transform (IFFT) and time domain processing may be performed on each stream separately. The streams may then be mapped on to the two channels and the data may be sent out. On the receiving end, this mechanism may be reversed, and the combined data may be sent to the medium access control (MAC) layer.

In addition, the request-to-send (RTS)/clear-to-send (CTS) short inter-frame space (SIFS) may be 16 µs and the guard interval (GI) may be 0.8 µs. Transmissions from nodes within 100 meters may remain within the GI. Transmissions from nodes beyond 100 meters may have a delay longer than 0.8 µs. For example, at 1 kilometer, the delay may be over 6 µs.

For reference, IEEE 802.11af, and IEEE 802.11ah devices may operate in frequencies that are less than 1 GHz. For 802.11af and 802.11ah, the channel operating bandwidths may be reduced as compared to 802.11n, and 802.11ac. 802.11af may support 5 MHz, 10 MHz and 20 MHz wide bands in television (TV) white space (TVWS), while IEEE 802.11ah may support 1 MHz, 2 MHz, 4 MHz, 8 MHz and 16 MHz in non-TVWS. Some STAs in 802.11ah may be considered sensors with limited capabilities and may only support 1 and 2 MHz transmission modes.

In WLAN systems that utilize multiple channel widths, such as 802.11n, 802.11ac, 802.11af, and 802.11ah, there may be a primary channel that may have a bandwidth equal to the largest common operating bandwidth supported by all STAs in the BSS. The bandwidth of the primary channel may be limited by the STA that supports the smallest bandwidth operating mode. In the example of 802.11ah, the primary channel may be 1 or 2 MHz wide if there are one or more STAs that only support 1 and 2 MHz modes while the AP and other STAs in the BSS may support 4 MHz, 8 MHz and 16 MHz operating modes. All carrier sensing and network allocation vector (NAV) setting may depend on the status of the primary channel. For example, if the primary channel is busy due to a STA, supporting only 1 and 2 MHz operating modes, transmitting to the AP, then the entire available frequency bands may be considered busy even though a majority of the available frequency bands stay idle and available. In 802.11ah and 802.11af, packets may be transmitted using a clock that is down clocked 4 or 10 times as compared to 802.11ac.

In the United States, the available frequency bands that may be used by 802.11ah are from 902 MHz to 928 MHz. In Korea it is from 917.5 MHz to 923.5 MHz. In Japan, it is from 916.5 MHz to 927.5 MHz. The total bandwidth available for 802.11ah may be 6 MHz to 26 MHz, depending on the country code.

To improve spectral efficiency, 802.11ac has introduced a concept for downlink multi-user multiple input multiple output (MU-MIMO) transmission to multiple STAs in the same symbol's time frame, for example, during a downlink OFDM symbol. The potential for the use of downlink MU-MIMO is also currently considered for IEEE 802.11ah. Since downlink MU-MIMO, as referred to in IEEE 802.11ac, uses the same symbol timing to multiple STAs, interference of the waveform transmissions to multiple STAs may not be an issue. However, all STAs involved in a MU-MIMO transmission with the AP may use the same channel or band. This may limit the operating bandwidth to the smallest channel bandwidth that is supported by the STAs included in the MU-MIMO transmission with the AP.

Coordinated orthogonal block-based resource allocation (COBRA) in WLAN systems was first proposed by InterDigital. The COBRA transmission scheme was proposed as an alternate means of WLAN medium access. The COBRA scheme may use a generic subcarrier based multiple access scheme. Solutions for COBRA may include multicarrier modulation, filtering, and time, frequency, space, and polarization domains as the basis for the transmission and coding scheme. The COBRA scheme may be implemented using orthogonal frequency-division multiple access (OFDMA)

sub-channelization, single-carrier frequency-division multiple access (SC-FDMA) sub-channelization, and filter-bank multicarrier sub-channelization. The following features may be needed to enable COBRA transmission: methods for coverage range extension; methods of grouping users; methods for channel access; preamble designs for low overhead; methods for beam forming and channel sounding; methods for frequency and timing synchronization; and methods for link adaptation. In addition, methods for grouping users may also be needed.

General Cobra Transmission Rule

A general transmission rule of COBRA is not well defined in existing COBRA systems. For example, in some densely deployed systems, such as infrastructure networks, COBRA-capable and non-COBRA-capable STAs may co-exist in the same BSS or overlapping BSS (OBSS). In such a scenario, the AP may want to arrange part of a beacon interval for COBRA transmission and the rest of the beacon interval for non-COBRA transmission. Therefore, a defined transmission rule of COBRA that allows COBRA transmission to coexist with non-COBRA transmission, e.g., a CSMA/CA based channel access scheme is desired.

Figure 2:
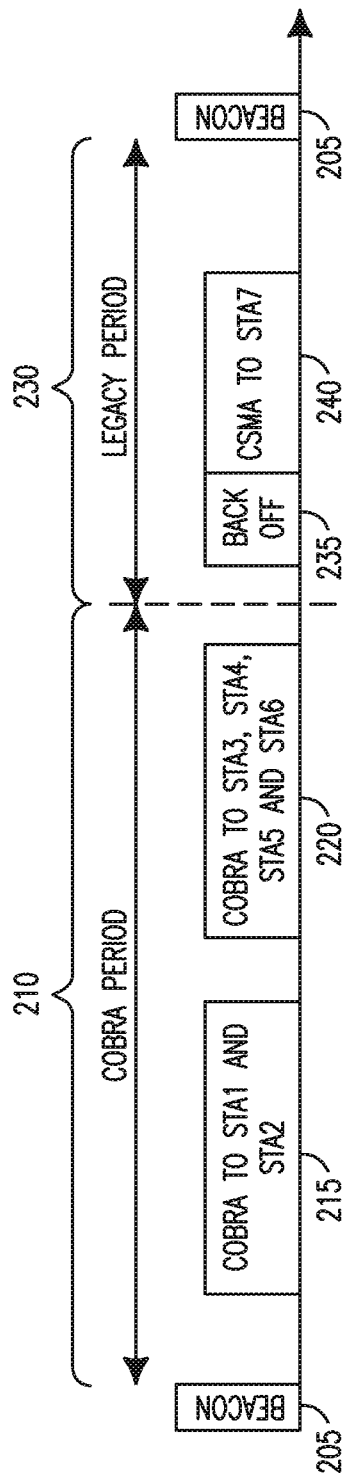
FIG. 2 is a diagram of an example Type I COBRA transmission.

FIG. 2 is a diagram of an example Type I COBRA transmission. Type I COBRA transmission is a mechanism to schedule COBRA and non-COBRA transmissions during the same beacon interval. The AP may arrange part of a beacon interval for COBRA transmission using a beacon frame. The beacon frame may be used to announce one or more periods dedicated for COBRA transmission in a given beacon interval. A COBRA period may be a period within a beacon interval, which only allows COBRA transmission(s). As shown in FIG. 2, the beacon frame 205 may announce COBRA period 210 is dedicated for COBRA transmission. A COBRA parameter set element may be included in the beacon frame. The rest of the time slot or beacon interval may be allocated to non-COBRA transmission. As shown in FIG. 2, the remaining portion of the beacon interval is allocated to legacy period 230.

Figure 3:
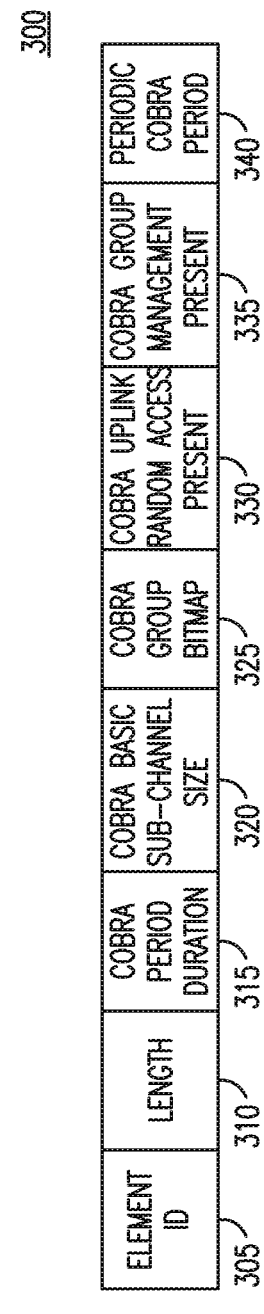
FIG. 3 is a diagram of an example COBRA parameter set element.

FIG. 3 is a diagram of an example COBRA parameter set element 300. The COBRA parameter set element 300 may include an element ID field 305, a length filed 310, a COBRA period duration field 315, a COBRA basic sub-channel size field 320, a COBRA group bitmap field 325, a COBRA uplink random access present field 330, a COBRA group management present field 335 and a periodic COBRA period field 340.

The element ID field 305 may identify the specific element.

The length field 310 may indicate the length of the element.

The COBRA period duration field 315 may indicate the maximum length of the COBRA period in the current beacon interval. The STA may use this field to set its NAV. This field may also be used to set up an IEEE 802.11 time unit (TU).

The COBRA basic sub-channel size field 320 may be used to indicate the minimum COBRA sub-channel size used in the current beacon interval.

The COBRA group bitmap field 325 may be a bitmap associated with the COBRA group ID. When the COBRA group ID contains N group members, this field may include N bits. Each bit may be associated with one COBRA group. The value of the bit may be used to indicate whether the group will be assigned a COBRA transmission (downlink, uplink or combined downlink/uplink) in the coming COBRA period within the beacon interval.

The COBRA uplink random access present field 330 may be used to indicate whether the following COBRA period contains an uplink COBRA random access transmission. An uplink COBRA random assess transmission may be used for COBRA non-AP STAs having uplink traffic to request the AP to assign uplink transmission.

The COBRA group management present field 335 may be used to indicate whether the upcoming COBRA period contains COBRA group management information.

The periodic COBRA period field 340 may be used to indicate whether the COBRA period appears periodically, and if so may be used to indicate how often the COBRA period field may appear. For example, it may indicate that the COBRA period may appear every two beacon intervals.

COBRA transmission may be initiated and controlled by the AP in either downlink COBRA transmission or uplink COBRA transmission. The AP may maintain a COBRA schedule list, which may include the STAs that the AP may intend to communicate with. The list may include STAs the AP has pending traffic to transmit to; the STAs which have traffic to transmit to the AP; or the STAs the AP intends to poll, and the like. Referring back to FIG. 2, the COBRA schedule list maintained by the AP may include STAs 1-6, with an indication that the AP has pending traffic to transmit to these STAs. If the COBRA schedule list is not empty, the AP may allocate a COBRA period by including the COBRA parameter set element in the beacon frame, as described above. The decision of when to allocate a COBRA period may be implementation dependent. Alternatively or additionally, the AP may transmit a COBRA schedule frame to one or more STAs to initiate communications between the AP and the STAs. The STAs may then be aware of their transmission or reception position in the COBRA period within the beacon interval. For the example provided in FIG. 2, the COBRA schedule frame (not shown) would indicate the AP has a COBRA transmission for STA-1 and STA-2 and another COBRA transmission for STA-3, STA-4, STA-5 and STA-6. After transmission of the COBRA schedule frame (not shown), the AP would transmit a first COBRA transmission 215 to STA-1 and STA-2 and a second COBRA transmission 220 to STA-3, STA-4, STA-5, and STA-6. If time remains in the COBRA period, and the frame exchanges of the previous COBRA schedule frame are finished, the AP may schedule a new COBRA transmission between the AP and a set of STAs. This set of STAs may or may not overlap with the previously scheduled STAs. While time remains in the COBRA period and all STAs on the COBRA schedule list have been communicated with or polled, the AP may transmit a COBRA Period End frame and terminate the COBRA period early. Alternatively, the AP may utilize the remaining time in the COBRA period to poll more STAs, which may not be included on the COBRA schedule list, to determine whether the STAs have uplink traffic to transmit.

CSMA/CA contention window randomization and backoff procedures may not be mandatory within the COBRA period. During a legacy period the AP may have data to transmit to another STA. As shown in FIG. 2, the AP has traffic to transmit in the legacy period 230 to STA-7. The AP may perform CSMA/CA to determine if the media is clear after the COBRA period 210 has expired. If the media is not clear, the AP may initiate a backoff procedure. The backoff procedure may also be initiated due to a lack of an expected response due to certain rules, or due to extra protection mechanisms to protect from interference of OBSS. In the example shown in FIG. 2, the AP determines that the media is not clear and initiates a backoff procedure 235. When the backoff period ends and the AP gains control of the media, the AP may transmit the data transmission 240 to STA 7 according to the CSMA protocol. Although not shown in FIG. 2, if the media is not clear after backoff procedure 235, another backoff procedure may be performed.

Figure 4:
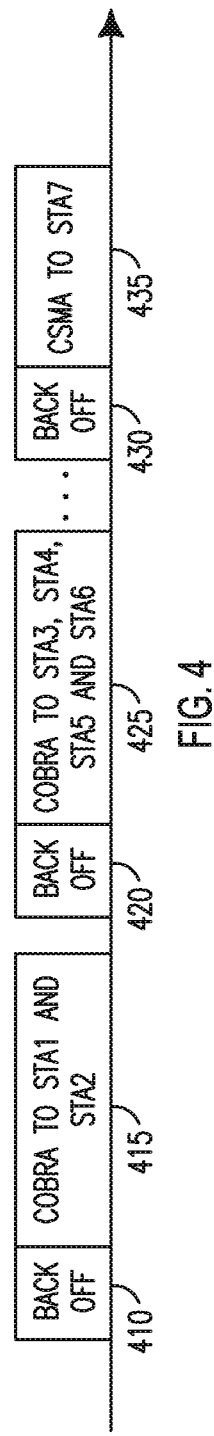
FIG. 4 is an example of Type II COBRA transmission.

Alternatively, the AP may want to perform COBRA transmission only when the AP acquires the media. If the AP does not dedicate or schedule COBRA transmission in a beacon interval, the AP may need to compete with other non-AP STAs to acquire the channel in order to perform COBRA transmission. The other non-AP STAs may include both COBRA-capable devices and non-COBRA capable or legacy devices that may not use COBRA to access the media. FIG. 4 is an example of Type II COBRA transmission. Type II COBRA transmission is a mechanism where the AP performs COBRA transmission only when the AP acquires the media, i.e., the AP successfully competes with other non-AP STAs to acquire the channel. As shown in FIG. 4, the AP has a COBRA transmission for STA-1 and STA-2 and another COBRA transmission for STA-3, STA-4, STA-5 and STA-6. If the media is not clear during the AP's first attempt to gain control of the media, the AP performs backoff procedure 410. Once the AP has control of the media, the AP may perform a COBRA transmission 415 to a STA-1 and a STA-2. After the transmission, the AP will again compete for the media. In this example, the media is busy during the AP's next attempt; therefore the AP performs another backoff procedure 420. Once the AP again gains control of the media, it may perform another COBRA transmission 425 to STA-3, STA-4, STA-5 and STA-6. In Type II COBRA transmission, the COBRA transmission may coexist with a CSMA/CA based channel access scheme, as shown. After COBRA transmissions 415 and 425 are performed, the AP may perform CMSA/CA, which may include performing a backoff procedure 430 if the media is busy, and subsequently transmitting data 435 to the intended STA, i.e., STA-7, in accordance with the CSMA protocol. Alternatively, the CSMA/CA based channel access scheme may occur between the COBRA transmissions.

Multi-User Diversity in Cobra

COBRA may allow multiple STAs to communicate on multiple sub-channels at the same time. In order to fully exploit the frequency selectivity and multi-user diversity, each STA may transmit or receive data on sub-channels that have good channel quality. In other words, the channel selection for each communicating STA may be a function of the channel quality of the corresponding sub-channels.

Figure 5:
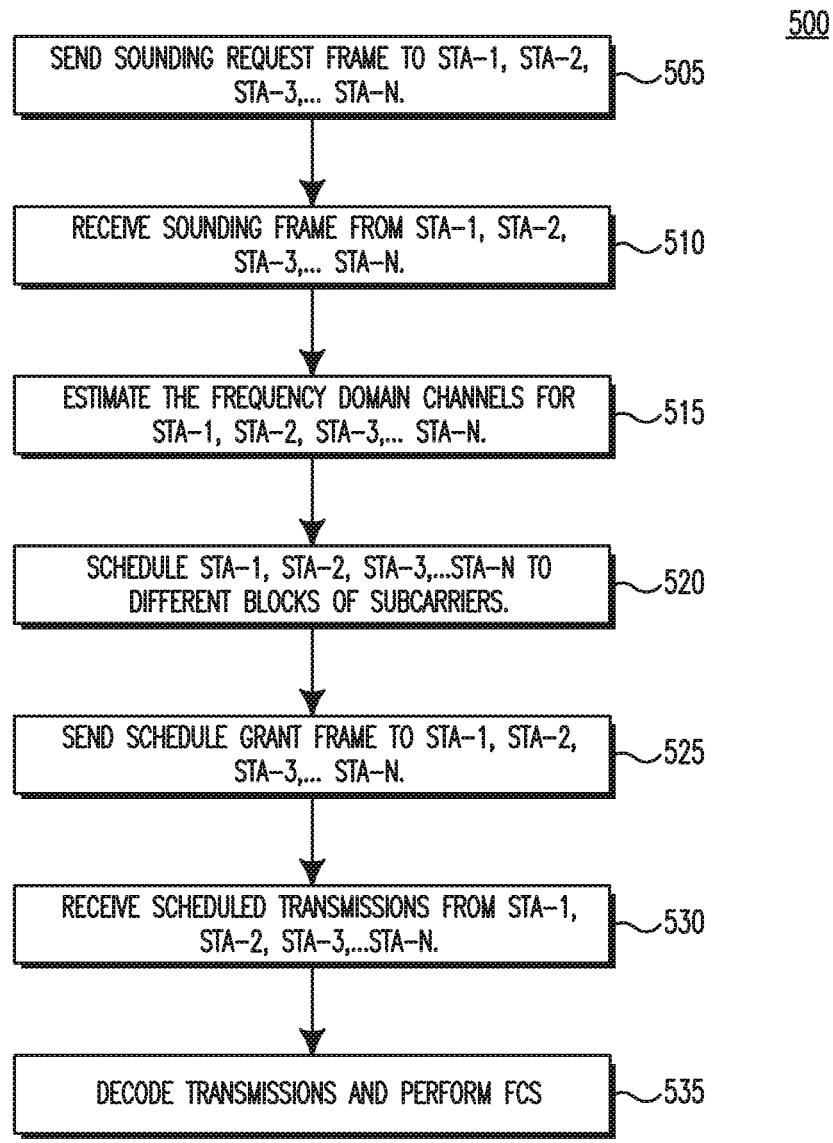
FIG. 5 is a diagram of an example multi-user diversity and sub-channel selection procedure.

FIG. 5 is a diagram of an example multi-user diversity and sub-channel selection procedure 500. In this example, the AP implicitly measures the channel to schedule uplink transmissions for a plurality of STAs. Turning to FIG. 5, the AP may start a multi-user diversity enabled COBRA transmission to a group of potential COBRA candidates, i.e., STA-1, STA-2, STA-3, . . . STA-N, to be scheduled for COBRA transmissions in the uplink, by transmitting a sounding request frame 505. Although not shown, a similar procedure may be applied for scheduling downlink transmissions. The sounding request frame may be used to solicit each STA to transmit a sounding frame to the AP, in order to estimate the wideband channel for each STA. The sounding request frame may include the address of each STA, and in what order the STAs may transmit sounding frames. The AP may order the addresses of all STAs in the sounding request frame, such that the first addressed STA may transmit a sounding frame in the first position, the second address STA may transmit a sounding frame in the second position, and so on.

The AP may receive a sounding frame from each STA 510 included in the sounding request frame at a pre-determined timing. This may occur a SIFS time (or a new inter-frame space (IFS) time) later. For example, the first addressed STA may transmit a sounding frame in the first position; the second addressed STA may transmit a sounding frame in the second position, and so on. The sounding frame may be a null data packet (NDP), including only the preamble (for example, short training field, long training field, signaling field). The sounding frame may cover the entire frequency resource, e.g., the entire block of carriers, or the entire bandwidth. For example, although each STA may be scheduled for only 20 MHz transmissions, each STA's sounding frame may span the entire system bandwidth supported by the AP, such as 80 MHz. Alternatively, the sounding frame may cover a portion of the frequency resource, e.g., a desired block of carriers by the STAs, or the assigned sub-channel(s).

Upon receiving the sounding frames from all STAs, the AP may estimate the frequency domain channels for STA-1, STA-2, STA-3, . . . STA-N 515, across the entire system bandwidth supported by the AP. This may occur a SIFS time (or a new IFS time) later.

The AP may carry out an implementation-dependent module, to schedule different users to different blocks of subcarriers 520. In one example, the AP may divide the entire system bandwidth into N blocks, such that one STA may transmit on one block of subcarriers. In another example, the AP may divide the entire system bandwidth into M blocks (M<N), such that only M STAs may transmit, with each STA transmitting only on one block of subcarriers. The algorithm for implementing the scheduling of different users may be implementation-dependent.

Upon reaching a scheduling decision, the AP may transmit a schedule grant frame 525, broadcasting the frequency allocation information to STA-1, STA-2, STA-3, . . . STA-N. The scheduling grant frame may include the address of each scheduled STA, together with the scheduling position (frequency band allocation information) of all the STAs. The schedule grant frame may also serve as a synchronization frame. This may be achieved by including a preamble in the scheduling grant frame. Each scheduled STA may use this preamble to perform proper timing adjustment and frequency synchronization.

The AP may receive the multiple, orthogonal, COBRA transmissions from the multiple STAs 530, which transmit their respective packets, each at their scheduled frequency position (block of subcarriers). This may occur a SIFS time (or a new IFS time) after the AP transmits the schedule grant frame.

The AP may then decode each received transmission separately, and perform a frame check sequence (FCS) for each STA 535. The AP may transmit an ACK or NACK frame for each STA, with STA-1's ACK or NACK frame on the frequency band allocated to STA-1, STA-2's ACK or NACK frame on the frequency band allocated to STA-2, and so on. Alternatively, the AP may transmit an ACK or NACK frame for each STA in a single packet, for example, a primary band of the channel. This single packet may include the address of each STA, together with the ACK or NACK report corresponding to each STA.

Figure 6:
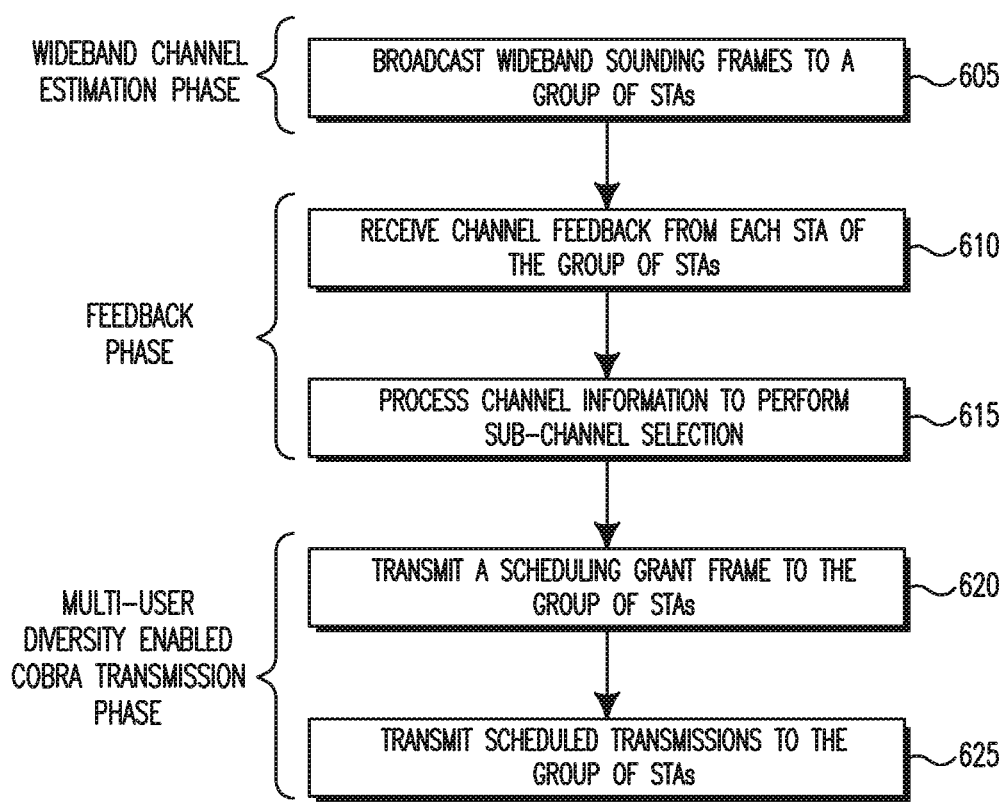
FIG. 6 is a diagram of an example multi-user diversity and sub-channel selection procedure for a downlink transmission.

FIG. 6 is a diagram of an example multi-user diversity and sub-channel selection procedure for a downlink transmission 600. In this procedure, the receivers, i.e., the STAs in the downlink, explicitly indicate the desired resource to the transmitter, i.e., the AP. The procedure may occur in three phases, a wideband channel estimation phase, a feedback phase and a multi-user diversity enabled COBRA transmission phase.

In the wideband channel estimation phase, the AP, at specific intervals, may broadcast wideband sounding frames spanning the entire bandwidth to a group of STAs (i.e., STA-1, STA-2, STA-3, . . . , STA-N) 605 to enable the group of STAs to estimate the wideband channel. Alternatively, each STA may estimate the quality of each sub-band during normal transmission from the AP to other STAs in the BSS.

In the feedback phase, the AP receives feedback from each STA regarding its desired channels for scheduling 610. The feedback may be the complex elements of the wideband channel. The AP may process the channel information to perform sub-channel selection 615. Alternatively, the STA may perform the processing needed and feedback sub-channel information that is subsequently used by the AP for sub-channel selection. The feedback may depend on a specific sub-channel selection strategy. For example, using the Sum Best Improved (SBI) algorithm, assuming the channel metric (CM) is the mean signal-to-noise-ratio (SNR), each STA may feedback the mean SNR for each sub-channel. The STA may also determine not to feedback its worst sub-channel. A feedback protocol may be agreed on to enable proper feedback of the information needed. Alternatively, using the Sub Best (SB) algorithm, each STA may feedback the summation of the CM over the entire band. Assuming the CM is the mean SNR, each STA may feedback the sum of mean SNRs over all sub-bands.

In one example, the AP may request the best N sub-channels from each STA. This may be implemented by a best-channel request frame that may include the STA ID and the number of channels requested. The STA may transmit a best channel response frame that includes the STA ID, and the channels in the order of preference. For example, if N=3, the STA may feedback channels 4, 3 and 1. Alternatively, the AP may request for a block feedback in which it polls each successive STA in the BSS. Each STA may also feedback a CM or combination of CMs indicating the level of preference. This may be the SNR/SINR of the sub-channel, the interference level experienced in the sub-channel, the number of collisions experienced in the sub-channel, the channel energy, and the like.

In another example, each STA may feedback a differential metric frame that indicates the difference of a desired metric between the primary sub-channel and all other sub-channels or the correlation between the metric in a primary sub-channel and other sub-channels. This may enable the AP to estimate the channel quality of the rest of sub-channels given the observation of the primary sub-channel. The metric may be the SNR/SINR of the sub-channel, the interference level experienced in the sub-channel, the number of collisions experienced in the sub-channel, the channel energy, and the like. In this example, the metric for the primary channel may be fed back at intervals decided by the AP. The differential metric frame may be fed back at longer intervals. This may be at periodic intervals or when a differential metric change exceeds a threshold. The AP may then use a combination of the relative strength of the metric on the primary channel for the different STAs combined with the differential information for each STA in its scheduling decision. This may enable more efficient feedback for the system.

In the multi-user diversity enabled COBRA transmission phase, upon reaching a scheduling decision, the AP may transmit a schedule grant frame 620 to the group of STAs, broadcasting the frequency allocation information. The scheduling information may be based on full or partial information. The schedule grant frame may include the address of each scheduled STA, together with the scheduling position (frequency band allocation information) of the STAs. The schedule grant frame may also serve as a synchronization frame. This may be achieved by including a preamble in the schedule grant frame. Each scheduled STA may use this preamble to perform proper timing adjustment and frequency synchronization. It should be noted that the AP may send a single grant frame to all STAs or may send multiple schedule grant frames to each individual STA.

The AP may transmit packets to the group of STAs, each at its scheduled frequency position (block of subcarriers or sub-channel) 625. This may occur a SIFS time (or a new IFS time) after the AP transmits the schedule grant frame. The AP may receive acknowledgements from the group of STAs if the transmitted packets are or are not successfully received. The acknowledgements may be ACK frames, NACK frames, or block ACK frames. The AP may receive the acknowledgement frames from multiple STAs simultaneously and the STAs may be separated in frequency or code domain. Alternatively, the AP may receive the acknowledgement frames sequentially one after another. In the second method, the AP may or may not need to poll the STAs for the acknowledgement frames.

Figure 7:
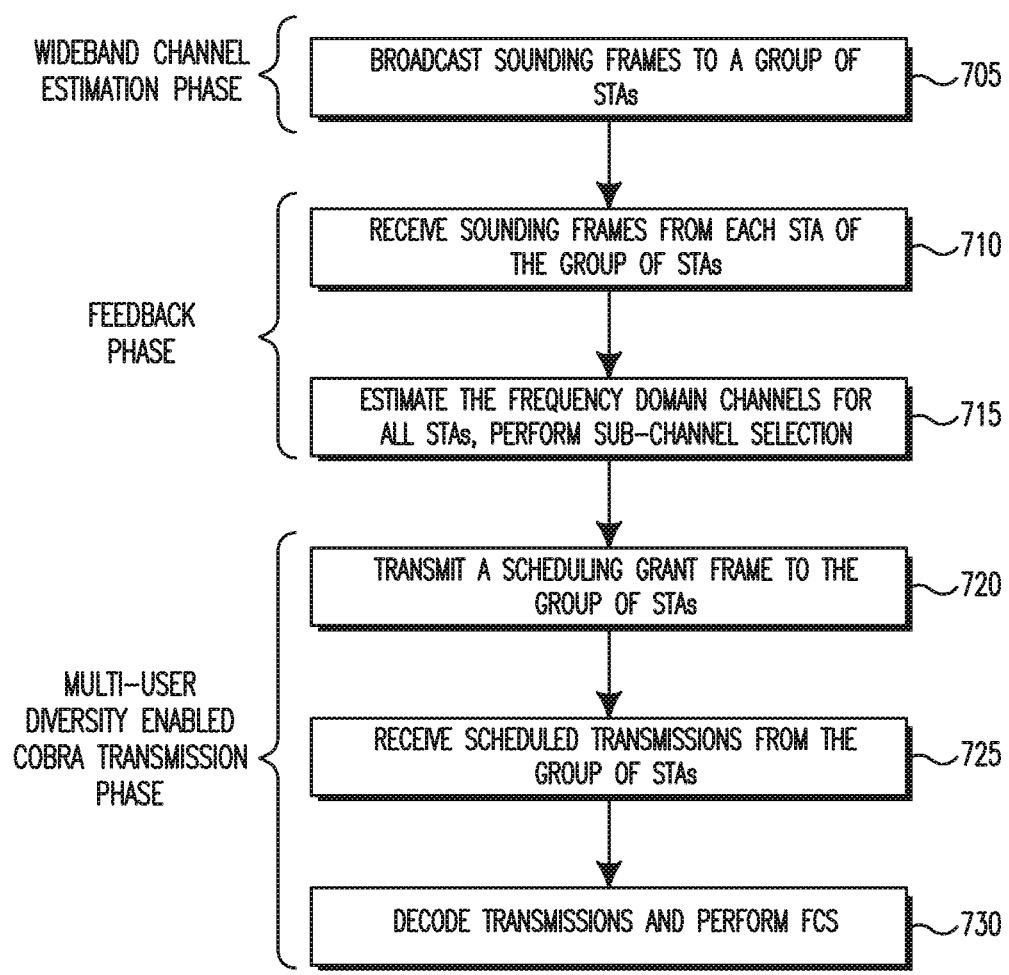
FIG. 7 is a diagram of an example multi-user diversity and sub-channel selection procedure for an uplink transmission.

FIG. 7 is a diagram of an example multi-user diversity and sub-channel selection procedure for an uplink transmission 700. The procedure may occur in three phases, a wideband channel estimation phase, a feedback phase and a multi-user diversity enabled COBRA transmission phase.

In the wideband channel estimation phase, the AP may transmit sounding request frames to each STA 705, as described above, to enable the AP to estimate the best uplink channel. The sounding request frame may be used to solicit each STA to transmit a sounding frame to the AP, in order to estimate the wideband channel for each STA. The sounding request frame may include the address of each STA, and in what order the STAs may transmit sounding frames.

In the feedback phase, each STA that is included in the sounding request frame may respond with a sounding frame, at a pre-determined time 710. This may occur a SIFS time (or a new IFS time) after receiving the sounding request frame from the AP. The sounding frame may be a null data packet, including only the preamble (for example, short training field, long training field, signaling field) and may cover the entire block of carriers. For example, although each STA may be scheduled for only 20 MHz transmissions, each STA's sounding frame may span the entire system bandwidth supported by the AP, for example, 80 MHz. The sounding frame may also cover the desired block of carriers by the STAs. The AP may estimate the frequency domain channels for all STAs 715, across the entire system bandwidth supported by this AP.

Alternatively, the AP may use the information gleaned from downlink transmission estimation and feedback in scheduling uplink transmission (for example, assume channel reciprocity in which the best channel for downlink transmission is the best channel for uplink transmission). The STA may be using information from downlink channel estimation (for example, reciprocity) and may transmit an indicator frame on the desired sub-channel as an indication of the best channel in the multi-user diversity sense. For example, the indicator frame may be a request-to-send (RTS) frame.

In the multi-user diversity enabled COBRA transmission phase, upon reaching a scheduling decision, the AP may transmit a schedule grant frame 720 to the group of STAs, broadcasting the frequency allocation information. The scheduling information may be based on full or partial information. The schedule grant frame may include the address of each scheduled STA, together with the scheduling position (frequency band allocation information) of the STAs. The schedule grant frame may also serve as a synchronization frame. This may be achieved by including a preamble in the schedule grant frame. Each scheduled STA may use this preamble to perform proper timing adjustment and frequency synchronization.

All of the scheduled STAs may then transmit packets, each at its scheduled frequency position (block of subcarriers). The AP may receive the multiple, orthogonal, COBRA transmissions from the multiple STAs 725. This may occur a SIFS time (or a new IFS time) after the schedule grant frame is received by the STAs. The AP may decode the transmissions separately and may perform FCS checks for each STA 730. The AP may transmit an ACK or NACK frame for each STA, for example, with STA-1's ACK or NACK frame on the frequency band allocated to STA-1, STA-2's ACK or NACK frame on the frequency band allocated to STA-2, and so on. Alternatively, the AP may transmit an ACK or NACK frame for each STA in a single packet, for example, on a primary band of the channel. This single packet may include the address of each STA, together with the ACK/NACK report corresponding to each STA.

In order to perform either implicit multi-user diversity or explicit multi-user diversity, channel measurements may be necessary. With implicit multi-user diversity, the AP may measure the channel and the measurements it utilizes may be implementation dependent. With explicit multi-user diversity, the non-AP STAs may perform measurements on the downlink channel, and feedback the measurements to the AP, and thus, channel measurements may need to be specified in the standards. The CM may be represented by a mean SNR, harmonic mean SNR, or channel capacity over a sub-channel.

Exemplary CM definitions will now be described.

In a single data stream case, the measurements may be mean SNR, harmonic mean SNR, and channel capacity.

For any STAi, the mean SNR for the $n^{th}$ sub-channel may be defined as:

$$\text{Mean\_SNR}_{i,n} = \frac{1}{K}\sum_{k=0}^{K-1} SNR_{i,n,k}, \quad \text{Equation 1}$$
$$i = 0, 1, \ldots, N-1, n = 0, 1, \ldots, N-1$$

where $SNR_{i,n,k}$ is the SNR of the $k^{th}$ subcarrier for STAi in the $n^{th}$ sub-channel, N is the number of total available sub-channels and K is the number of subcarriers in each sub-channel.

For any STAi, the harmonic mean SNR for the $n^{th}$ sub-channel may be defined as:

$$\text{Harmonic\_Mean\_SNR}_{i,n} = \left(\frac{1}{K}\sum_{k=0}^{K-1}\frac{1}{SNR_{i,n,k}}\right)^{-1}, \quad \text{Equation 2}$$
$$i = 0, 1, \ldots, N-1, n = 0, 1, \ldots, N-1.$$

For any STAi, the channel capacity for the $n^{th}$ sub-channel may be defined as:

$$C_{i,n} = \frac{1}{K}\sum_{k=0}^{K-1} 10\log2(1 + |H_{i,n,k}|^2), \quad \text{Equation 3}$$

where $H_{i,n,k}$ is the equivalent channel frequency response at the $k^{th}$ subcarrier for STAi in the $n^{th}$ sub-channel.

In a multi data stream case, assuming transmitter and receiver antennas are $N_{tx}$ and $N_{rx}$, respectively and the number of data streams, $N_{ss}$ is equal to the minimum of $N_{tx}$ and $N_{rx}$, two measurements may be used: post processed mean SINR and channel capacity.

For any STAi, the post processed mean SINR for the $n^{th}$ sub-channel may be defined as:

$$SINR_{i,n} = \frac{1}{K}\sum_{k=0}^{K-1} SINR_{i,n,k}, \quad \text{Equation 4}$$

where $SINR_{i,n,k}$ is the SINR of the $k^{th}$ subcarrier for STAi in the $n^{th}$ sub-channel and may be obtained by:

$$SINR_{i,n,k} = \frac{1}{N_{ss}}\sum_{N_{ss}=0}^{N_{ss}-1} \frac{P_{n_{ss}}}{I_{n_{ss}} + N_{0,n_{ss}}}, \quad \text{Equation 5}$$

where $P_{n_{ss}}$ is the power of the $(n_{ss})^{th}$ data stream, $1_{n_{ss}}$ is the total interference from other data streams to the $(n_{ss})^{th}$ data streams and $N_{0,n_{ss}}$ may be the related noise power.

For any STAi, the channel capacity for the $n^{th}$ sub-channel may be defined as:

$$C_{i,n} = \frac{1}{K}\sum_{k=0}^{K-1} 10\log2(1 + (H_{i,n,k})^H H_{i,n,k}) \quad \text{Equation 6}$$

where $H_{i,n,k}$ with demision of $N_{rx} \times N_{tx}$ is the frequency domain channel response for the $i^{th}$ user at the $k^{th}$ subcarrier in $n^{th}$ sub-channel.

In order to achieve more frequency diversity, once STAs (e.g., COBRA users) are selected by grouping algorithms, the AP may need to choose the right sub-channel for the STAs according to the channel measurements.

Exemplary sub-channel selection strategies, for example the sum best (SB) algorithm, the sum best improved (SBI) algorithm, or the each best improved (EBI) algorithm, will now be described. Note, although CM may be utilized in the algorithms, any one of the metrics described heretofore or known to those of skill in the art may be used. For example, CM may be replaced by Mean_SNR, Harmonic_Mean_SNR, Mean_SINR, Harmonic_Mean_SINR or Capacity.

If all the users are experiencing similar delay spread channels, or if the AP has no knowledge of the channel delay spread, based on the measurements defined above, SNR, SINR or capacity, (SNR is used as an example below), the SB algorithm, SBI algorithm, or EBI algorithm, as defined below may be used.

In the SB algorithm, the sub-channel allocation may be obtained by finding the maximum of the sum SNR of all users:

$$\{n_0, n_1, \ldots, n_{I-1}\} = \arg\max_{n_i \in 0,1,\ldots,N-1} \sum_{i=0}^{I-1} CM_{i,n_i}, \quad \text{Equation 7}$$

$$\text{w.r., } n_i \neq n_j, \text{ if } i \neq j$$

where $n_i$ is the index of the sub-channel allocated to the $i^{th}$ user. Table 1 is an example of assigning four sub-channels to four STAs based on SNR. Each STA may have four options and the same sub-channel may not be allocated to more than one STA, therefore, in this example, there may be 24 selection combinations. Among all the 24 combinations, the one $\{n_0, n_1, n_2, n_3\} = \{2, 1, 3, 4\}$ with the maximum SNR:

$$SNR_{1,2} + SNR_{2,1} + SNR_{3,3} + SNR_{4,4} = \quad \text{Equation 8}$$

$$\max_{n_i \in 0,1,2,3} \sum_{i=0}^{3} SNR_{i,n_i},$$

$$\text{s.t., } n_i \neq n_j, \text{ if } i \neq j$$

may be selected as the optimum solution as shown in bold in Table 1, below.

TABLE 1

EXAMPLE SUB-CHANNEL ALLOCATION FOR FOUR (4) STAS

|       | Sub Channel 1 | Sub Channel 2 | Sub Channel 3 | Sub Channel 4 |
|-------|---------------|---------------|---------------|---------------|
| STA 1 | $SNR_{1,1}$   | $SNR_{1,2}$ | $SNR_{1,3}$   | $SNR_{1,4}$   |
| STA 2 | $SNR_{2,1}$ | $SNR_{2,2}$   | $SNR_{2,3}$   | $SNR_{2,4}$   |
| STA 3 | $SNR_{3,1}$   | $SNR_{3,2}$   | $SNR_{3,3}$ | $SNR_{3,4}$   |
| STA 4 | $SNR_{4,1}$   | $SNR_{4,2}$   | $SNR_{4,3}$   | $SNR_{4,4}$ |

In the SBI algorithm, in addition to maximizing the sum SNR of all STAs, no STA may be assigned with that STA's worst sub-channel:

$$\{n_0, n_1, \ldots, n_{N-1}\} = \operatorname*{argmax}_{n_i} \sum_{i=0}^{N-1} CM_{i,n_i}, \quad \text{Equation 9}$$

$$\text{w.r., } \begin{cases} n_i \neq n_j, \text{ if } i \neq j \\ CM_{i,n_i} > \min\{CM_{i,n}, n = 0, 1, \ldots, N-1\} \end{cases}$$

If all STAs have the same worst sub-channel, the STA with the maximum SNR at the worst sub-channel among all the STAs may be allocated the sub-channel.

For the EBI algorithm, in addition to maximizing the sum SNR of all STAs and avoiding assigning a STA with its worst sub-channel, the EBI algorithm may schedule at least one of the STAs with its best sub-channel:

$$\{n_0, n_1, \ldots, n_{N-1}\} = \operatorname*{argmax}_{n_i} \sum_{i=0}^{N-1} CM_{i,n_i} \quad \text{Equation 10}$$

$$\text{w.r., } \begin{cases} n_i \neq n_j, \text{ if } i \neq j \\ CM_{i,n_i} > \min\{CM_{i,n}, n = 0, 1, \ldots, N-1\} \\ \{CM_{i,n_i} = \max\{CM_{i,n}, n = 0, 1, \ldots, N-1\}\} \neq \emptyset \end{cases}$$

If all the STAs are experiencing different delay spread channels, and the AP has some knowledge of the channel delay spread, the sub-channel selection strategy may be STAs with different delay spread channels may expect different sub-channel selection gain. In order to maximize the total throughput of COBRA transmission over all the STAs, the AP may select the best channel for the STA with maximum sub-channel selection gain. Then, select the second best channel for the STA with second maximum sub-channel selection gain, and so on.

Figure 8:
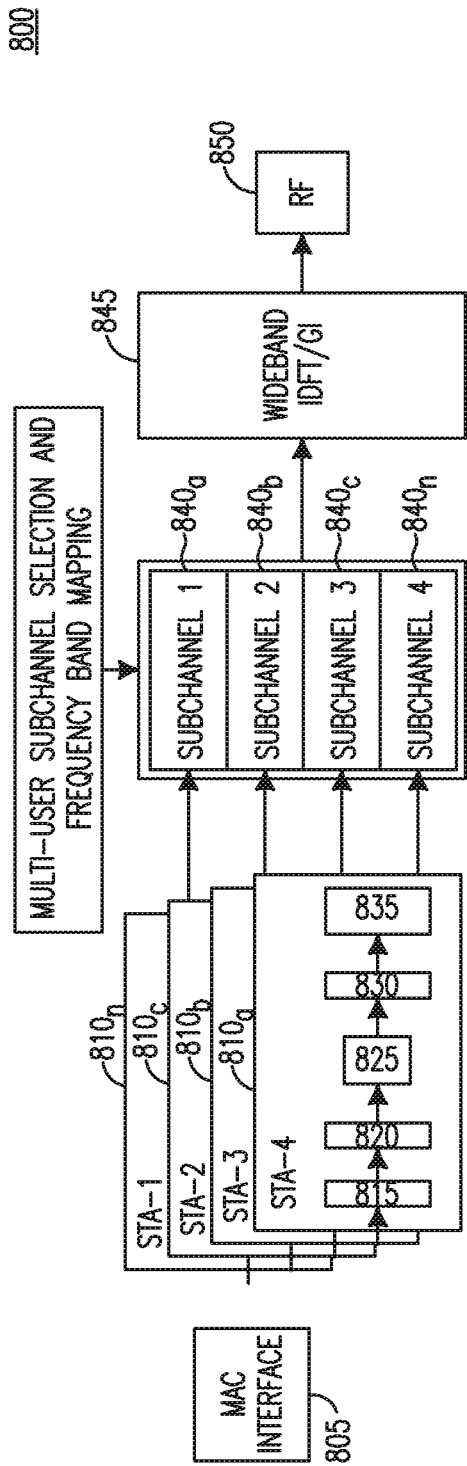
FIG. 8 is a diagram of an example downlink COBRA-capable transmitter.

FIG. 8 is a diagram of an example downlink COBRA-capable transmitter 800. The transmitter may include a MAC interface 805, and one or more processing units 810a-n. The number of processing units may be based on the number of STAs in the COBRA system, and each of the STAs may be assigned a processing unit. Each processing unit 810a-n may include a PHY padding unit 815, a scrambler unit 820, and encoder unit 825, an interleaving unit 830, and a constellation mapping unit 835. The MAC interface 805 may prepare the traffic to be transmitted to the multiple STAs i.e., STAs 1-4, and passes them to the one or more processing units 810a-n, which may be in the PHY layer. For each data stream for each STA, padding may be performed at the PHY padding unit 815, scrambling may be performed at a scrambler unit 820, encoding may be performed at the encoder unit 825, interleaving may be performed at the interleaving unit 830 and constellation mapping may be performed at the constellation mapping unit 835. Based on the multi-user sub-channel selection algorithm, the AP may map data streams from multiple STAs to the selected sub-channels 840a-n. Then, a wideband inverse discrete Fourier transform (IDFT) may be applied for the entire frequency band and GIs may be added at a wideband IDFT/GI adder unit 845. The resulting data flow will be transmitted to the RF frontend 850 for transmission.

Figure 9:
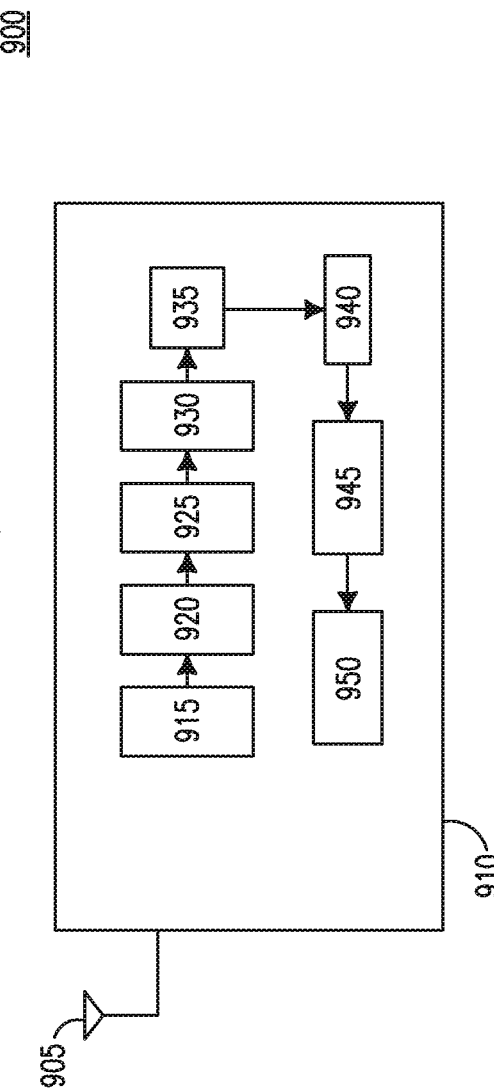
FIG. 9 is a diagram of an example downlink COBRA-capable receiver.

FIG. 9 is a diagram of an example downlink COBRA-capable receiver 900 for STA k. The downlink COBRA-capable receiver 900 may include an antenna 905 and a processing unit 910. The processing unit 910 may include a start-of-packet (SOP) detection unit 915, a GI removal unit 920, a wideband discrete Fourier transform (DFT) unit 925, a frequency band mapping unit 930, a channel estimation (CHEST) unit 935, an equalizer 940, a demapping and deinterleaving unit 945, and a decoder 950. The procedure for STA k may begin with the reception of the wideband signal (for example, the signal across the entire transmitted bandwidth) at the antenna 905, which may be followed by the procedure for start-of-packet (SOP) detection at the SOP detection unit 915. The guard interval may be removed at the GI removal unit 920, followed by a wideband DFT operation at the wideband DFT unit 925. According to the frame exchange before the COBRA session, the AP may signal the sub-channel allocation for this COBRA session. Therefore, STA k may perform frequency band mapping at the frequency band mapping unit 930 and acquire the frequency band signal on its allocated sub-channel(s). This may be followed by channel estimation at the CHEST unit 935, equalization at the equalizer 940, demapping and deinterleaving at the demapping and deinterleaving unit 945, and decoding at the decoder 950.

Simulations to demonstrate the relative performance of the sub-channel selection algorithms described above in an 802.11 system with a single BSS operating on an 80 MHz bandwidth will now be described. In the simulations, the AP may operate on an 80 MHz channel and transmit to and receive from four STAS through COBRA transmission. Each STA may be allocated a 20 MHz sub-channel. The same modulation and coding scheme is assumed for all the STAs. MCS5, which refers to 64 QAM and rate ⅔ convolutional code, may be utilized in all the simulations.

Two simulation scenarios may be defined. In the first simulation scenario, a single data stream may be transmitted to and received from each STA. Thus $N_{ss}=1$, where Nss stands for the number of data streams. Packet size may be 500 bytes. A single antenna may be utilized at both the AP side and STAs side. In the second simulation scenario, two data streams may be transmitted to and received from each STA, thus $N_{ss}=2$. Packet size is 1000 bytes. Both AP and STAs may have two antennae.

Channel models utilized in the simulations may be IEEE 802.11 Channel B and Channel D with root mean square (RMS) delay spread of 15 ns and 50 ns respectively. Both channel models may represent indoor multipath situations. Due to the difference of RMS delay spread, channel D may be more frequency selective than channel B. In addition, random angle of arrivals (AoAs) and random angle of departures (AoDs) may be chosen for different STAs.

In the first simulation scenario, the single data stream case, all the channel metrics may perform in a similar way since they are functions of absolute value of channel coefficients in the frequency domain. Thus, only simulation results using channel metric Mean_SNR may be shown. In the second simulation scenario, where multiple data stream transmission is involved, MIMO channels may be more complicated and many factors may contribute to the final PER vs SNR results, such as absolute value of channel coefficients, condition number of the channel matrix, and the like. The three channel metrics may perform slightly different, however Mean_SNR and Harmonic_Mean_SNR may perform in a similar way.

In order to fully evaluate the proposed sub-channel selection algorithms and COBRA scheme, two benchmark systems may be considered. In benchmark system I, COBRA transmission to four STAs with random sub-channel selection may be used, for example, without sub-channel selection algorithms being applied. In benchmark system II, traditional single STA transmission on an 80 MHz channel may be used. In order to compare the COBRA transmissions, 4 times packet size may be used, for example, 2000 bytes for simulation scenario 1 and 4000 bytes for scenario 2. In this way, the total amount of data payload may be the same for all the schemes.

It may be assumed that the channel is static; therefore the channel used for COBRA data transmission may be the same as that used for sub-channel selection. The AP may have channel state information of all the users and may perform sub-channel selection algorithms.

FIG. 10 is a graphical representation of simulation results of multi-user sub-channel selection with simulation scenario 1 with one data stream transmission in both channel B and channel D. Simulations using the SB, SBI, and EBI sub-channel selection algorithms and without using sub channel selection are shown. The graph shown in FIG. 10 includes an axis representing the packet error rate (PER) and an axis representing SNR measured in decibels (dB). As shown in FIG. 9, the SBI scheme and the EBI scheme perform almost identically. The SBI and EBI schemes are slightly better than that of the SB scheme. As described above, an advantage of SBI and EBI schemes may be to avoid the worst channel for all the users. According to the simulation results, at 1% PER level, proposed sub-channel selection algorithms show 3 to 4 dB gain in channel D and 5 to 6 dB gain in channel B compared to the Benchmark system I where no sub-channel selection algorithm applied.

Sub-channel selection gain in channel B is more significant than that in channel D. Channel D may be more frequency selective than channel B in the sub-carrier level. However, if the Mean_SNR on a 20 MHz sub-channel is used as a measurement, the channel variation of channel B may be more significant than that of channel D. This observation may depend on the size of sub-channel. If the size of sub-channel is continually reduced, the channel variation in channel D, in the sub-channel level, may increase and exceed that in Channel B eventually.

Figure 11:
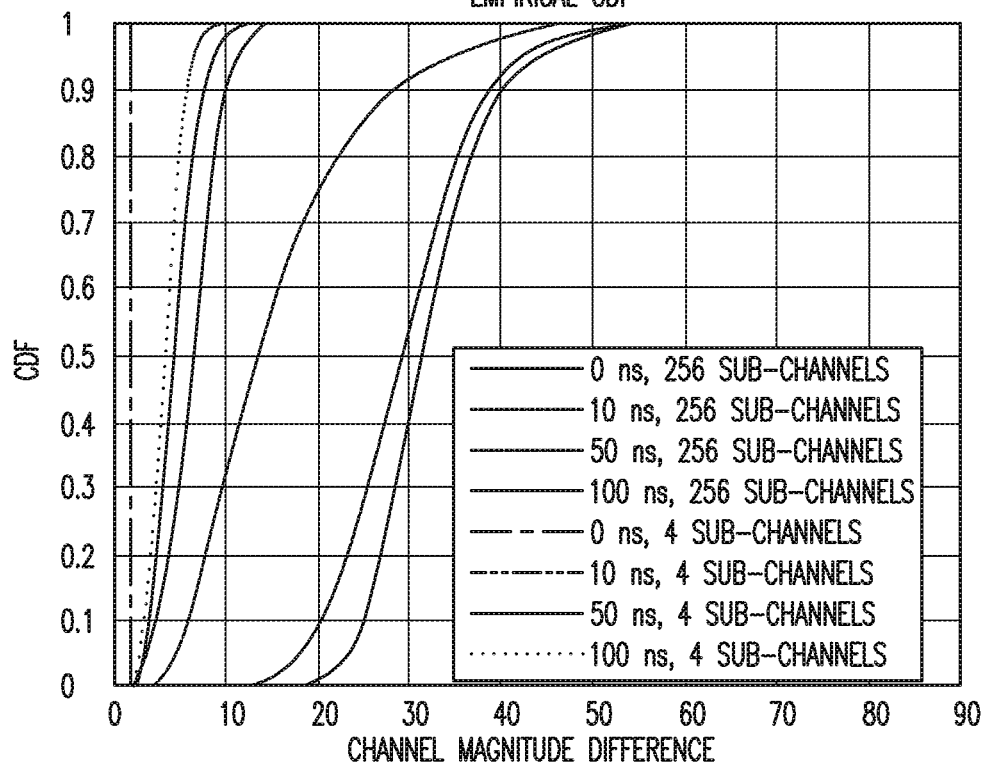
FIG. 11 is a graphical representation of an empirical cumulative distribution function (CDF) of channel magnitude difference over sub-channels.

FIG. 11 is a graphical representation of an empirical cumulative distribution function (CDF) of channel magnitude difference over sub-channels. The graph shown in FIG. 11 includes an axis representing the CDF and an axis representing the channel magnitude difference. FIG. 11 confirms the above observation. The average SNR on each sub-channel may be calculated, and then the difference of maximum SNR and minimum SNR may be recorded. The curves of simple exponential multipath fading channels with RMS delay spread 0 ns, 10 ns, 50 ns and 100 ns, respectively, may be obtained and are shown in FIG. 10. The simulations shown in FIG. 11 are with an 80 MHz channel. With a 256 sub-channel case, each sub-channel may contain one sub-carrier. While in the 4 sub-channel case, each sub-channel is 20 MHz wide, and may contain 64 sub-carriers. According to this observation, with a 20 MHz sub-channel resolution, the multi-user sub-channel diversity may be more significant in the channels with relatively smaller RMS delay spread.

Compared to the benchmark system II, in which the AP transmits to one user using an 80 MHz channel, based on FIGS. 10-11, the proposed COBRA scheme with the sub-channel selection algorithm SBI or EBI is 2 dB better in channel B, and 1.2 dB better in channel D. Narrow band interference is not considered in the simulation. If however narrow band interference was to be considered, more significant performance gains may have been observed by using COBRA sub-channel selection.

Figure 12:
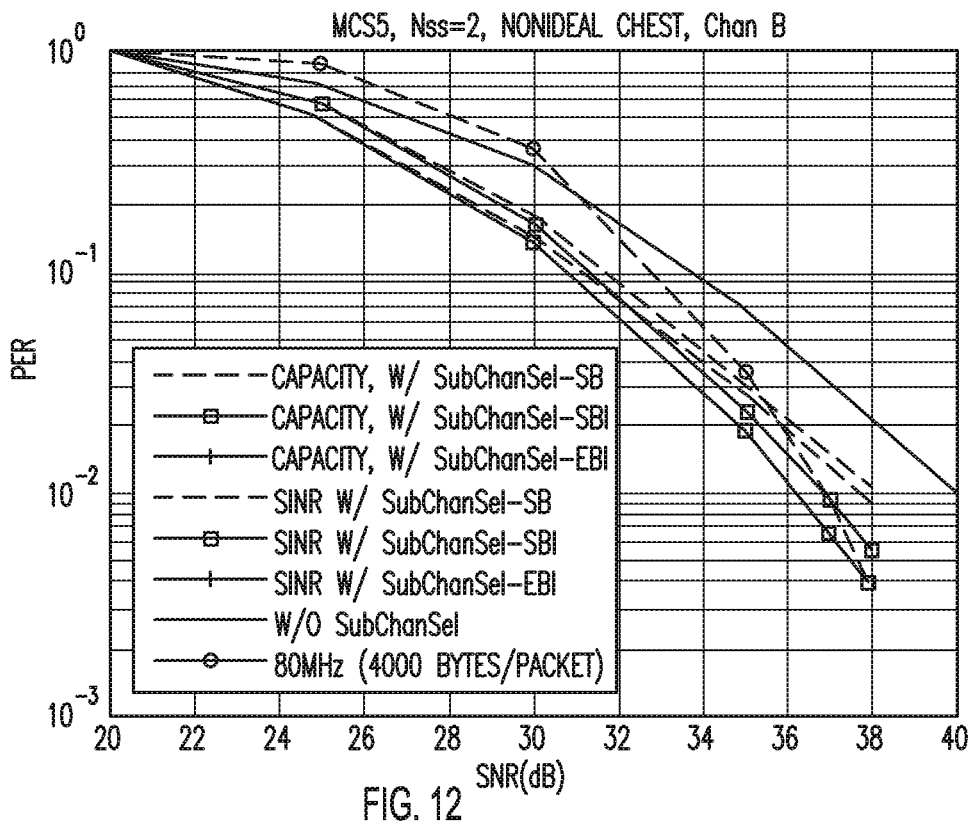
FIG. 12 is a graphical representation of simulation results of multi-user sub-channel selection with two data stream transmission over channel B with simulation scenario 2.

FIG. 12 is a graphical representation of simulation results of multi-user sub-channel selection with two data stream transmission over channel B with simulation scenario 2, the two data stream case. In the two data stream transmission case, due to the inter-stream interference, the post processed SINR may be utilized as a basic unit to calculate Mean_SINR and Harmonic_Mean_SINR. On each sub-carrier, post SINR may be calculated after minimum mean square error (MMSE) equalization at the AP side. Simulations using both capacity based and SINR based SB, SBI, and EBI sub-channel selection algorithms and without using sub channel selection are shown. The graph shown in FIG. 12 includes an axis representing PER and an axis representing SNR measured in dB. Referring to FIG. 12, as in the single data transmission case, SBI and EBI may perform almost the same and slightly better than SB. Capacity based sub-channel selection algorithms may be slightly better than SINR based sub-channel selection algorithms. Utilizing the sub-channel selection algorithm may result in some gain compared to benchmark system I. However, the gain may be less than that observed with single data transmission. Compared to benchmark system II, where COBRA is not utilized and transmission is over the 80 MHz channel, capacity based sub-channel selection algorithms with SBI/EBI show a small gain at one percent PER. Other algorithms may perform similarly or slightly worse than the 80 MHz transmission. This may be reasonable because with two data stream transmission the 2×2 channel matrix (H) determines the performance. Thus, the spatial domain diversity contributes to the final results. Taking the 2×2 spatial diversity into consideration, the frequency diversity over the entire frequency band may become less when compared to the previous case, i.e., a 1×1 channel.

Figure 13:
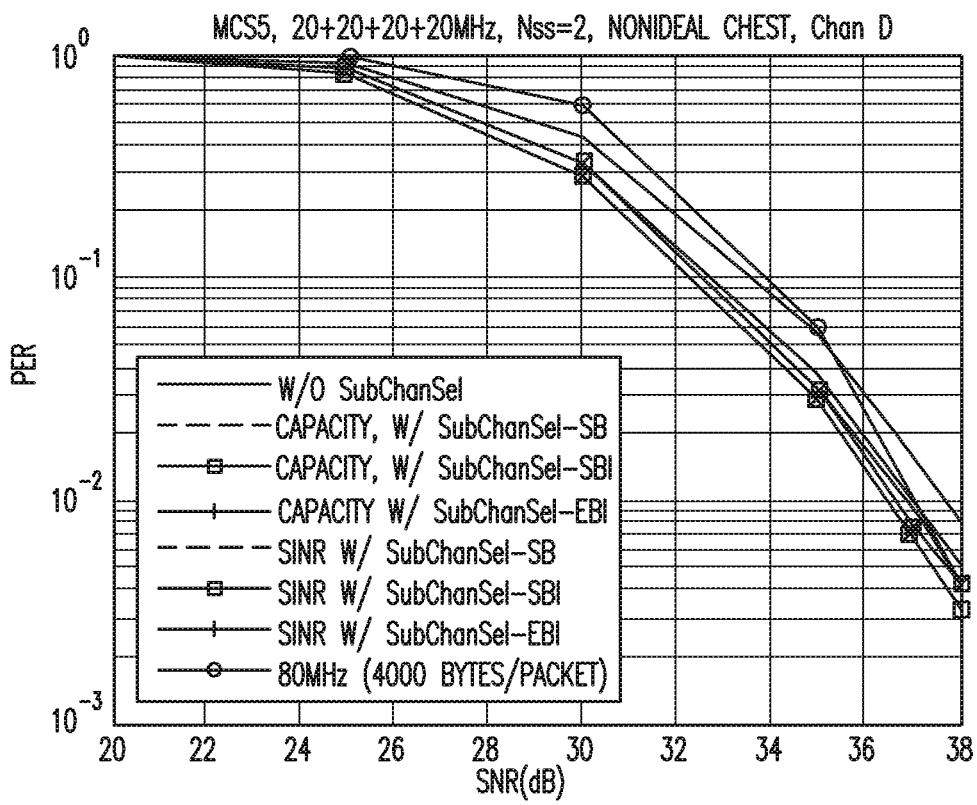
FIG. 13 is a graphical representation of simulation results of multi-user sub-channel selection with two data stream transmission over channel D with simulation scenario 2.

FIG. 13 is a graphical representation of simulation results of multi-user sub-channel selection with two data stream transmission over channel D with simulation scenario 2, the two data stream case. Simulations using both capacity based and SINR based SB, SBI, and EBI sub-channel selection algorithms and without using sub channel selection are shown. The graph shown in FIG. 13 includes an axis representing PER and an axis representing SNR measured in dB. In this example, the capacity based algorithms may be slightly better than SINR based algorithms. Performing sub-channel selection may be better than not performing sub-channel selection. Compared to non-COBRA transmission over the entire 80 MHz channel, the COBRA scheme with capacity based sub-channel selection algorithm SBI/EBI may be slightly better.

Methods to Improve Cobra Efficiency

With normal WiFi systems, the AP and non-AP STAs may have the same priority to compete and acquire the media. When the AP needs to compete with other STAs to acquire the channel, it may be unfair and inefficient for COBRA transmissions. STAs may need to wait for the AP to schedule DL/UL COBRA transmissions and the AP may need to compete with the rest of the STAs to acquire the channel in order to do so. For example, the BSS may have N COBRA capable STAs and N non-COBRA capable STAs. The AP may be competing with N non-COBRA capable STAs, and the chance for COBRA transmission may only be 1/(N+1). Therefore a COBRA capable STA may have 1/[(N+1)N] chance to receive/transmit. Therefore, in order to fully take the advantages of COBRA transmission, an access scheme to improve the channel access fairness and efficiency for COBRA transmission is desired.

Channel access fairness and efficiency for COBRA transmissions may be improved by extending the transmission time or traffic opportunity (TXOP) for COBRA capable STAs once the AP obtains the channel. The concept of TXOP may be introduced as the basic unit of allocation of the right to COBRA transmissions.

COBRA TXOP may be defined by a starting time and a maximum length. The COBRA TXOP may be obtained by the AP winning the channel, then the AP may schedule either DL or UL COBRA transmissions for COBRA capable STAs. Multiple frames may be transmitted during a COBRA TXOP to multiple COBRA capable STAs. These frames may be transmitted to multiple COBRA capable STAs at the same time, at a nearly identical time, or at a staggered time. The AP or COBRA capable STAs may commence transmission of additional frames SIFS after the completion of the current frame exchange sequence, if the duration of transmission of that frame plus any expected acknowledge for that frame is less than the remaining TXNAV timer value.

COBRA TXOP transmission procedures may include two phases: COBRA TXOP initiation phase and COBRA multi-user multi-frame transmission phase. In the COBRA TXOP initiation phase, the COBRA TXOP may be initiated by an AP. The COBRA TXOP limit duration may be advertised by the AP in a COBRA parameter set element in a beacon or probe response frame transmitted by the AP. After acquiring the channel, the AP may initiate the COBRA TXOP using COBRA DL/UL schedule frames, a COBRA RTS frame or a group RTS (G-RTS) frame), a COBRA CTS frame transmitted to itself, a COBRA management frame or MU-PCA management frame, and the like.

In the COBRA multi-user multi-frame transmission phase, the COBRA multi-user multi-frame transmission may occur after the AP acquires the media and initiates the COBRA TXOP. The transmission rules of the COBRA TXOP may follow the normal 802.11 TXOP transmission rules. For example, the AP may assign different MCSs to different STAs on different sub-channels. The AP may also assign different numbers of data streams to different STAs on different sub-channels. The AP may also use different spatial technologies on different STAs on different sub-channels (for example, some STAs may utilize space-time block code (STBC), while other STAs may utilize spatial multiplexing). MU-MIMO may be combined with COBRA. For example, the AP may perform MU-MIMO on sub-channel 1 to multiple STAs. The AP may also utilize different channel coding schemes for different STAs on different sub-channels. Different traffic access categories (AC) may also be allowed to transmit over one COBRA TXOP.

In the examples provided herein, it should be noted that the number of STAs depicted are not intended to be limiting. The examples are provided only for illustrative purposes. Any number of STAs, including additional or less than those depicted in the examples may perform the methods and procedures set forth herein. In addition, the operating channels and allocated frequencies in the examples provided herein are also not intended to be limiting and are provided only for illustrative purposes. For example, the AP may allocate frequency portions, channels, or sub-channels to STAs as described above. The channels may be contiguous or non-contiguous. The carrier blocks (or sub-channels) may be localized or distributed. In addition the STA and AP may operate on various frequencies and channels, as described above.

Figure 14:
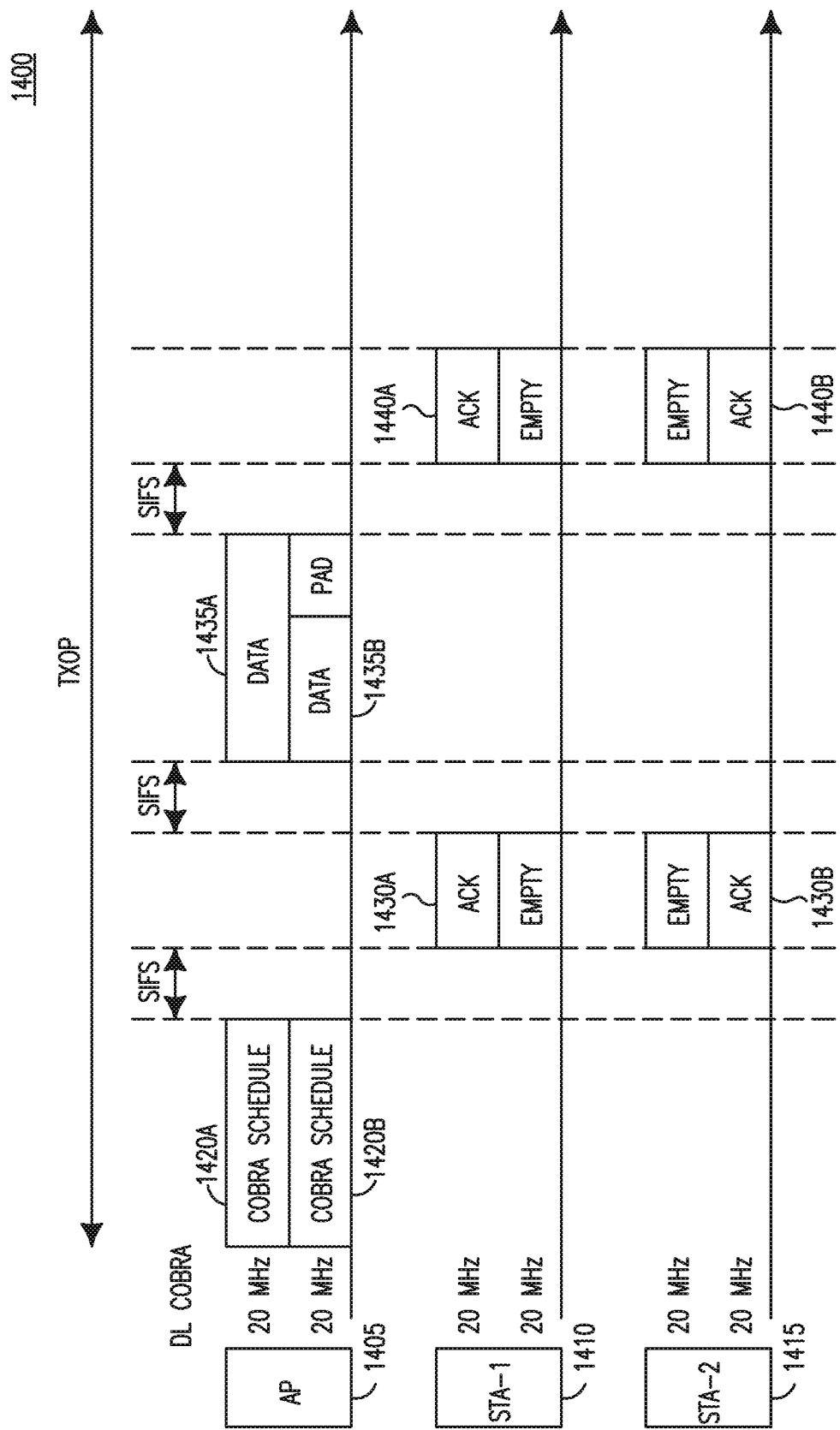
FIG. 14 is a diagram of an example DL COBRA TXOP.

FIG. 14 is a diagram of an example DL COBRA TXOP 1400. In this example, an AP 1405, a STA-1 1410, and a STA-2 1415 are shown. The AP 1405 may be operating on a 40 MHz channel, which may include two 20 MHz sub-channels. It should be noted that this is for illustrative purposes only and the AP may be operating on any channel size or configuration. Once the AP 1405 acquires the channel, the AP 1405 may assign STA-1 1410 to the first 20 MHz sub-channel and STA-2 1415 to the second 20 MHz sub-channel. The AP may assign the channels in accordance with the procedures described above. The AP 1405 may transmit COBRA schedule frame 1420*a* to STA-1 1410 and COBRA schedule frame 1420*b* to STA-2 1415 on their respective 20 MHz sub-channels. The COBRA schedule frames 1420*a*, 1420*b* may be repeated with or without phase rotation on all of the sub-channels. In order to make the transmission of the COBRA schedule frames 1420*a*, 1420*b* reliable, the AP 1405 may utilize a lower MCS. STA-1 1410 and STA-2 1415 may confirm by transmitting ACK frames 1430*a*, 1430*b* to the AP 1405 on their assigned sub-channels. This exchange between the AP 1405 and STA-1 1410 and STA-2 1415 of COBRA schedule frames 1420*a*, 1420*b* and ACK frames 1430*a*, 1430*b* may be considered the COBRA TXOP initiation phase. The duration field of the frames used to initiate the COBRA TXOP, the COBRA schedule frames and the following ACK frames in this example, may be set to cover the entire TXOP. Alternatively, the AP may reset the NAV by utilizing the duration field on each frame transmitted within the TXOP. Once the COBRA TXOP initiation phase is complete, the AP 1405 may commence the COBRA multi-user multi-frame transmission phase by transmitting DL packets 1435*a*, 1435*b* to STA-1 1410 and STA-2 1415, respectively. As shown in FIG. 14, the DL data packet 1435*a* intended for STA-1 1410 is larger than the DL packet 1435*b* intended for STA-2 1415. The AP 1405 may pad zeroes in the tail of DL packet 1435*b* to align the packet size with DL packet 1435*a* in order to keep control of the TXOP over all sub-channels. STA-1 1410 and STA-2 1415 may confirm by transmitting ACK frames 1440*a*, 1440*b* to the AP 1405 on their assigned sub-channels. This process continues until the TXOP is complete, e.g., more data packets may be transmitted in a similar fashion until the TXOP ends. It should be noted that the packets transmitted within a TXOP are typically separated by a small time duration, such as SIFS, so that the unintended STAs may not have a chance to break the TXOP. A SIFS is used for illustrative purposes only, and additional time durations may also be used.

Figure 15:
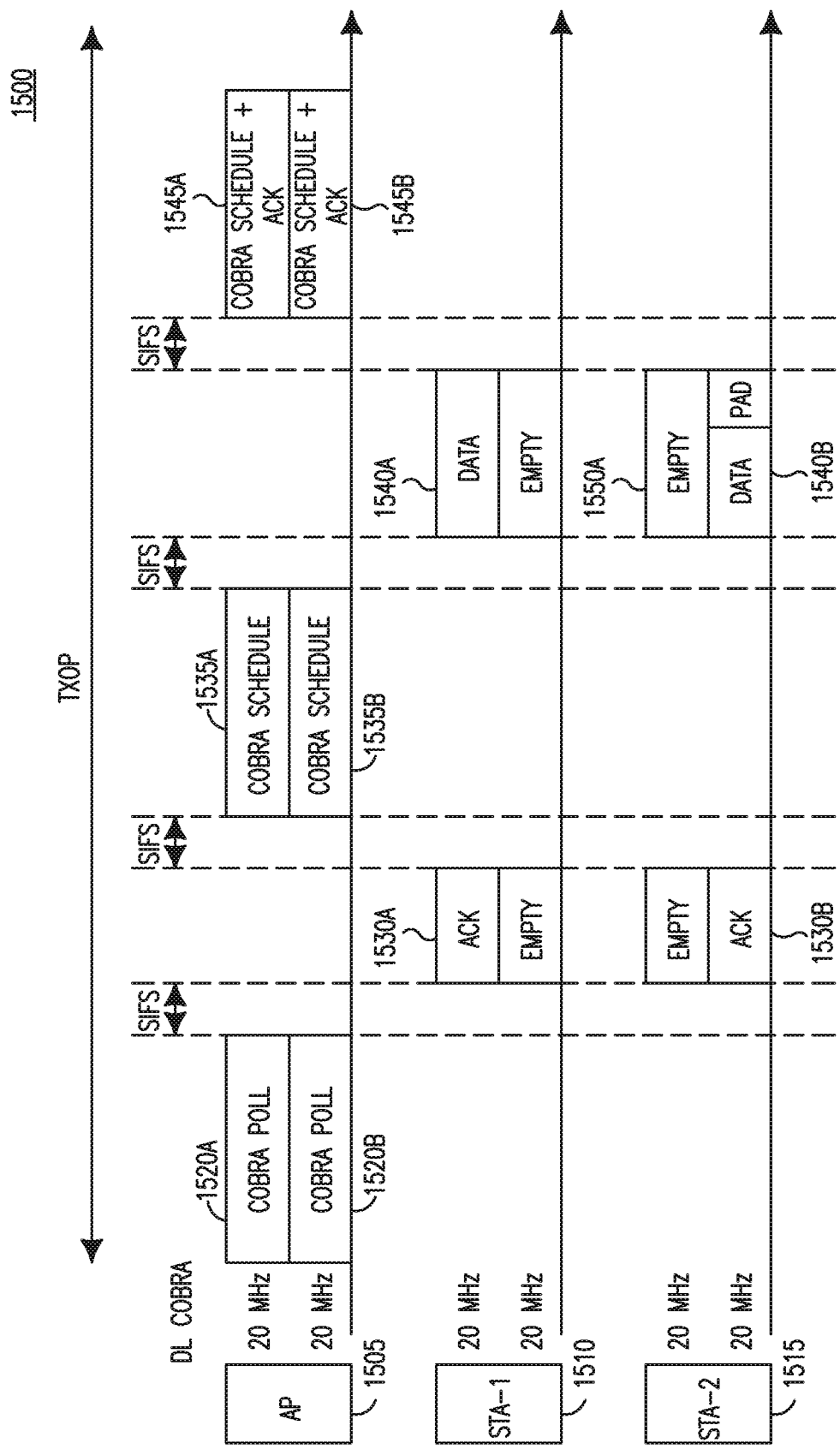
FIG. 15 is a diagram of an example UL COBRA TXOP.

FIG. 15 is a diagram of an example UL COBRA TXOP 1500. In this example, an AP 1505, a STA-1 1510, and a STA-2 1515 are shown. As in the DL COBRA TXOP, the AP 1505 may be operating on a 40 MHz channel, which may include two 20 MHz sub-channels. It should be noted that this is for illustrative purposes only and the AP may be operating on any channel size or configuration. Once the AP 1505 acquires the channel, it may assign the two sub-channels to STA-1 1510 and STA-2 1515, respectively. To assign the two sub-channels, the AP 1505 may perform a polling procedure. The AP 1505 may transmit COBRA polling frame 1520*a* to STA-1 1510 and COBRA polling frame 1520*b* to STA-2 1515 on their assigned 20 MHz sub-channels. STA-1 1510 and STA-2 1515 may each transmit ACK frames 1530*a*, 1530*b* to the AP 1505. The ACK frames 1530*a*, 1530*b* may contain the corresponding uplink traffic information, such as packet length, QoS requirements and the like. After receiving the ACK frames 1530*a*, 1530*b*, the AP 1505 may transmit COBRA schedule frames 1535*a*, 1535*b* to STA-1 1510 and STA-2 1515. The COBRA schedule frames 1535*a*, 1535*b* may announce the maximum packet size of the upcoming uplink COBRA transmissions, and packet sizes of each STA. The exchange of COBRA polling frames, ACKs, and COBRA schedule frames may be considered the COBRA TXOP initiation phase in the uplink. The duration field of the frames used to initiate the COBRA TXOP, COBRA polling frames and corresponding ACK frames in this example, may be set to cover the entire TXOP. Alternatively, the AP 1505 may reset the NAV by utilizing the duration field on each frame transmitted within the TXOP. Once the COBRA TXOP initiation phase is complete, STA-1 1510 and STA-2 1515 may commence the COBRA multi-user multi-frame transmission phase by transmitting UL data packets 1540*a*, 1540*b* to AP 1505. As shown in FIG. 15, STA-2 1515 transmits relatively smaller packets to the AP 1505 when compared to the maximum packet size. As a result, STA-2 1515 may pad zeroes to the tail of the packet to align the packet size with that of other STAs, here STA-1 1510. If padding is not performed, it may be difficult for the AP 1505 to keep the control of the TXOP over all the sub-channels. If the AP 1505 receives UL data packets 1540*a* and 1540*b*, the AP 1505 may transmit an ACK with the next COBRA schedule frames 1545*a*, 1545*b* to STA-1 1510 and STA-2 1515. Although not shown in this example, the AP may alternatively transmit an ACK without the next COBRA schedule frames. In this case, the AP may perform another polling procedure or terminate the TXOP.

At least two different types of COBRA schedule frame formats may be used. For example, the COBRA schedule frame may contain information of several upcoming packets or all the transmission packets within the whole TXOP. In this case, the AP may transmit an ACK to each STA after successfully receiving the packet or transmit a NACK if failing to receive the packet. In another example, the COBRA schedule frame may only contain the information of upcoming packets. As a result, the ACK or NACK may be transmitted back with the next COBRA schedule frame as shown in FIG. 15 and as described above.

In existing WLAN TXOP systems, a STA may perform a point coordination function inter-frame space (PIFS) recovery or a backoff as a response to a transmission failure within a TXOP. In this way, a STA which is not involved in the TXOP transmission may not be able to interrupt the existing TXOP, since it has to wait a distributed inter-frame space (DIFS) before it may perform normal backoff for contention. For reference, a DIFS is longer than PIFS. With COBRA transmissions, the AP may schedule multiple users to share the entire bandwidth in the frequency domain. For example, each STA may be allocated to one or more sub-channels. Therefore, the AP may intend to maintain the continuity of COBRA TXOP transmissions over all of the sub-channels. With current WLAN systems, devices may not be able to transmit and receive simultaneously, for example, the AP may not be able to begin a new transmission to one STA on one or more sub-channels while another STA is transmitting an ACK back to the AP. As a result, using a PIFS recovery to maintain the TXOP may not be possible with respect to a COBRA TXOP. Thus, procedures to combat transmission failures in COBRA TXOPs are desirable.

Transmission failures may occur in the DL COBRA TXOP. For example, in the COBRA TXOP initiation phase, one or more STAs may not receive the COBRA schedule frame, due to poor channel status or interference. In addition, the COBRA schedule frame may not be received if a STA is out of scope. In the COBRA transmission phase, the downlink transmission in one or more sub-channels within the TXOP may fail. Similarly, transmission failures in UL COBRA may be the result of a STA failing to receive the COBRA poll frame transmitted by the AP due to channel status. The STA may also fail to receive the COBRA poll frame if the STA is out of scope. The STA may also fail to receive a COBRA schedule frame from the AP in COBRA UL. Additionally, an uplink transmission in certain sub-channels within a TXOP may fail.

NACK frames and several procedures which may be utilized in COBRA TXOP to address the transmission failures and maintain the COBRA TXOP will now be described.

Figure 16:
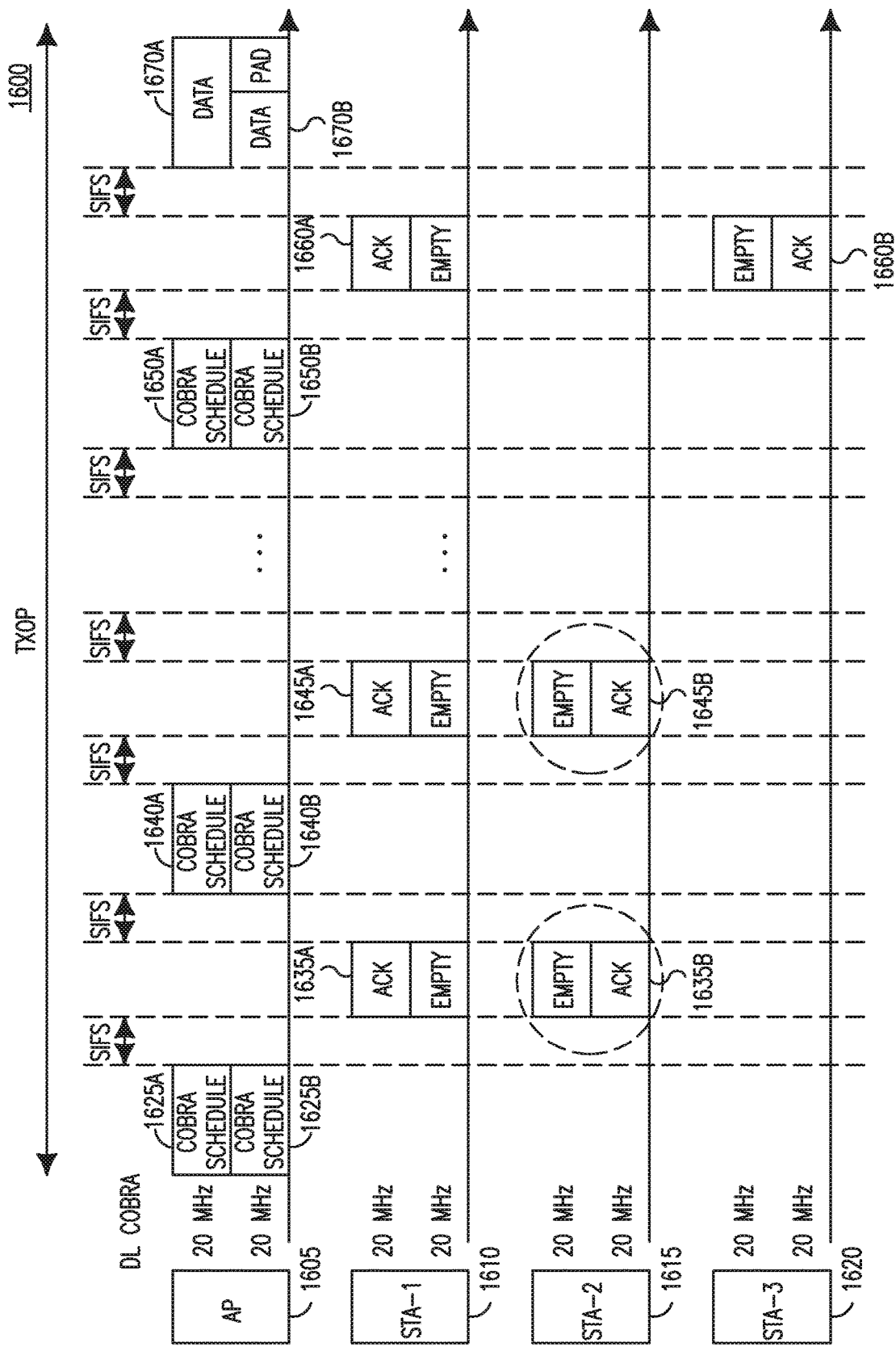
FIG. 16 is a diagram of an example transmission failure of COBRA schedule information in DL COBRA.

FIG. 16 is a diagram of an example transmission failure of COBRA schedule information in DL COBRA 1600. In this example, an AP 1605, a STA-1 1610, a STA-2 1615 and a STA-3 1620 are shown. The AP 1605 may be operating on a 40 MHz channel, which may include two 20 MHz sub-channels. It should be noted that this is for illustrative purposes only and the AP may be operating on any channel size or configuration. Once the AP 1605 acquires the channel, the AP 1605 may assign STA-1 1610 to the first 20 MHz sub-channel and STA-2 1615 to the second 20 MHz sub-channel. The AP may assign the channels in accordance with the procedures described above. The AP 1605 may transmit COBRA schedule frame 1625*a* to STA-1 1610 and COBRA schedule frame 1625*b* to STA-2 1615 on their respective 20 MHz sub-channels. After a SIFS, the AP 1605 receives an ACK 1635*a* from STA-1, but fails to receive an ACK 1635*b* from STA-2 1615. As a result, the AP 1605 may retransmit COBRA schedule frame 1640*a* to STA-1 1610 and COBRA schedule frame 1640*b* to STA-2 1615. If the AP 1605 receives an ACK 1645*a* from STA-1 1610, but again fails to receive an ACK 1645*b* from STA-2 1615 before the retransmission time achieves the maximum predetermined value, the AP 1605 may choose to schedule the sub-channel previously assigned to STA-2 1615 to another STA, here STA-3 1620, by transmitting COBRA schedule frame 1650*a* to STA-1 1610 and COBRA schedule frame 1650*b* to STA-3 1620. Upon receiving an ACK 1660*a*, 1660*b* from both STAs, the AP 1605 may transmit DL data packet 1670*a* to STA-1 1610 and DL data packet 1670*b* to STA-3 1620. The AP 1605 may pad zeroes in the tail of DL data packet 1670*b* intended for STA-3 1620 to align the packet size with DL data packet 1670*a* intended for STA-1 1610 in order to keep control of the TXOP over all sub-channels. It should be noted that the AP may perform more or less retransmissions of the COBRA schedule frames before rescheduling the sub-channel or frequency resource.

Alternatively, if there is no additional STA waiting for transmission, the AP may choose to work on a narrow band, or allocate STA-1 (i.e., the STA with ACK feedback) to the entire bandwidth. For example, if there are only two STAs, STA-1 and STA-2, waiting for transmission and the AP fails to set up connection with one of the STAs (i.e., STA-2), the AP may choose to only operate on the primary 20 MHz sub-channel and keep the TXOP for STA-1. Alternatively, the AP may allocate the entire 40 MHz channel to STA-1 if STA-1 is capable of operating on the 40 MHz bandwidth.

Figure 17:
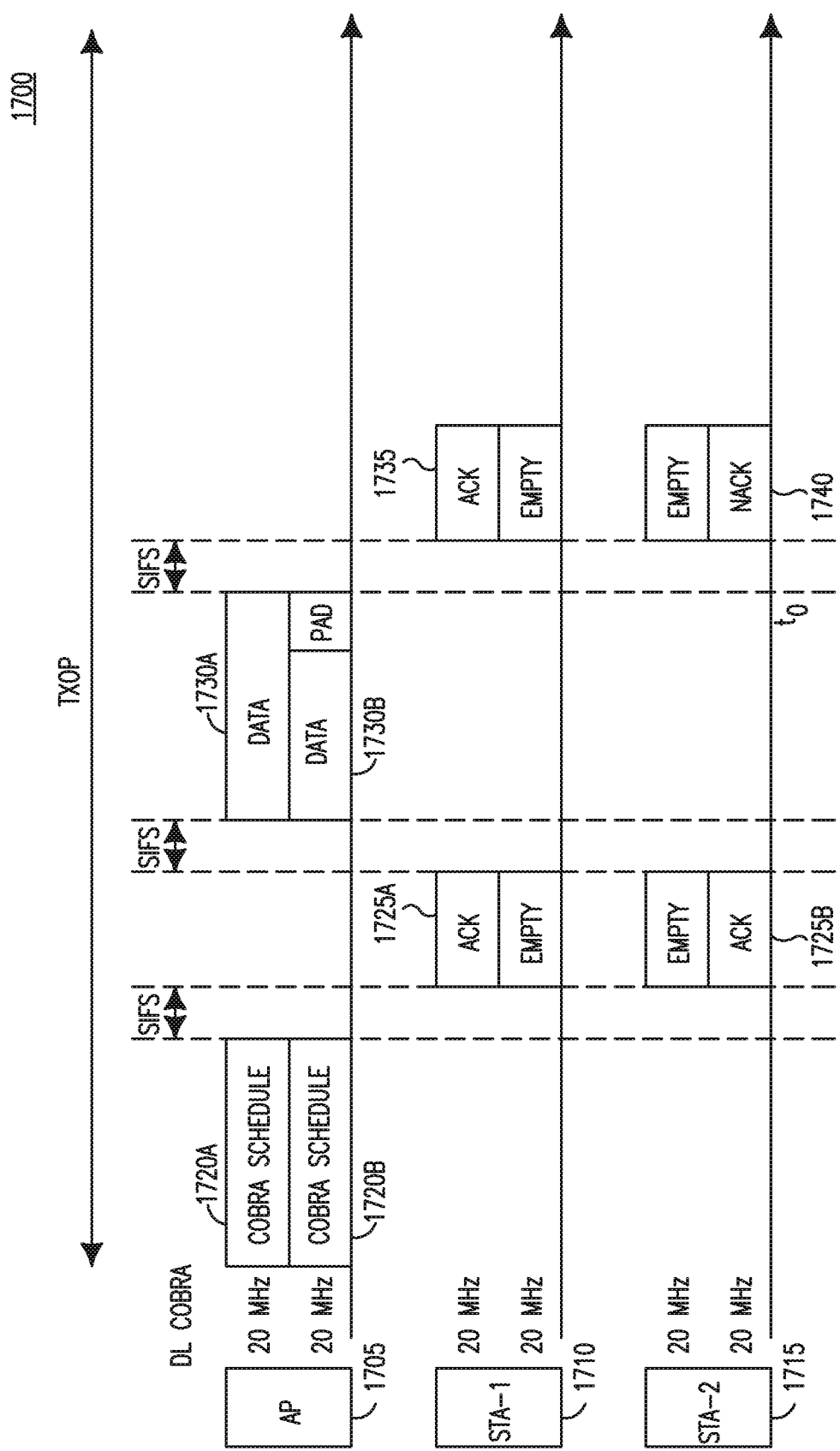
FIG. 17 is a diagram of an example transmission failure in one of the sub-channels in DL COBRA.

FIG. 17 is a diagram of an example transmission failure in one of the sub-channels in DL COBRA 1700. In this example, an AP 1705, a STA-1 1710 and a STA-2 1715 are shown. The AP 1705 may be operating on a 40 MHz channel, which may include two 20 MHz sub-channels. It should be noted that this is for illustrative purposes only and the AP may be operating on any channel size or configuration. Once the AP 1705 acquires the channel, the AP 1705 may assign STA-1 1710 to the first 20 MHz sub-channel and STA-2 1715 to the second 20 MHz sub-channel. The AP may assign the channels in accordance with the procedures described above. The AP 1705 may transmit a COBRA schedule frames 1720*a*, 1720*b* to STA-1 1710 and STA-2 1715 on their respective 20 MHz sub-channels. The COBRA schedule frames 1720*a*, 1720*b* may include data packet size information and may indicate when each STA is expected to receive their respective data packets. STA-1 1710 and STA-2 1715 may confirm by transmitting ACKs 1725*a*, 1725*b* to the AP 1705. The AP 1705 may then transmit DL packets 1730*a* to STA-1 1710 and 1730*b* to STA-2 1715. As shown in FIG. 17, the DL data packet 1730*a* intended for STA-1 1710 is larger than the DL data packet 1730*b* intended for STA-2 1715. The AP 1705 may pad zeroes in the tail of DL data packet 1730*b* to align the packet size with DL data packet 1730*a* in order to keep control of the TXOP over all sub-channels. In this example, COBRA schedule frames 1720*a*, 1720*b* indicated that both STA-1 1710 and STA-2 1715 are expected to receive their respective data packets at time $t_0$. If one or more STAs have not received the packet by the time indicated in the COBRA schedule frame, the STAs may transmit back a NACK frame to the AP. This may occur a SIFS after $t_0$. In this example shown in FIG. 17, STA-1 1710 receives DL data packet 1730*a* by $t_0$. Therefore, STA-1 1710 sends ACK 1735 to AP 1705 to confirm. STA-2 1715, however does not receive DL data packet 1730*b* by $t_0$ and sends NACK 1740 to AP 1705.

In the event of such a transmission failure, the AP may employ various options. For example, the AP may choose to transmit the DL data packets to the same group of STAs as in the previous transmission. Prior to transmitting the DL data packets, the AP may choose to modify the channel assignment for the group of STAs. The transmission to the group of STAs which failed to receive the previous DL data packets may be retransmissions of the previous data packet or may be new transmissions. However, it should be noted that retransmissions may be scheduled later to achieve better time diversity.

Alternatively, the AP may transmit to a different group of STAs other than the previous transmission. The different group of STAs may have overlap with the previous group of STAs. For example, the AP may transmit to STA-1, a member of a previous group of STAs which successfully received the DL data packet, and STA-3, a STA that was not in the original group of STAs. Alternatively, if STA-1 successfully received the DL data packet in a first transmission, the AP may transmit to STA-2, the member in the previous group of STA which failed, and STA-3, a new STA. In this case, the transmission to STA-2 may be a retransmission or a new transmission. The sub-channel assignment for the new group of STAs may be independent of the previous transmission. Alternatively, the AP may transmit to one STA using the entire bandwidth, of may choose to transmit to a certain number of STAs of the group of STAs using only a part of the bandwidth, e.g., the AP may transmit to STA-1 using a 20 MHz sub-channel only. It should be noted that these transmission failure methods and procedures described herein may be used in any of the examples described herein with respect to both uplink and downlink transmission failures.

Figure 18:
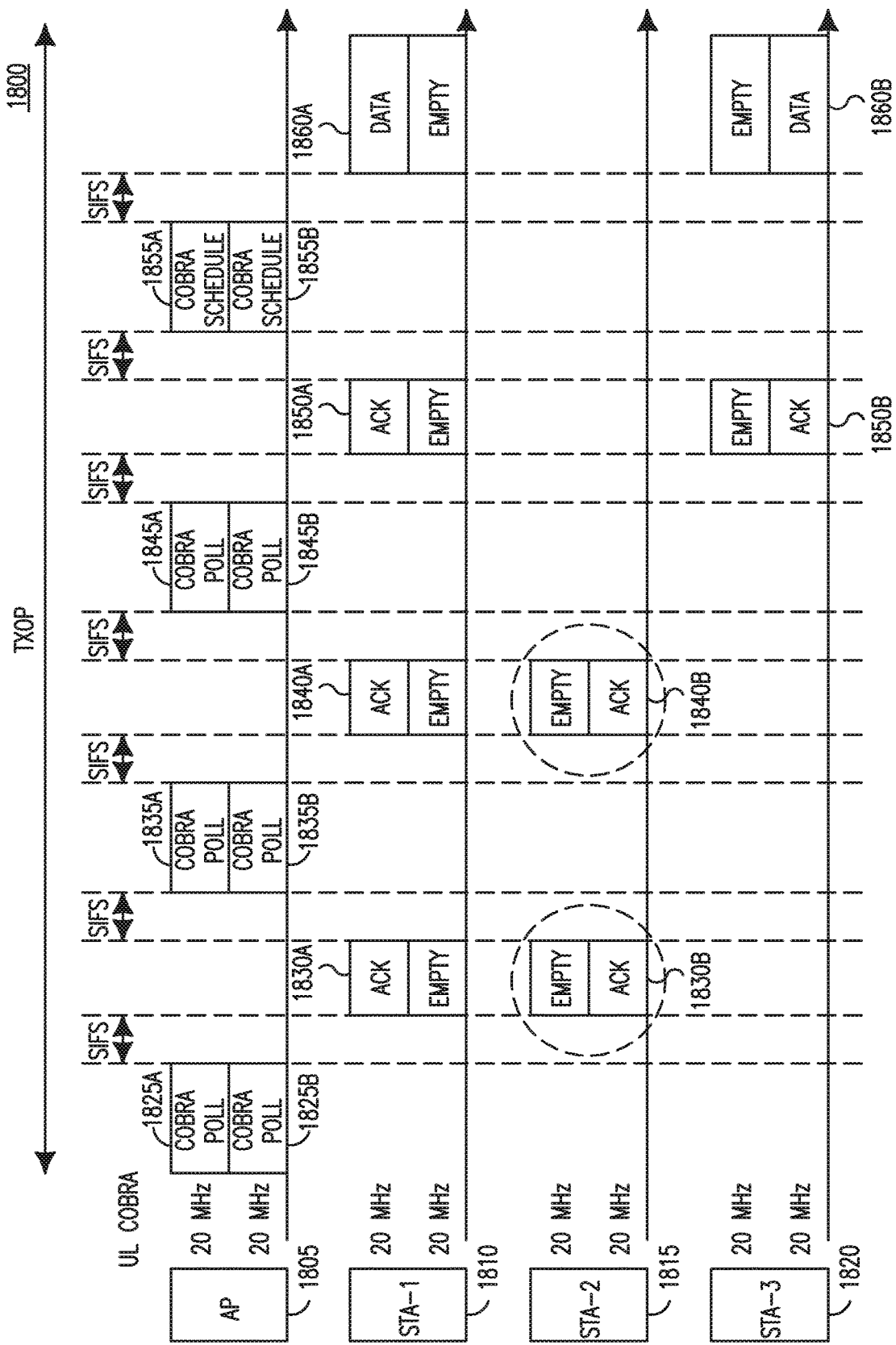
FIG. 18 is a diagram of an example transmission failure of COBRA poll information in UL COBRA.

FIG. 18 is a diagram of an example transmission failure of COBRA poll information in UL COBRA 1800. In this example, an AP 1805, a STA-1 1810, a STA-2 1815 and a STA-3 1820 are shown. The AP 1805 may be operating on a 40 MHz channel, which may include two 20 MHz sub-channels. Once the AP 1805 acquires the channel, it may attempt to assign the two sub-channels to STA-1 1810 and STA-2 1815, respectively. To assign the two sub-channels, the AP 1805 may perform a polling procedure. The AP 1805 may transmit COBRA polling frame 1825*a* to STA-1 1810 and COBRA polling frame 1825*b* to STA-2 1815 on their assigned 20 MHz sub-channels. STA-1 1810 and STA-2 1815 may each transmit ACK frames 1830*a*, 1830*b* to the AP 1805. In this example, the AP 1805 fails to receive ACK 1830*b* from STA-2 1815. In this case, the AP 1805 may transmit COBRA polling frames 1835*a*, 1835*b* to STA-1 1810 and STA-2 1815. Again, in response, STA-1 1810 and STA-2 1815 may each transmit ACK frames 1840*a*, 1840*b* to the AP 1805.

If the AP still doesn't receive an ACK from one or more STAs, and a retransmission time achieves a maximum predetermined value the AP may choose to poll another STA. In this example, the AP 1805 again fails to receive ACK 1840*b* from STA-2 1815. As a result, the AP 1805 performs another polling procedure and transmits COBRA polling frame 1845*a* to STA-1 1810 and COBRA polling frame 1845*b* to STA-3 1820. STA-1 1810 and STA-3 1820 may each transmit ACK frames 1850*a*, 1850*b* to the AP 1805. If both ACK frames 1850*a*, 1850*b* are successfully received, the AP 1805 may then transmit COBRA schedule frames 1855*a*, 1855*b* to STA-1 1810 and STA-3 1820. STA-1 1810 and STA-3 1820 may transmit UL packets 1860*a*, 1860*b* to AP 1805 as scheduled.

It should be noted that the AP may perform more or less retransmissions of the COBRA polling frames before rescheduling the sub-channel or frequency resource. Alternatively, if there is no additional STA waiting for transmission, the AP may choose to work on narrow band, or allocate the entire bandwidth to the STA with ACK feedback.

Figure 19:
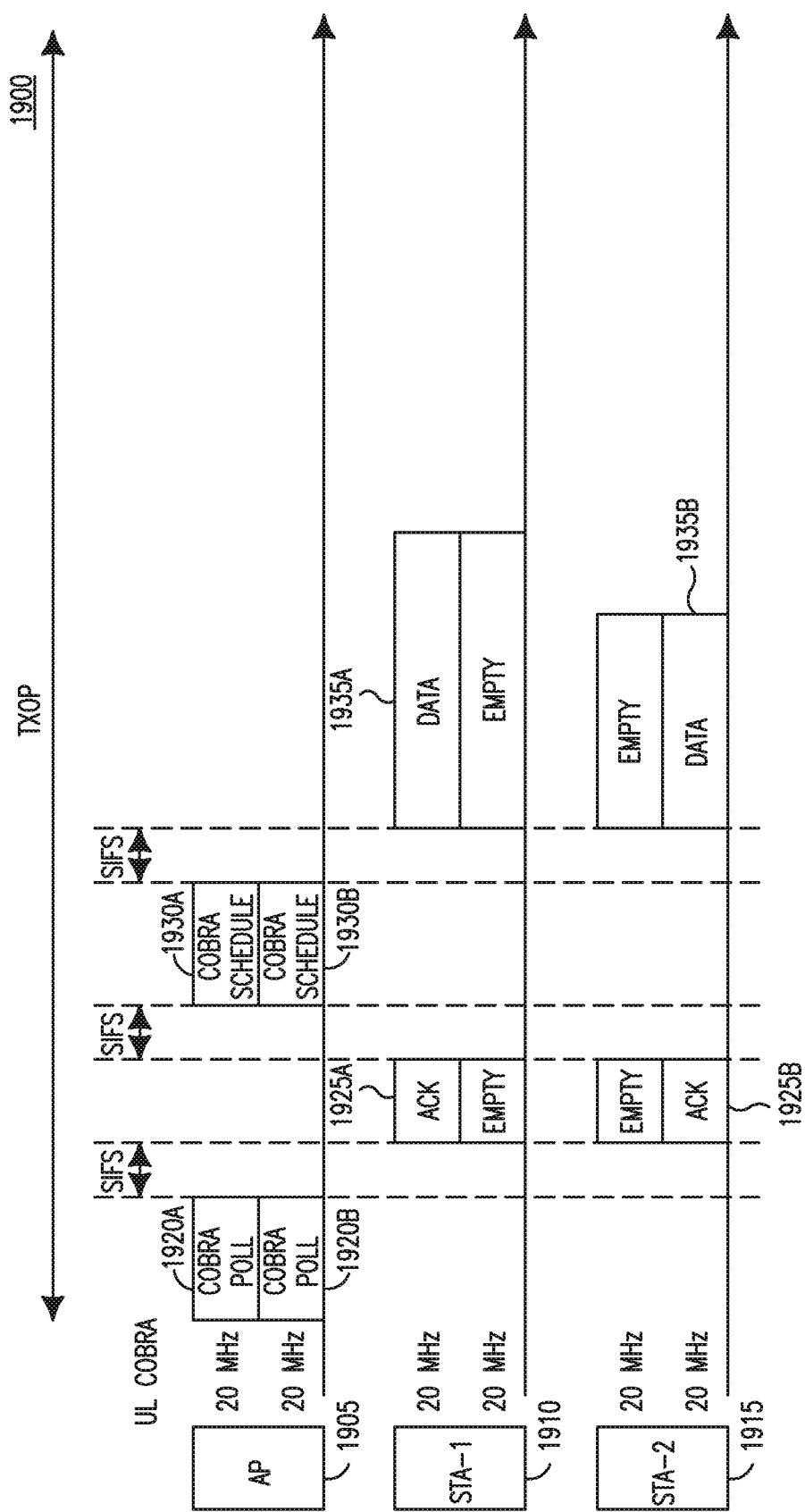
FIG. 19 is a diagram of an example transmission failure of COBRA schedule information in UL COBRA.

FIG. 19 is a diagram of an example transmission failure of COBRA schedule information in UL COBRA 1900. In this example, an AP 1905, a STA-1 1910 and a STA-2 1915 are shown. The AP 1905 may be operating on a 40 MHz channel, which may include two 20 MHz sub-channels. It should be noted that this is for illustrative purposes only and the AP may be operating on any channel size or configuration. Once the AP 1905 acquires the channel, it may attempt to assign the two sub-channels to STA-1 1910 and STA-2 1915, respectively. To assign the two sub-channels, the AP 1905 may perform a polling procedure. The AP 1905 may transmit COBRA polling frame 1920a to STA-1 1910 and COBRA polling frame 1920b to STA-2 1915 on their assigned 20 MHz sub-channels. STA-1 1910 and STA-2 1915 may each transmit ACK frames 1925a, 1925b to the AP 1905. If both ACK frames are received successfully, the AP 1905 may then transmit COBRA schedule frames 1930a, 1930b to STA-1 1910 and STA-2 1915. If one of the STAs does not receive the COBRA schedule frame, the STA and AP may follow one of the following procedures.

In this example, STA-2 1915 fails to receive COBRA schedule frame 1930b, whereas STA-1 1910 correctly receives COBRA schedule frame 1930a and will therefore transmit UL packet 1935a to AP 1905. If the COBRA schedule frames 1930a, 1930b are within a fixed length, as shown in the example provided in FIG. 19, STA-2 1915 may know the expected time to start transmitting its UL data packet 1935b. Therefore, the STA-2 1915 may continue transmitting the UL data packet 1935b as expected. However, because STA-2 1915 did not receive COBRA schedule frame 1930b, STA-2 1915 is unaware of the information regarding the maximum packet size carried in COBRA schedule frame 1930b. Therefore, STA-2 1915 may not be able to pad zeroes to the end of UL packet 1935b to align its packet size with that with UL packet 1935a transmitted by STA-1 1910. In this case, AP 1905 may be at risk of losing the media of the sub-channel allocated to STA-2 1905.

Alternatively, the STA which fails to receive the COBRA schedule frame may choose to do nothing. In this case, an unintended STA may transmit over the corresponding sub-channel(s), and as a result, the AP may lose control of the sub-channel(s). To combat this situation, the AP may monitor the sub-channels when it receives UL packets from other STAs scheduled for transmission. If the sub-channels are free for a certain period, for example, DIFS time before the next packet expected to be transmitted from the AP if the COBRA TXOP is not lost, the AP may resume the COBRA TXOP. Otherwise, the AP may choose to terminate the current COBRA TXOP or continue the COBRA TXOP on the unaffected sub-channels.

Figure 20:
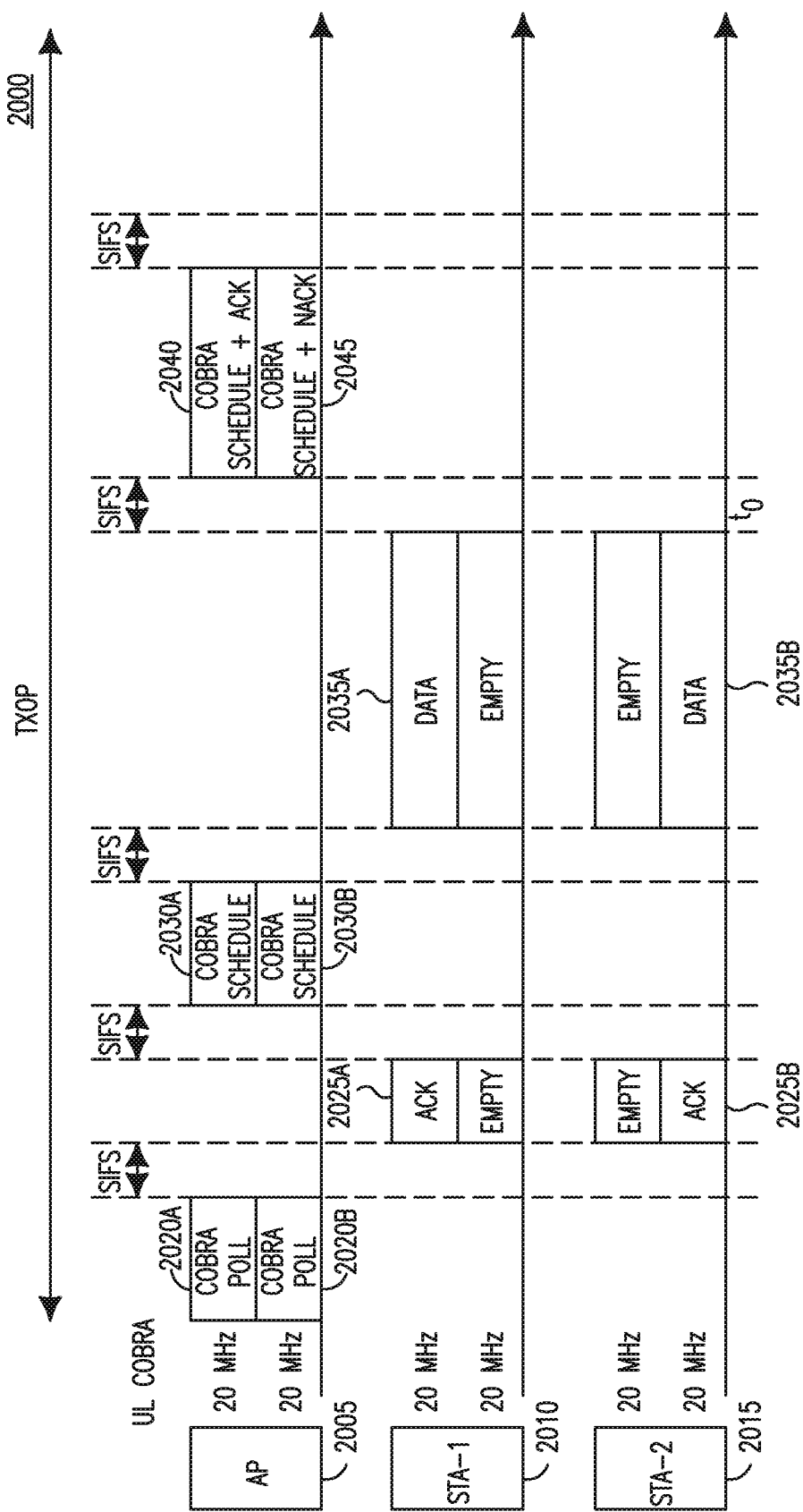
FIG. 20 is a diagram of an example transmission failure in one of the sub channels in UL COBRA.

FIG. 20 is a diagram of an example transmission failure in one of the sub channels in UL COBRA 2000. In this example, an AP 2005, a STA-1 2010 and a STA-2 2015 are shown. The AP 2005 may be operating on a 40 MHz channel, which may include two 20 MHz sub-channels. Once the AP 2005 acquires the channel, it may attempt to assign the two sub-channels to STA-1 2010 and STA-2 2015, respectively. To assign the two sub-channels, the AP 2005 may perform a polling procedure. The AP 2005 may transmit COBRA polling frame 2020a to STA-1 2010 and COBRA polling frame 2020b to STA-2 2015 on their assigned 20 MHz sub-channels. STA-1 2010 and STA-2 2015 may each transmit ACK frames 2025a, 2025b to the AP 2005. If both ACK frames are received successfully, the AP 2005 may then transmit COBRA schedule frames 2030a, 2030b to STA-1 2010 and STA-2 2020. STA-1 2010 and STA-2 2015 may transmit UL data packets 2035a, 2035b to AP 2005 as scheduled. If the AP has not received the packet from one or more STAs at expected time, it may transmit back a NACK frame or a NACK frame with COBRA schedule information to the one or more STAs a SIFS after time $t_0$. In this example, AP 2005 receives UL data packet 2035a from STA-1 2010, but does not receive UL data packet 2035b from STA-2. As a result, the AP 2005 may transmit an ACK with the next COBRA schedule frame 2040 to STA-1 2010 and a NACK with the next COBRA schedule frame 2045 to STA-2 2015. The AP may employ any of the methods described herein that may occur after the transmission failure.

Figure 21:
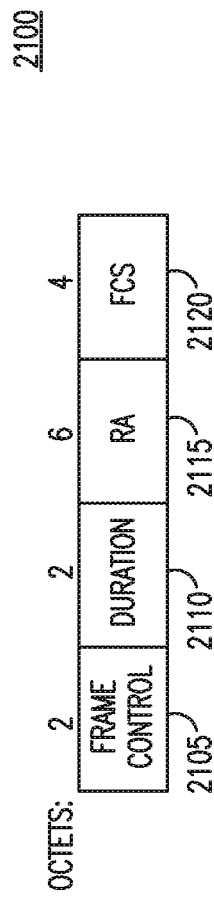
FIG. 21 is a diagram of an example NACK control frame.

FIG. 21 is a diagram of an example NACK control frame 2100 that may be used in the methods described heretofore. The NACK control frame 2100 may be identified by a combination of its type, subtype, or extension field. Referring to FIG. 21, the NACK control frame 2100 may include a frame control field 2105, a duration field 2110, a receiver address (RA) field 2115, and a frame check sequence (FCS) field 2120.

In the frame control field 2105, the type and the subtype fields may indicate that the frame is a NACK frame. In another design, the frame control field 2105, or another field in the frame, or the PLOP/MAC header may contain an extension field indicating the frame is NACK frame. Such an extension field may be interpreted independently, or in combination with the type and/or subtype field. The type of NACK frame may be set as management, control, data or extension.

In the duration field 2110, single protection settings for both TXOP and non-TXOP holders may be included. For example, if a failed receiving frame is the final frame in a TXOP or the subsequent transmission or retransmission of that frame plus any expected acknowledgement for that frame is larger than the remaining TXNAV timer value, the duration field 2110 may be set to 0. Otherwise, the duration field 2010 may be set as the time required to transmit or retransmit that frame, including any expected acknowledgement for that frame.

Alternatively, in the duration field 2110, multiple protection settings for TXOP holder, e.g., the AP, and for non-TXOP holders, e.g., STAs, may be included.

For example, for a TXOP holder, if a failed receiving frame is the final frame in a TXOP or the subsequent transmission or retransmission of that frame plus any expected acknowledgement for that frame is larger than the remaining TXNAV timer value, it may be set to 0. Otherwise, it may be set as the remaining duration of the TXOP.

For a non-TXOP holder, if the failed receiving frame is the final frame in a TXOP or the subsequent transmission or retransmission of that frame plus any expected acknowledgement for that frame is larger than the remaining TXNAV timer value, it may be set to 0, otherwise, it may be set as the remaining duration of the TXOP, or a time for a multiple frame transmission.

The RA field 2115 may indicate the receiving STA or AP's address, which may be implemented as a MAC address, an association ID (AID), a partial association ID (PAID), or the like.

The frame check sequence (FCS) field 2120 may be included in the design of the NACK.

Uplink Cobra Channel Access

In order to perform uplink COBRA scheduling for STAs, the AP may need to know which STAs have uplink traffic to transmit. Reliable and efficient uplink data buffer status feedback or polling schemes for uplink COBRA may be used. Information of the STA data buffer status may be communicated to the AP efficiently for uplink COBRA transmission scheduling, especially in scenarios with a large number of STAs. A dedicated random access sub-channel may be utilized. Alternatively, a restricted access window (RAW) for uplink random access may be used.

In uplink COBRA, the AP may select and schedule the STAs that are permitted to transmit in a COBRA resource. As such, when a STA has data to transmit, there may be a need for the STA to be able to communicate this information efficiently. This may be implemented by a COBRA random access channel in which each user transmits the information needed to the AP in one or more dedicated time-frequency resources or sub-channel. The information from different STAs may be separated by an orthogonal or semi-orthogonal sequence with an associated sequence ID.

In a scenario where there are a large number of STAs (such as in IEEE 802.11 High Efficiency WLAN (HEW)), the length of the sequence needed to ensure orthogonality may be large and as such may utilize resources that may be better for data transmission. In this case, a RAW aided random access channel (RAC) may be used. In this example, the STAs may be grouped and a specific RAC may be restricted to desired group(s). As such the sequence length may be reduced and sequence IDs may be re-used in the different groups.

Figure 22:
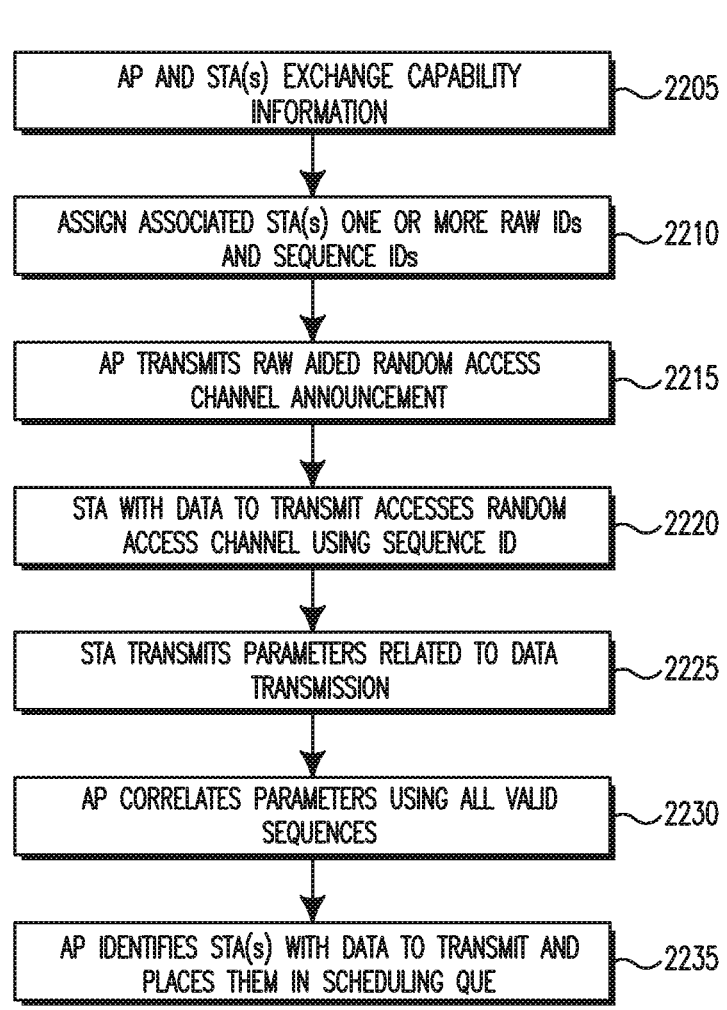
FIG. 22 is a diagram of an example uplink data buffer status feedback procedure.

FIG. 22 is a diagram of an example uplink data buffer status feedback procedure 2200. Referring to FIG. 22, at step 2205, the AP and STA(s) may exchange capability information to indicate their support for RAW aided RACs. The AP may indicate the parameters of the restricted access window. The parameters specified may include periodic or slot based, RAW ID and RAW duration. For example, with periodic RAW aided RAC, the RAW may be assigned periodically in the following beacon intervals. In this example, the RAC RAW may be present every N beacon interval. With slot based RAC RAW, the RAW may be slotted, and each non-AP STA may begin transmission only at the beginning of each slot. The non-AP STA may also need to restrict the transmission duration within a slot. The non-AP STA may randomly select a slot to transmit. This may reduce the collision probability. At step 2210, each STA that associates with the AP may be assigned a one or more RAW IDs and corresponding sequence IDs. In one embodiment, the STA may be assigned a RAWID+sequence ID to enable access for a limited number of STAs and a separate RAWID+sequence ID to allow all STAs in the network to compete for the random access channel.

At step 2215, the AP may transmit out a RAW aided random access channel announcement at specific sub-channels (time-frequency resources). This announcement may contain the RAW ID of the RAC and the resources used, for example, duration and frequency band. At step 2220, a STA that has data to transmit randomly may access the random access channel using the sequence specified by its sequence ID during a permitted time. At step 2225, the STA may transmit information indicating parameters such as the data duration, preferred resources, the data periodicity, and the like.

At step 2230, the AP may correlate the received information using all valid sequences. A restricted subset of the STAs may be used; the decoding process becomes more efficient. At step 2235, the AP may identify STAs with data to transmit and may place them in its scheduling queue for future scheduling.

Enhanced Cobra Grouping

Current grouping procedures and group maintenance procedures for COBRA schemes allow an AP to conduct grouping of STAs mostly on the basis of channel parameters such as propagation path loss, propagation delay, and hardware characteristics, such as clock drift and offset. Currently, no consideration may be given to other aspects such as traffic requirements of STAs as well as STA priorities in grouping decisions. These requirements are important and therefore, it is desirable to have detailed (ad hoc) grouping procedures that also take into account each STA's traffic requirements such as traffic priorities, application traffic stream durations, and the like.

Figure 23:
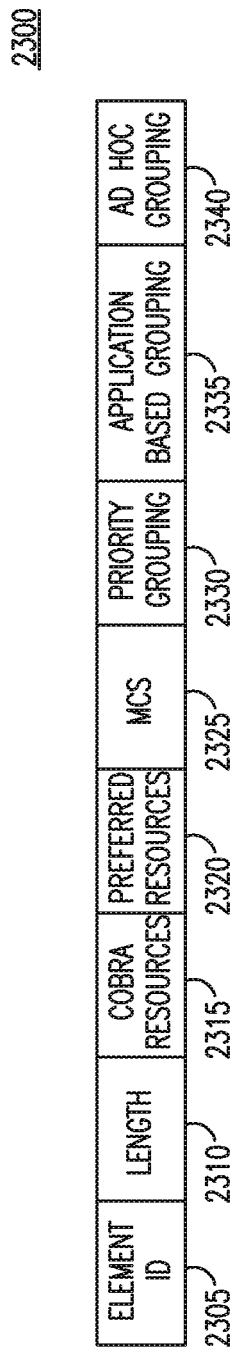
FIG. 23 is a diagram of an example COBRA capability/operation element.

If an AP or a STA is capable of COBRA, it may include a COBRA capability/operation element in its beacons, probe request/response, association request/response, (Re)association request/response, or other types of frames such as management, control or extension frames. FIG. 23 is a diagram of an example COBRA capability/operation element 2300. Referring to FIG. 23, the example COBRA capability/operation element may contain element ID field 2305, a length field 2310, a COBRA resources field 2315, a preferred resources field 2320, a modulation and coding set (MCS) field 2325, a priority grouping field 2330, an application based grouping field 2335, and an ad hoc grouping field 2340.

The element ID field 2305 may indicate that the element is a COBRA Capability/Operation element.

The length field 2310 may indicate the length of the COBRA Capability/Operation element.

The COBRA resources field 2315 may indicate the COBRA resources that the transmitting STA or AP is capable of using or that the current BSS uses. This field may contain two subfields: COBRA resource type and COBRA resource specification.

The COBRA resource type subfield may indicate the type of COBRA Resources that the transmitting STA or AP is currently using or is capable of using. This subfield may have the following values: channel, sub-channel, subcarrier groups, and resource blocks. A channel may include channels of certain bandwidths, such as a 20 MHz channel, which are used as the basic blocks of COBRA resources. A sub-channel may include a fraction of the operating channel that is used as the basic blocks of COBRA resources. Subcarrier groups may include one or more subcarriers, potentially in pre-defined patterns, which are used as the basic blocks of COBRA resources. Resource blocks (RBs) may include a resource block and is used as the basic blocks of COBRA resources.

The COBRA Resource Specification subfield may specify the particular COBRA resources that the transmitting STA or AP is currently using or is capable of using. The COBRA Resource Specification subfield may be implemented in various ways. For example, a bitmap may be used to indicate the list of channels or sub-channels, subcarrier groups or RBs, that are currently being used or that the transmitting STA or AP is capable of using. In another example, an integer may be used to indicate a pre-defined pattern of COBRA resources.

The preferred resources field 2320 may be used by a STA to indicate to an AP which COBRA resource it prefers to use. The implementation of the preferred resources field 2320 may be similar to that of the COBRA Resources field 2315 or similar to the COBRA Resources Specification subfield as described above.

The MCS field 2325 may be used by a STA to indicate to an AP which MCS it prefers, potentially over the preferred resources indicated.

The priority grouping field 2330 may indicate whether the transmitting STA or AP is capable of supporting priority grouping.

The application based grouping field 2335 may indicate whether the transmitting STA or AP is capable of supporting application based grouping.

The ad hoc grouping field 2340 may indicate whether the transmitting STA/AP is capable of supporting ad hoc grouping.

It may be understood that the COBRA capability/operation element or any set or subset of fields or subfields thereof may be implemented as any part of new or existing elements, such as a HEW/VHSE capability element, a HEW/VHSE operation element, a COBRA element, or as any part of a management, control, null data packet (NDP) or extension frame, including MAC and PLCP headers.

COBRA capability indication procedures using the COBRA capability/operation element as described herein, will now be described making reference to FIG. 23. A COBRA capable AP may include a COBRA capability/operation element 2300 in its (short) beacon to indicate whether the AP is capable of priority grouping, application based grouping and ad hoc grouping. In addition, the AP may indicate the type of COBRA resources (such as channels, sub-channels, subcarrier groups, or resource blocks) being used in its BSS as well as the details on which COBRA resources are used in the BSS in the COBRA resources field 2315.

A STA, if capable of COBRA, may include a COBRA capability/operation element 2300 in its probe request, association request, (Re)association request, or other types of frames such as management frames, control frames, extension frames, NDP frames, action frames or action frames with no ACK frames, to indicate its COBRA capabilities to one or more APs. For example, the STA may use the COBRA resource field 2315 to indicate the type, as well as the particular selection of the COBRA resources, that the STA is capable of using. The STA may also use the preferred resource field 2320 to indicate to the AP a selection of COBRA resources (such as one or more channels, sub-channels, subcarrier group, RBs or the like) during or after association with an AP, or another STA. Such a preferred resource indication may be based on the measurement of packets received by the transmitting STA from the APs or other STAs.

An AP or a STA may include an indicator, such as one bit, of COBRA capability in the HEW/VHSE capability/operation element or anywhere in its (short) beacon, probe response, association response, (Re)association response, or other type of frames. The positive setting of the COBRA capable indicator may imply that a COBRA capability/operation element is included in the same packets. Alternatively, including a COBRA capability/operation element may imply that the AP or STA is COBRA capable.

An AP, when receiving a probe request from a STA may decide not to respond to the probe request due to the COBRA capabilities indicated by the STA in the probe request.

An AP, when receiving a (Re)association request from a STA may reject the (Re)association request based on the COBRA capabilities indicated by the STA in the (Re)association request. If the AP accepts the (Re)association request, it may assign the requesting STA in a COBRA group with assigned COBRA resources and respond to the STA with a (Re)association response frame that includes a COBRA group assignment element.

Additional access categories may be defined for future generations of WLAN systems such as HEW or VHSE in addition to the current four access categories (ACs) such as AC_VO (voice), AC_VI (video), AC_BE (best effort), AC_BK (background). Some of the new ACs may include: AC_Gaming (this category is meant for traffic flows associated with real-time and interactive gaming); AC_Video-Conferencing (this AC is meant for traffic flows for real-time video conferencing); AC_PCDisplay (this AC is meant for traffic flows for PC wireless displays); AC_(V)HDVideo (this AC is meant for HD or Very HD Videos; and AC_UL-Video (this AC is meant for traffic flows for uplink video traffic).

The newly defined ACs may be associated with different priorities for medium access, such as different values of enhanced distributed channel access (EDCA) parameters, hybrid coordination function (HCF) controlled channel access (HCCA) polling frequencies, frequencies and durations of scheduled medium access, and the like, as well as allocation of resources such as more or less COBRA resources allocated to higher or lower priority traffic.

The existing ACs and the newly defined ACs may apply both for individual STAs or groups of STAs, such as COBRA groups, or multi-user (MU) MIMO groups, that may conduct concurrent medium access. The groups of STAs such as the COBRA groups may be associated with a particular AC as well as the medium access parameters of that AC.

COBRA-capable STAs may be divided into COBRA groups according to the characteristics of their applications. A STA, for example, at the start of a high priority traffic flow, may request grouping using the COBRA grouping request frame, which may specify the traffic load, priority, and type. The AP may respond with a COBRA grouping response frame or a COBRA grouping management frame to provide grouping of the STA, to group the STA with STAs of similar traffic load, priority and/or type. The STA may then access the medium together with its COBRA group using the assigned priority, using either scheduled or contention-based medium access. When an application terminates, the STA may again use a COBRA grouping request frame to update the AP of the STA's current traffic specification. Alternatively, the last packet of the terminating traffic may contain indications of the end of the current traffic (flows). The AP may then respond with a COBRA grouping response frame or a COBRA grouping management frame to update the COBRA grouping.

An AP may conduct ad hoc COBRA grouping for downlink transmissions. If an AP has packets buffered for a selection of STAs, the AP may group several STAs that are destinations of the buffered packets by transmitting an ad hoc grouping management frame.

Figure 24:
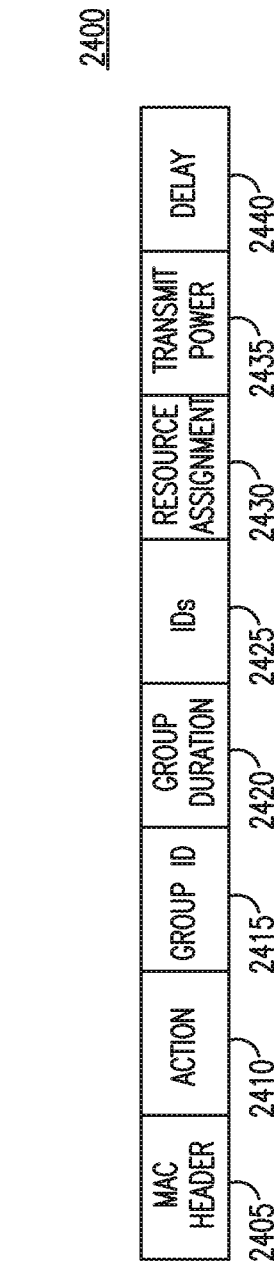
FIG. 24 is a diagram of an example ad hoc grouping management frame.

FIG. 24 is a diagram of an example ad hoc grouping management frame 2400. The ad hoc grouping management frame 2400 may be implemented as a HEW/VHSE action frame or as a HEW/VHSE action no ACK frame or a public action frame. The example ad hoc grouping management frame 2400 may include a MAC Header 2405, an action field 2410, a group ID field 2415, a group duration field 2420, an IDs field 2425, a resource assignment field 2430, a transmit power field 2435, and a delay field 2440.

The action field 2410 may include a category subfield and an action details field. The category subfield may indicate HEW/VHSE, and the action detail subfield may indicate that it is an ad hoc grouping management frame. Alternatively, the ad hoc grouping management frame may be defined as an extension frame, or any other type of management, control, NDP or extension frames or as an information element which may be included in the AP's beacon, short beacon, or any other type of control, management or extension frames.

The group ID field 2415 may include the ID assigned to the new ad hoc group, such as a COBRA group, or a MU-MIMO group, or any other type of MU groups. One or more indicators may also be included to indicate whether the grouping is for UL only, DL only or both UL and DL.

The group duration field 2420 may specify the duration of the validity of the group assignment. For example, the potential values for group duration may be specified as N Time Units (TU) or any other time units, such as milliseconds (ms) or microseconds (µs). Group duration may also be indefinite or valid until changed. Group duration may also be valid for one transmission only.

The IDs field 2425 may indicate the IDs of the STAs/APs belonging to the ad hoc group. This field may contain a fixed number of subfields; each subfield may contain the ID of one STA. The ID of each STA may be implemented using MAC addresses, or association IDs (AID), or any other IDs that the APs and the STAs agree upon beforehand. The order in which the IDs of the STAs are listed in IDs field 2425 may determine the order of STAs in the group. The order of assignment, e.g., that of resource assignment, transmit power or delay, for the STAs in any subsequent fields may be determined using the order of the STAs in the group.

The resource assignment field 2430 may indicate the resource assigned to each STA in the group. This field may include a number of subfields, with each subfield specifying the resource assigned to the STAs in the group. The order of the resource assignment subfields may follow the same order of the IDs subfields. Each resource assignment subfield may be implemented in several ways. For example, they may be implemented as bitmaps indicating the resources assigned to each STA. Alternatively, they may be implemented as integers which refer to the channels, sub-channels or resource patterns, such as subcarrier patterns or RB patterns that are pre-defined. Alternatively, if resources are uniform for each of the STAs in a group, this field may specify the size of the resource, such as the number of subcarriers, channel bandwidth, sub-channel bandwidth allocated for each STA in the group. The resources allocated for each STA may be implied by the order of the STAs listed in the IDs subfield. In another example, this field may specify the size of the total available resources to the entire group of STAs, such as the number of subcarriers, a total channel bandwidth, a total sub-channel bandwidth, and the like. The resources allocated to each STA may be divided equally and may be derived based on the other included in the IDs subfield.

The transmit power field 2435 may indicate the transmit power assigned to each STA in the group when conducting UL channel access. The transmit power field 2435 may include a number of subfields, with each subfield specifying the transmit power assigned to the STAs in the group. The order of the transmit power subfields may follow the same order of the IDs subfields.

The delay field 2440 may indicate the delay assigned to each STA in the group when conducting UL channel access. This field may include a number of subfields, with each subfield specifying the delay assigned to the STAs in the group. The order of the delay subfields may follow the same order of the IDs subfields.

In another design, each ad hoc group management frame or element may include the assignment for multiple groups; each containing the fields of group ID, group duration, IDs, resource assignment, transmit power and delay.

In yet another design, an AP may include multiple ad hoc group management elements in its beacon, short beacon, or other types of management, control or extensions frames, with each ad hoc grouping management element for one group of STAs.

Figure 25:
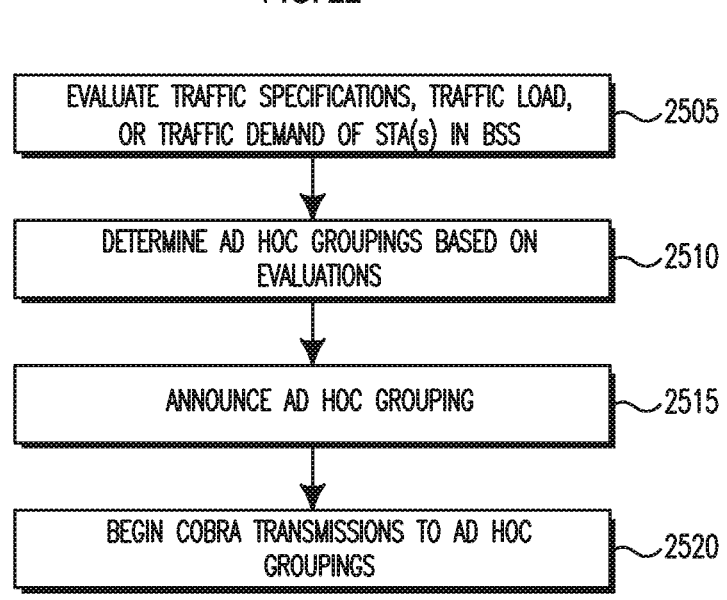
FIG. 25 is a diagram of an example ad hoc grouping management and transmission procedure.

FIG. 25 is a diagram of an example ad hoc grouping management and transmission procedure 2500. Referring to FIG. 25, at step 2505, an AP may evaluate the traffic specifications or traffic load, or traffic demand of the STAs in its BSS. The AP may also evaluate the packets buffered for downlink transmission.

At step 2510, the AP may determine ad hoc groupings of a subset of STAs in its BSS based on the evaluations at step 2505.

At step 2515, the AP may announce the ad hoc grouping by including one or more ad hoc grouping management element(s) in its beacon, short beacon, or any other type of control, management or extension frames. The AP may also announce the ad hoc grouping by transmitting a broadcast ad hoc grouping management frame. If the AP needs to update the various assignments for the STAs of a particular ad hoc group, it may transmit a multi-cast ad hoc grouping management frame with the RA address set to the group ID or the group address of the targeted ad hoc group.

Once the ad hoc grouping has been announced, at step 2520, the AP may start transmitting COBRA transmissions to the ad hoc groups on the assigned COBRA resources. The COBRA transmissions may be preceded immediately with the ad hoc group management frames or a beacon, a short beacon, or frames that include the ad hoc grouping management element(s). The COBRA transmissions may also be preceded by medium reservation frames such as RTS/CTS exchanges addressed to the COBRA ad hoc group. The STAs in the Ad Hoc Group may use the same ad hoc group for UL COBRA transmissions.

Enhanced Cobra Channel Access Schemes

In order to achieve the theoretical gains of COBRA in an implementation, reliable and efficient channel access and scheduling schemes may be necessary. In order to fully take advantage of the COBRA scheme, an appropriate design of UL/DL COBRA channel access schemes may be needed. Several channel access schemes have been designed and discussed. More channel access schemes, which are slightly different from the existing schemes, may be designed and developed when implementing the COBRA schemes.

Several frame formats for COBRA DL schedule frames may be used for reliable and efficient channel access and scheduling schemes.

Figure 26:
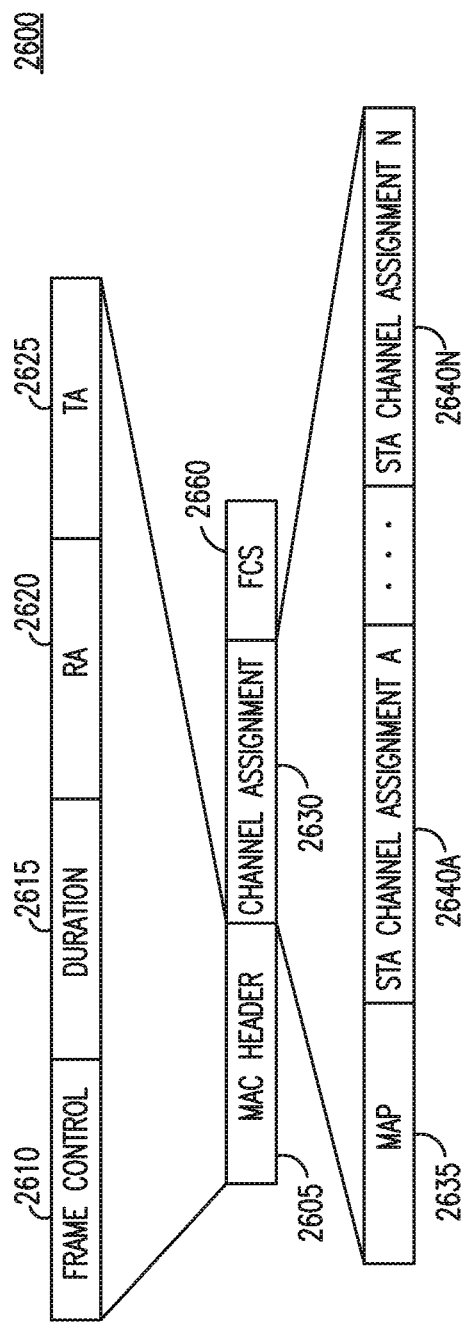
FIG. 26 is a diagram of an example COBRA DL schedule frame.

FIG. 26 is a diagram of an example COBRA DL schedule frame 2600. The COBRA DL schedule frame 2600 may include a MAC header 2605, a channel assignment field 2630 and an FCS field 2660. The MAC header 2605 may include a frame control field 2610, a duration field 2615, an RA field 2620 and a TA field 2625. The channel assignment field 2630 may include a MAP field 2635 and STA channel assignment fields 2640a-2640n.

Within the frame control field 2610, a combination of type value and subtype value fields may be used to indicate that the COBRA DL schedule frame is a COBRA DL schedule frame. For example, type value field="01" and one of previously reserved value of subtype value for control frames 0000-0110 may be used to indicate the COBRA DL schedule frame. Alternatively, type value field="11" (meaning this is an extension frame), and one value between 0000 to 1111 of subtype value field may be used to indicate the COBRA DL schedule frame.

The RA field 2620 in MAC header 2605 may include a multicast MAC address representing a group of STAs if the COBRA group has been formed and identified by a group address. Alternatively, a broadcast address may be used. If a single user is involved, a unicast address may be used.

The MAP field 2635 may use 1 byte to indicate the length of the channel assignment, the number of channel assignments, and additional optional information fields.

The STA channel assignment fields 2640a-2640n may be 2 bytes. Each of the STA channel assignment fields 2640a-2640n may include an AID field, a sub-channel bitmap field, and a reserve field. The AID field may be 12 bits. The sub-channel bitmap may be 2 bits (2 bits for 40 MHz channel; 4 bits for 80 MHz channel; 8 bits for 160 MHz). The Reserved field may be 2 bits.

Figure 27:
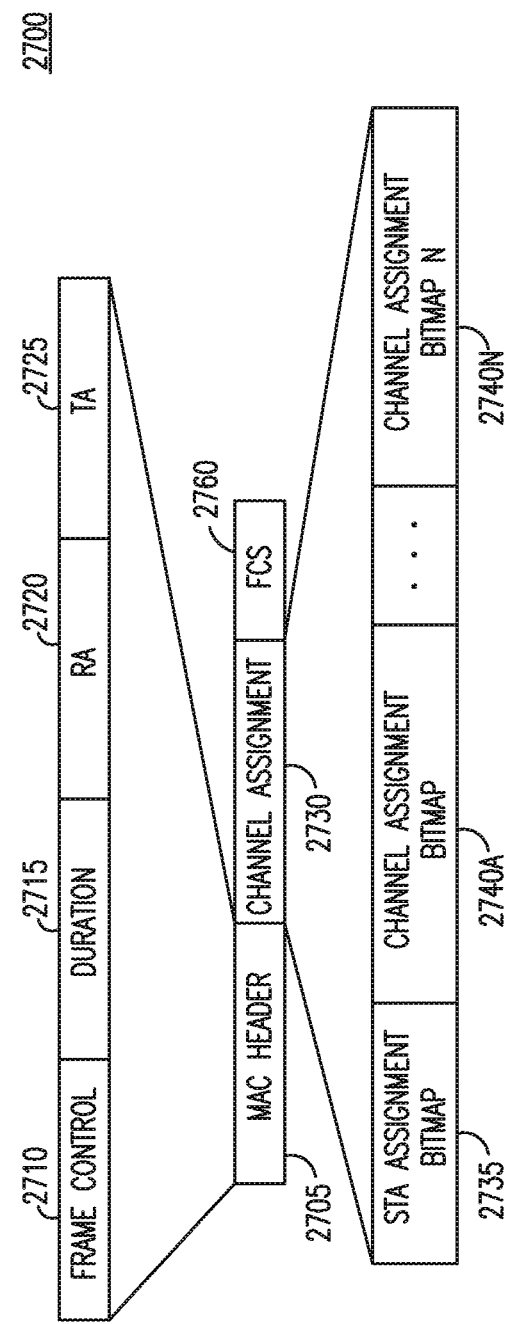
FIG. 27 is a diagram of another example COBRA DL schedule frame.

FIG. 27 is a diagram of another example COBRA DL schedule frame 2700. The COBRA DL schedule frame 2700 may include a MAC header 2705, a channel assignment field 2730 and an FCS field 2760. The MAC header 2705 may include a frame control field 2710, a duration field 2715, an RA field 2720 and a TA field 2725. The channel assignment field 2730 may include a STA assignment bitmap field 2735 and channel assignment bitmap fields 2740a-2740n.

The frame control field 2710, and the RA field 2720 may be the same as described herein.

The STA assignment bitmap field 2735 may be 1 to Q bytes, depending on the size of the group addressed by RA field 2720. The bitmap indicating the STA may assign at least one channel/band in the COBRA DL transmission. The length of the bitmap may be the same as the size of the configured group identified in RA field 2720. For example, a bitmap of 8 bits (1 Byte) may be used to indicate which STAs within a group of 8 STAs are assigned to at least one channel. If a bitmap position is set to "1", it may mean the corresponding STA may get a DL COBRA assignment. Otherwise, it may not be assigned.

In the channel assignment bitmap fields 2740a-2740n, for each positive bitmap position in the preceding STA assignment bitmap, one channel assignment bitmap field/IE may be used to indicate the channel assignment for the assigned STA. The length of the channel assignment bitmap may be the same as the number of minimum COBRA band (for example, 20 MHz) in the system. For example, a channel assignment bitmap of 4 bits maybe used to represent channel assignment of 20 MHz channels/bands in a system with 80 MHz channel.

Figure 28:
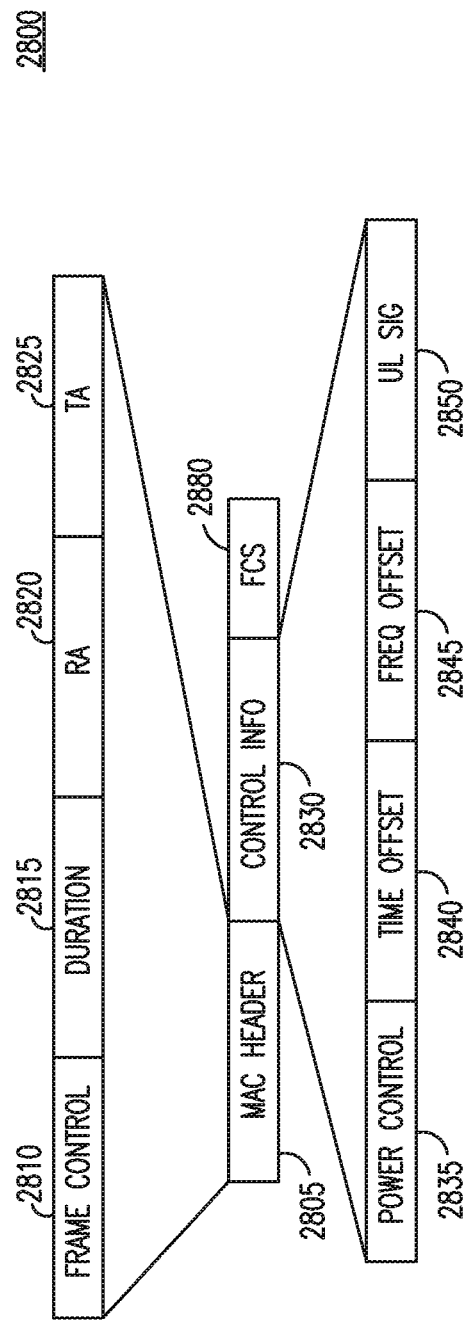
FIG. 28 is a diagram of an example COBRA UL schedule frame.

FIG. 28 is a diagram of an example COBRA UL schedule frame 2800. The COBRA UL schedule frame 2800 may include a MAC header 2805, a control information field 2830 and an FCS field 2880. The MAC header 2805 may include a frame control field 2810, a duration field 2815, an RA field 2820 and a TA field 2825. The control information field 2830 may include a power control field 2835, a time offset field 2840, a frequency offset field 2845 and an UL SIG field 2850.

The COBRA UL schedule frame 2800 may be a unicast frame. For example, COBRA UL Schedule frames transmitted over different sub-channels may be different.

Within the frame control field 2810, a combination of type value and subtype value fields may be used to indicate that this frame is a COBRA UL schedule frame. For example, type value field="01" and one of a previously reserved value of subtype value for control frames 0000-0110 may be used to indicate the COBRA UL schedule frame. Alternatively, type value field="11" (meaning this is an extension frame), and one value between 0000 to 1111 of subtype value field may be used to indicate the COBRA UL schedule frame.

The RA field 2820 in MAC header 2805 may include a multicast MAC address representing a group of STAs, if the COBRA group has been formed and identified by the group address. Alternatively, the RA field 2820 may include a Broadcast address. If a single user is involved, the RA field 2820 may include a Unicast address.

The control information field 2830 may be optional. If the RA field 2820 in the MAC header 2805 is a unicast address, the power control field 2835 may be the power control command, relative power control command or an absolute level of transmit power for the addressed STA to apply in its uplink COBRA transmission. If the RA field 2820 in the MAC header 2805 is a group address, e.g., an address for a group of N STAs, the power control may be a field of N×M bits, where the M bits is the power control command, relative power control command, or the absolute level of transmit power of each STA in the group to apply in its uplink COBRA transmission.

If the RA field 2820 in the MAC header 2805 is a unicast address, the time offset field 2840 may be the time offset or the relative time offset that the addressed STA may apply in its uplink COBRA transmission. If the RA field 2820 in the MAC header 2805 is a group address, e.g., for a group of N STAs, the time offset field 2840 may be a field of N×P bits, where the P bits is the timing offset that each STA in the group may apply in its uplink COBRA transmission.

If the RA field 2820 in the MAC header 2805 is a unicast address, the frequency offset field 2845 may be the time offset or the relative time offset that the addressed STA may apply in its uplink COBRA transmission. If the RA field 2820 in the MAC header 2805 is a group address, e.g., for a group of N STAs, the frequency offset filed 2840 may be a field of N×P bits, where the P bits is the frequency offset that each STA in the group may apply in its uplink COBRA transmission.

The UL SIG field 2850 may be the SIG field that the addressed STA may apply in its SIG field in the PLCP header in the uplink COBRA transmission.

Alternatively, a unified design of a COBRA UL/DL schedule frame may be used.

Figure 29:
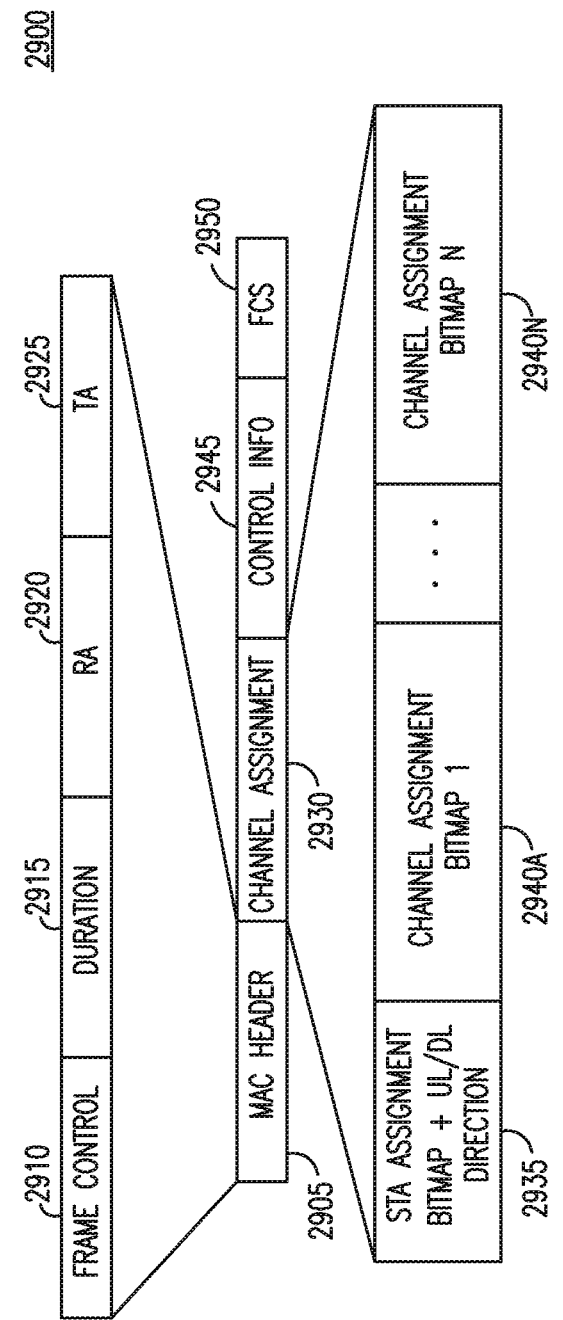
FIG. 29 is a diagram of a first example of a unified COBRA UL/DL schedule frame.

FIG. 29 is a diagram of a first example of a unified COBRA UL/DL schedule frame 2900. The unified COBRA UL/DL schedule frame 2900 may include a MAC header 2905, a channel assignment field 2930, a control information field 2945 and an FCS field 2950. The MAC header 2905 may include a frame control field 2910, a duration field 2915, an RA field 2920 and a TA field 2925. The channel assignment field 2930 may include a STA assignment bitmap and UL/DL direction field 2935 and channel assignment bitmap fields 2940a-2940n.

The same fields as in the COBRA DL schedule frames described herein may be included. The type value and subtype value combination in the frame control field 2910 in MAC header 2905 may indicate this frame is the unified COBRA UL/DL schedule frame. The control information field 2945 may be optional. The same fields as in the COBRA UL schedule frames described herein may be included. For example, the control information field 2945 may include a power control field, a time offset field, a frequency offset field, and a UL SIG field. A DL SIG field may also be included and it should be noted that the control information field 2945 may include information for both the uplink and downlink. In this example, an UL/DL direction indicator may be included in the STA assignment bitmap field 2935. One of the reserved bits in the channel assignment bit map may be included.

Figure 30:
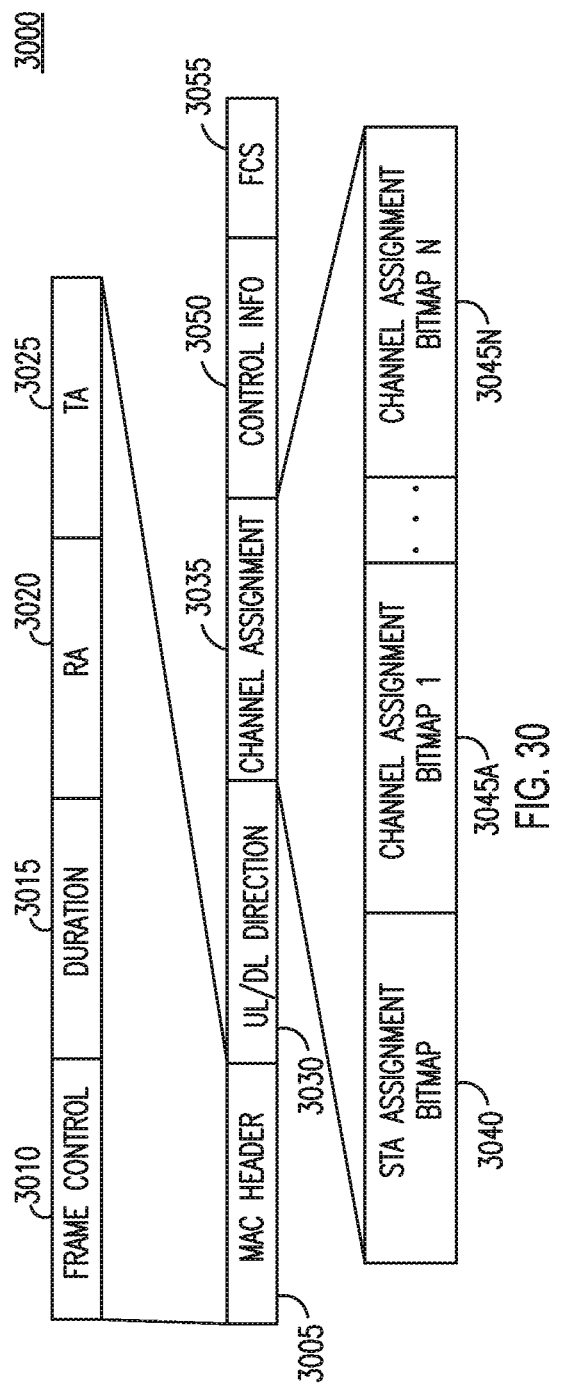
FIG. 30 is a diagram of a second example of a unified COBRA UL/DL schedule frame.

FIG. 30 is a diagram of a second example of a unified COBRA UL/DL schedule frame 3000. The unified COBRA UL/DL schedule frame 3000 may include a MAC header 3005, an UL/DL direction field 3030, a channel assignment field 3035, an UL control information field 3050 and an FCS field 3055. The MAC header 3005 may include a frame control field 3010, a duration field 3015, an RA field 3020 and a TA field 3025. The channel assignment field 3035 may include a STA assignment bitmap field 3040 and channel assignment bitmap fields 3045a-3045n.

The same fields as in the COBRA DL schedule frames described herein may be included. The type value and subtype value combination in the frame control field 3010 in MAC header 3005 may indicate this frame is the unified COBRA UL/DL schedule frame. The uplink control information field 3045 may be optional. The same fields as in the COBRA UL schedule frames described herein may be included. For example, the UL control information field 3050 may include a power control field, a time offset field, a frequency offset field, and a UL SIG field.

In this example, a standalone UL/DL direction indicator field 3030 is used. Alternatively, an UL/DL direction indicator may be used in the PLCP header.

Figure 31:
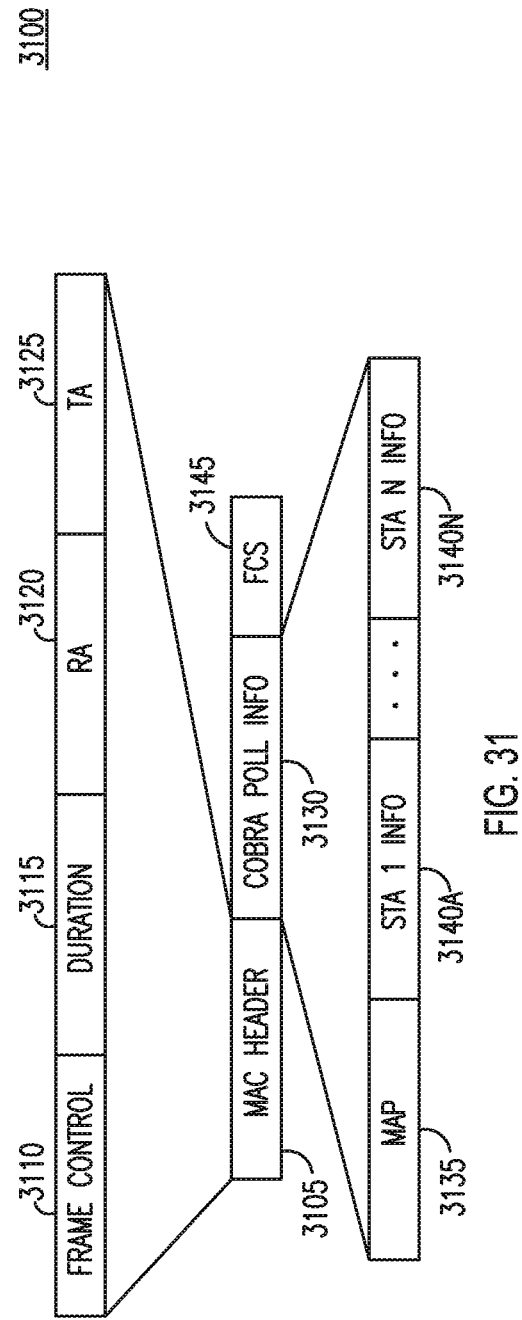
FIG. 31 is a diagram of a first example COBRA poll frame.

FIG. 31 is a diagram of a first example COBRA poll frame 3100. The COBRA poll frame 3100 may include a MAC header 3105, a COBRA poll information field 3130 and an FCS field 3145. The MAC header 3105 may include a frame control field 3110, a duration field 3115, an RA field 3120 and a TA field 3125. The COBRA poll information field 3130 may include a MAP field 3135 and STA information fields 3140a-3140n.

Within the frame control field 3110, a combination of type value and subtype value fields may be used to indicate this frame is COBRA poll schedule frame. For example, type value field="01" and one of previously reserved values of subtype value for control frames 0000-0110 may be used to indicate the COBRA poll schedule frame. Alternatively, type value field="11" (meaning this is an extension frame), and one value between 0000 to 1111 of subtype value field may be used to indicate the COBRA poll schedule frame.

For the RA field 3120 in the MAC header 3105, a multicast MAC address representing a group of STAs, if the COBRA group has been formed and identified by the group address may be used. Alternatively, a Broadcast address may be used. If a single user is involved, a unicast address may be used.

The MAP field 3135 may be 1 Byte and may indicate the length of the STA information fields 3140a-3140n, the number of STA information field 3140a-3140n, and additional optional information fields. The STA information fields 3140a-3140n may include an AID field to identify the STA, channel assignment fields, sub-channel bitmap fields to indicate the potential sub-channel(s) assigned to each STA, and a number of reserved fields.

The channel assignment fields may each be 2 Bytes. The AID fields may each be 12 bits. The sub-channel bitmap fields may each be 2 bits (2 bits for 40 MHz channel; 4 bits for 80 MHz channel; 8 bits for 160 MHz). The reserved field may be 2 bits.

Figure 32:
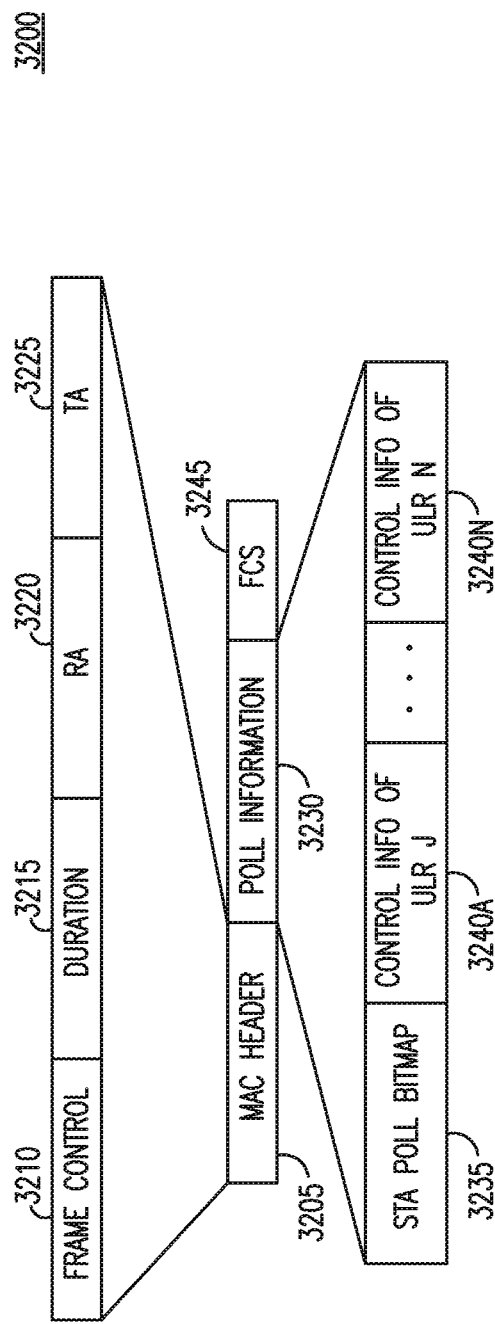
FIG. 32 is a diagram of a second example COBRA poll frame.

FIG. 32 is a diagram of a second example COBRA poll frame 3200. The COBRA poll frame 3200 may include a MAC header 3205, a poll information field 3230 and an FCS field 3245. The MAC header 3205 may include a frame control field 3210, a duration field 3215, an RA field 3220 and a TA field 3225. The poll information field 3230 may include a STA poll bitmap field 3235 and control info of ULR j-n fields 3240a-3240n.

The frame control field 3210 and RA field 3220 in the MAC header 3205 may be the same as in the examples described herein.

The STA poll bitmap field 3235 may include 1 to Q bytes, depending on the size of the group addressed by RA field 3220. The STA poll bitmap field 3235 may indicate the STA being polled by the AP. The length of the STA poll bitmap field 3235 may be the same as the size of the configured group identified in RA field 3220. For example, a bitmap of 8 bits (1 Byte) may be used to indicate which STAs within a group of 8 STAs are assigned at least one channel. If a bitmap position is set to "1", it may mean the corresponding STA is polled. Otherwise, that STA may not be polled.

The control info of ULR j-n fields 3240a-3240n each contain control information of the upcoming $j^{th}$ ULR and $1 \le j \le J$. The AP polls J STAs for ULR, thus the AP may needs to schedule the transmission of J ULRs in a way that reduces potential collisions. The control info if ULR j-n fields 3240a-3240n may each may include a channel bitmap k ($1 \le k \le N$) and code domain (CDM), time domain (TDM) or frequency domain (FDM) information. For each positive bitmap position in the preceding STA assignment bitmap, one channel assignment bitmap field/IE may be used to indicate the channel assignment for the assigned STA. The length of the channel assignment bitmap may be the same as the number of minimum COBRA bands (for example, 20 MHz) in the system. For example, a channel assignment bitmap of 4 bits may be used to represent channel assignment of 20 MHz channels/bands in a system with 80 MHz channel. The upcoming multiple ULR transmissions may be separated by CDM, TDM or FDM. With CDM, the AP and STAs may agree with a pre-defined set of orthogonal sequences and each STA may be assigned one sequence. The polled STAs may apply assigned dedicated sequences to the ULR transmission. With TDM, the polled STAs may transmit ULR frames sequentially one after another. With FDM, the polled STAs may transmit ULR frames on pre-assigned frequency sub-channels.

Figure 33:
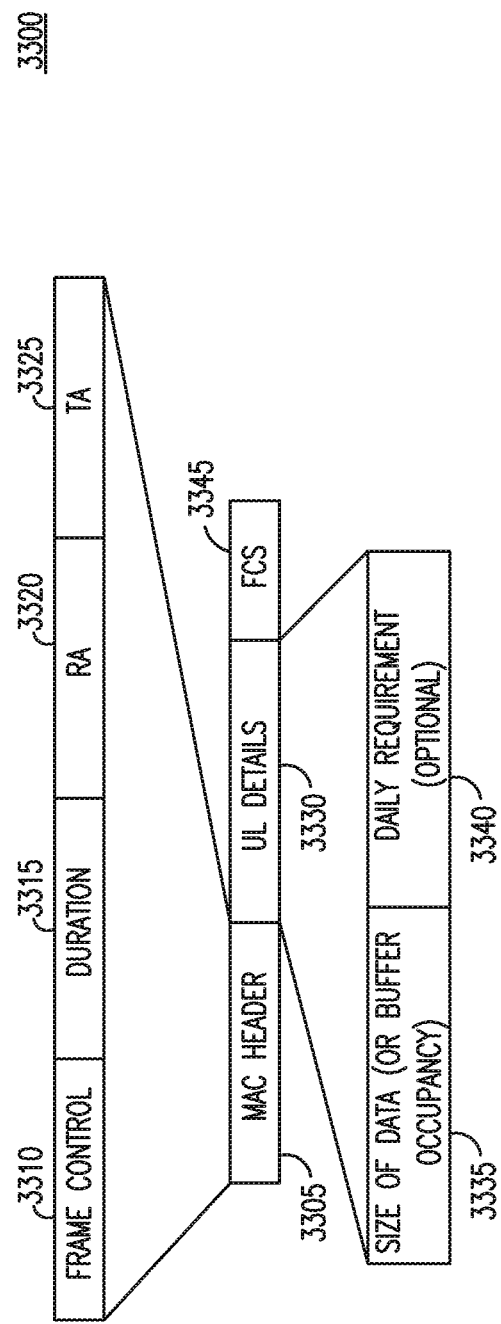
FIG. 33 is a diagram of an example COBRA uplink request (ULR) frame.

FIG. 33 is a diagram of an example COBRA uplink request (ULR) frame 3300. The COBRA ULR frame 3300 may include a MAC header 3305, an UL details field 3330 and an FCS field 3345. The MAC header 3305 may include a frame control field 3310, a duration field 3315, an RA field 3320 and a TA field 3325. The UL details field 3330 may include a size of data or buffer occupancy field 3335 and an optional delay requirement field 3340.

Within the frame control field 3310, a combination of type value and subtype value fields may be used to indicate that this frame is a COBRA ULR frame. For example, type value field="01" and one of previously reserved value of subtype value for control frames 0000-0110 may be used to indicate the COBRA ULR frame. Alternatively, type value field="11" (meaning this is an extension frame), and one value between 0000 to 1111 of subtype value field may be used to indicate the COBRA ULR frame.

The size of data (or buffer occupancy) field 3335 in the UL details field 3330 may include the amount of data at the STA. The delay requirement field 3340, which may be an optional field, may include the maximum allowed delay associated with the data.

The COBRA ACK/NACK frames described herein may be combined or piggybacked with other frames, such as ULR or data frames. For example, COBRA schemes may allow ACK/NACK frames aggregated with other frames in the using an example A-MPDU format as shown in FIG. 34.

Figure 34:
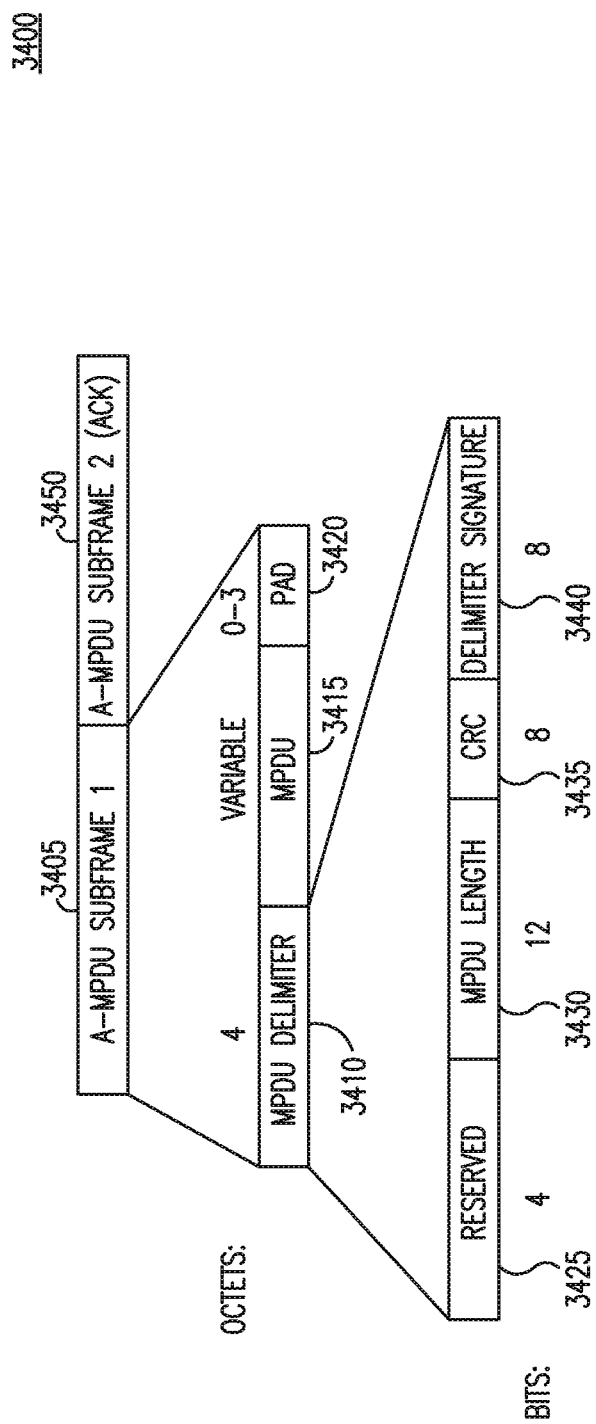
FIG. 34 is a diagram of an example A-MPDU format used to piggyback an ACK frame to another frame.

FIG. 34 is a diagram of an example A-MPDU format used to piggyback an ACK frame to another frame. In this example, a first A-MPDU subframe 3405 and a second A-MPDU subframe 3450 are shown. A-MPDU subframe 3405 may include the MPDU delimiter 3410, MPDU 3415, pad 3420, as well as other optional fields. The MPDU delimiter 3410 may include a reserved field 3425, MPDU length field 3430, CRC field 3435, and a delimiter signature field 3440, as well as some reserved bits.

The second A-MPDU subframe 3450 includes an ACK. However, the second A-MPDU subframe 3450 may instead include a NACK. As shown the second A-MPDU subframe 3450 containing the ACK is aggregated with other A-MPDUs, e.g. A-MPDU subframe 3405. The entire A-MPDU frame may be passed to PHY layer to transmit.

Using the A-MSDU format. The aggregated frames defined for contention free (CF) transmissions may be reused, and the A-MSDU structure may be contained in the frame body of a single MPDU. For example, the COBRA scheme may reuse the QoS+CF-ACK frame by defining subtype as 1001. In order to piggyback a NACK frame with the other frame, a new subtype may be defined.

Several methods for standalone uplink COBRA channel access will now be described. In a first embodiment, a fixed or specific band assignment for ULR frame transmission for each STA may be used. In a second embodiment, a code division multiplex (CDM) ULR frame may be transmitted on all bands with sounding and frequency-selective COBRA transmission scheduling information. In a third embodiment, a time division multiplex (TDM) ULR frame may be transmitted on all bands with sounding and frequency-selective COBRA transmission scheduling information.

Figure 35:
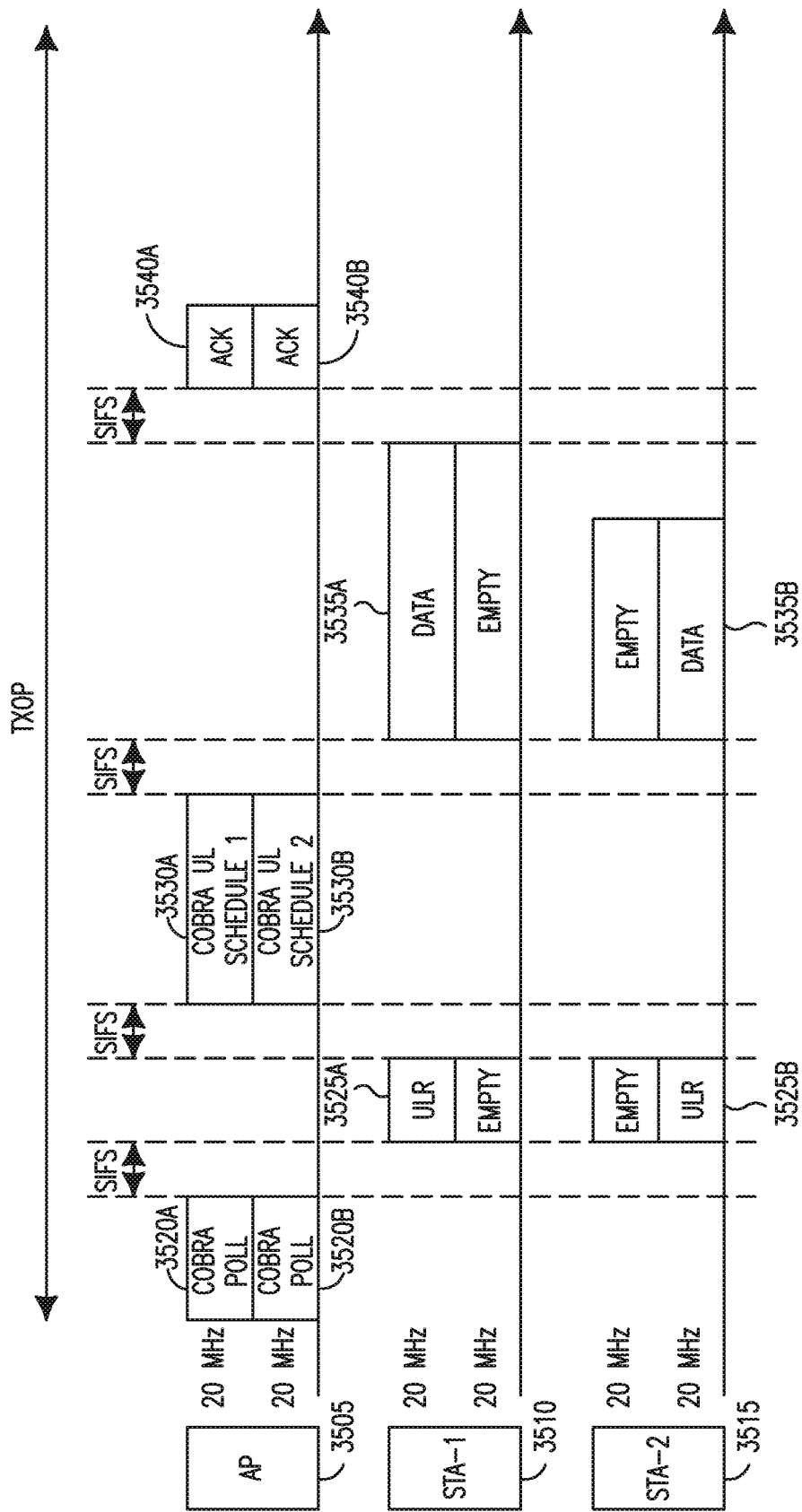
FIG. 35 is a diagram of a first example channel access scheme for standalone UL COBRA using a fixed or specific band assignment for ULR frame transmission for each STA.

FIG. 35 is a diagram of a first example channel access scheme for standalone UL COBRA using a fixed or specific band assignment for ULR frame transmission for each STA. In this example, an AP 3505, a STA-1 3510 and a STA-2 3515 are shown. The AP 3505 may be operating on a 40 MHz channel, which may include two 20 MHz sub-channels. It should be noted that this is for illustrative purposes only and the AP may be operating on any channel size or configuration. The AP 3505 performs a polling procedure and transmits COBRA polling frame 3520*a* to STA-1 3510 and COBRA polling frame 3520*b* to STA-2 3515 on their separate respective channels. Alternatively, the poll may be sent to all target STAs (configured in a group) on all channels.

There may be several options to signal the information in the COBRA polling frames. For example, the AP may configure the mapping between specific STAs and corresponding channels where the COBRA polls are transmitted beforehand. For example, as shown in FIG. 35, STA-1 3510 is preconfigured to transmit its ULR frame 3525*a* on its respective separate 20 MHz channel and STA-2 3515 is preconfigured to transmit its ULR frame 3525*b* on its respective separate 20 MHz channel. Alternatively, the COBRA polling frames may contain specific band assignments for ULR frame transmission for each STA.

If the AP configured the mapping between specific STAs and corresponding channels beforehand using, for example, previous control or management frames, the STAs in the previously configured group may wake up at the beginning of the COBRA polling frames transmitted by the AP and listen for the polling on all channels or preconfigured channels/bands.

After receiving valid COBRA polling frames 3520*a*, 3520*b* from the AP 3505, if the STAs 3510, 3515 have uplink data to transmit, the STAs 3510, 3515 may transmit a ULR frame 3525*a*, 3525*b* on the channel that is either assigned in the COBRA polling frame 3520*a*, 3520*b* or preconfigured by previous control or management frames.

Upon receiving ULR frames 3525*a*, 3525*b* from STA-1 3510 and STA-2 3515, the AP 3505 may determine channel assignment for UL COBRA transmission and transmit COBRA UL scheduling frames 3530*a*, 3530*b* on each assigned channel.

STAs that have transmitted ULR frames may listen on all channels or only channels configured previously. After receiving the COBRA UL scheduling frames 3530*a*, 3530*b*, which contain UL COBRA transmission information, STA-1 3510 and STA-2 3515 may transmit their data frames 3535*a*, 3535*b* on their assigned channels/bands accordingly. The AP may confirm receipt by transmitting ACKs 3540*a*, 3540*b*.

Figure 36:
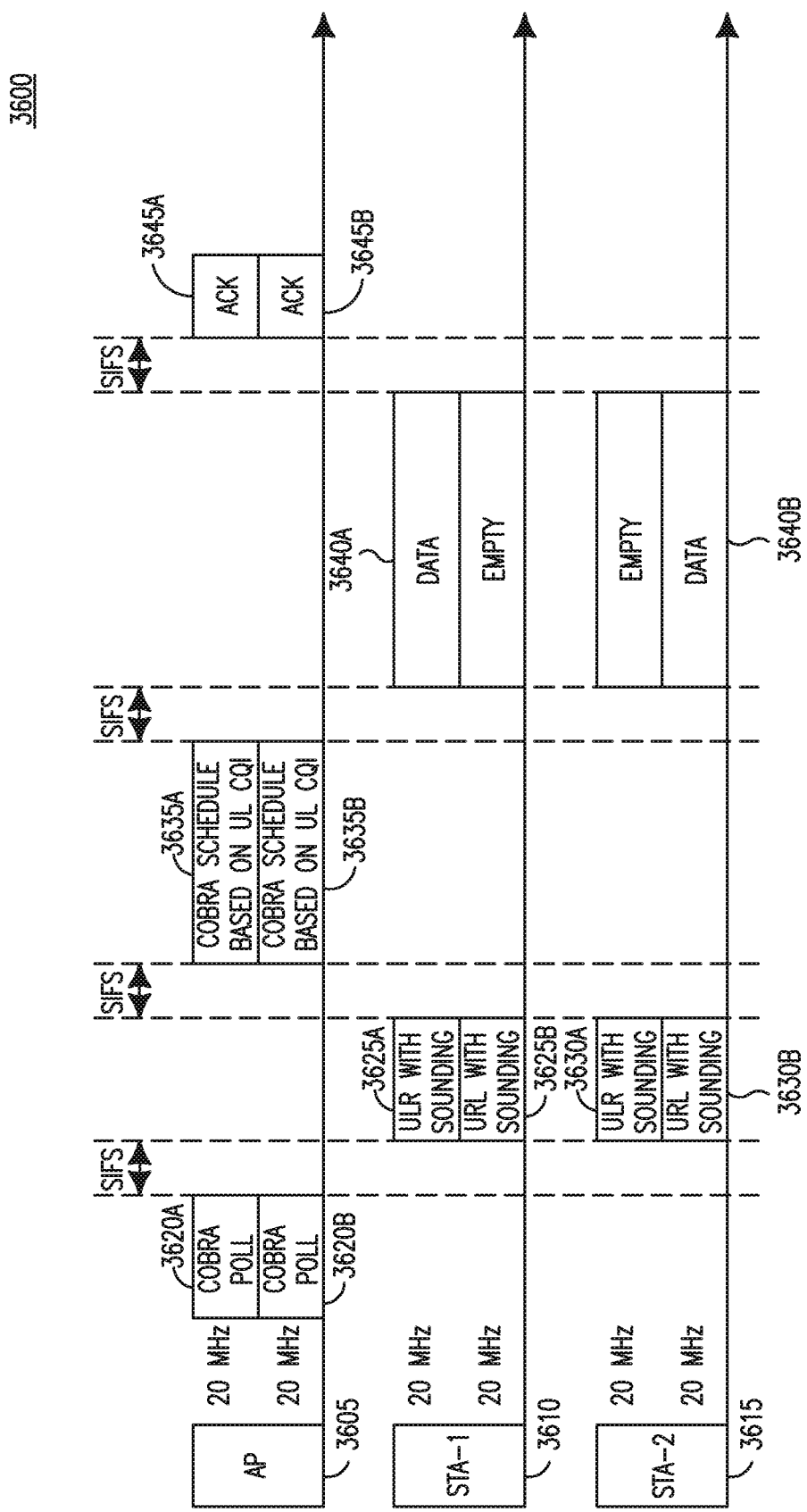
FIG. 36 is a diagram of a second example channel access scheme for standalone UL COBRA with code division multiplex (CDM) ULR.

FIG. 36 is a diagram of a second example channel access scheme for standalone UL COBRA with code division multiplex (CDM) ULR. In this example, an AP 3605, a STA-1 3610 and a STA-2 3615 are shown. The AP 3605 may be operating on a 40 MHz channel, which may include two 20 MHz sub-channels. It should be noted that this is for illustrative purposes only and the AP may be operating on any channel size or configuration.

AP 3605 may transmit COBRA polling frames 3620*a*, 3620*b* for all target STAs (configured in a group) on all channels, here STA-1 3610 and STA-2 3615. If the AP configured the mapping between specific STAs and corresponding channels beforehand using, for example, using previous control or management frames, the STAs in the previously configured group may wake up at the beginning of the COBRA polling frames transmitted by the AP and listen for the polling on all channels or preconfigured channels/bands.

After receiving a valid COBRA polling frames 3620*a*, 3620*b* from the AP 3605, STA-1 3610 and STA-2 3615, each having uplink data to transmit, may each transmit a ULR frame with sounding signals on all the sub-channels or a preconfigured or signaled subset of all available sub-channels in the system. In this example, STA-1 3610 transmits ULR frames with sounding signals 3625*a*, 3625*b* on all of the sub-channels. STA-2 3615 transmits ULR frames with sounding signals 3630*a*, 3630*b* on all of the sub-channels. Since both STA-1 3610 and STA-2 3615 need to respond to the COBRA polling frame 3620, their respective ULR frames with sounding signals 3625*a*, 3625*b*, 3630*a*, 3630*b* may be transmitted in an orthogonal manner (in time, frequency or code domain). In this example, the ULR frames with sounding signals 3625*a*, 3625*b*, 3630*a*, 3630*b* are transmitted in an orthogonal manner in the code domain.

Upon receiving ULR frames with sounding signals 3625*a*, 3625*b*, 3630*a*, 3630*b* from STA-1 3610 and STA-2 3615 respectively, AP 3605 may determine channel assignments for UL COBRA transmissions. AP 3605 may base these channel assignments on channel quality, for example using a channel quality indicator (CQI) or some other parameter. AP 3605 may transmit COBRA UL Schedule frames 3635*a*, 3635*b* on each assigned channel.

STAs that have transmitted ULR frames may listen on all channels or only channels configured previously. In this example, after receiving the COBRA UL scheduling frames 3635*a*, 3635*b*, each of which contains the UL COBRA transmission information, STA-1 3610 and STA-2 3615 may transmit their respective data frames 3640*a*, 3640*b* on the assigned channels/bands accordingly. The AP 3605 may confirm receipt by transmitting ACKs 3645*a*, 3645*b*.

Figure 37:
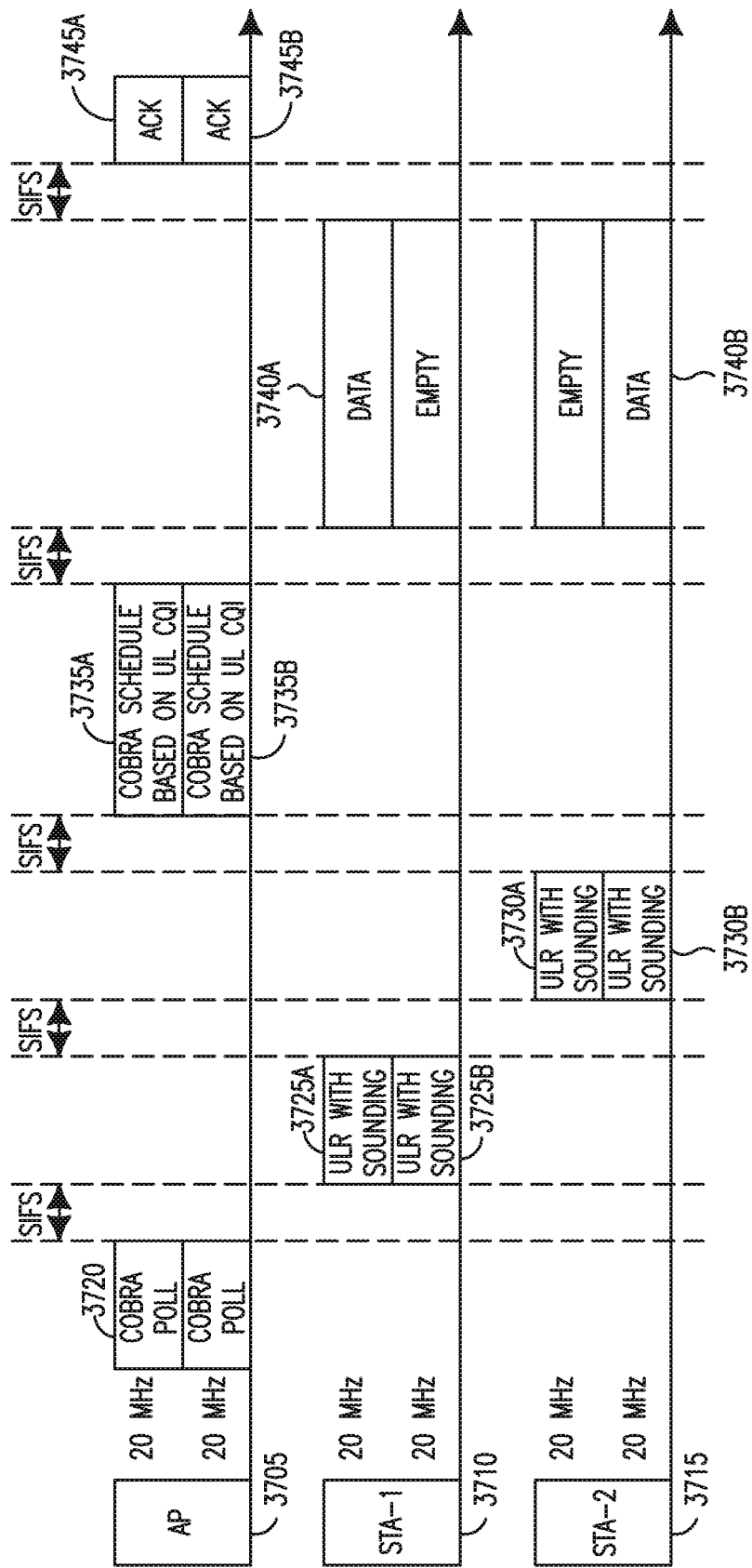
FIG. 37 is a diagram of a third example channel access scheme for standalone UL COBRA with time division multiplex (TDM) ULR.

FIG. 37 is a diagram of a third example channel access scheme for standalone UL COBRA with time division multiplex (TDM) ULR. In this example, an AP 3705, a STA-1 3710 and a STA-2 3715 are shown. The AP 3705 may be operating on a 40 MHz channel, which may include two 20 MHz sub-channels. It should be noted that this is for illustrative purposes only and the AP may be operating on any channel size or configuration.

AP 3705 may transmit a COBRA polling frame 3720 for all target STAs (configured in a group) on all channels, here STA-1 3710 and STA-2 3715. If the AP configured the mapping between specific STAs and corresponding channels beforehand using, for example, using previous control or management frames, the STAs in the previously configured group may wake up at the beginning of the COBRA polling frames transmitted by the AP and listen for the polling on all channels or preconfigured channels/bands.

After receiving a valid COBRA polling frame 3720 from the AP 3705, STA-1 3710 and STA-2 3715, each having uplink data to transmit, may each transmit a ULR frame with sounding signals on all the channels or a preconfigured or signaled subset of all available channels in the system. In this example, STA-1 3710 transmits ULR frames with sounding signals 3725*a*, 3725*b* on all of the channels. STA-2 3715 transmits ULR frames with sounding signals 3730*a*, 3730*b* on all of the channels. Since both STA-1 3710 and STA-2 3715 need to respond to the COBRA polling frame 3720, their respective ULR frames with sounding signals 3725*a*, 3725*b*, 3730*a*, 3730*b* may be transmitted in an orthogonal manner (in time, frequency or code domain). In this example, the ULR frames with sounding signals 3725*a*, 3725*b*, 3730*a*, 3730*b* are transmitted in an orthogonal manner in the time domain.

Upon receiving ULR frames with sounding signals 3725*a*, 3725*b*, 3730*a*, 3730*b* from STA-1 3710 and STA-2 3715, respectively, AP 3705 may determine channel assignments for UL COBRA transmissions. AP 3705 may base these channel assignments on channel quality, for example using a CQI or some other parameter. AP 3705 may transmit COBRA UL Schedule frames 3735*a*, 3735*b* on each assigned channel.

STAs that have transmitted ULR frames may listen on all channels or only channels configured previously. In this example, after receiving the COBRA UL scheduling frames 3735*a*, 3735*b*, each of which contains the UL COBRA transmission information, STA-1 3710 and STA-2 3715 may transmit their respective data frames 3740*a*, 3740*b* on the assigned channels/bands accordingly. The AP 3705 may confirm receipt by transmitting ACKs 3745*a*, 3745*b*.

Several methods for standalone downlink COBRA channel access will now be described. In a first embodiment, a fixed or specific band assignment for downlink COBRA transmission of each STA without an ACK from the assigned STAs may be used. In a second embodiment, a fixed or specific channel/band assignment for downlink COBRA transmission of each STA with an ACK from the assigned STAs may be used.

Figure 38:
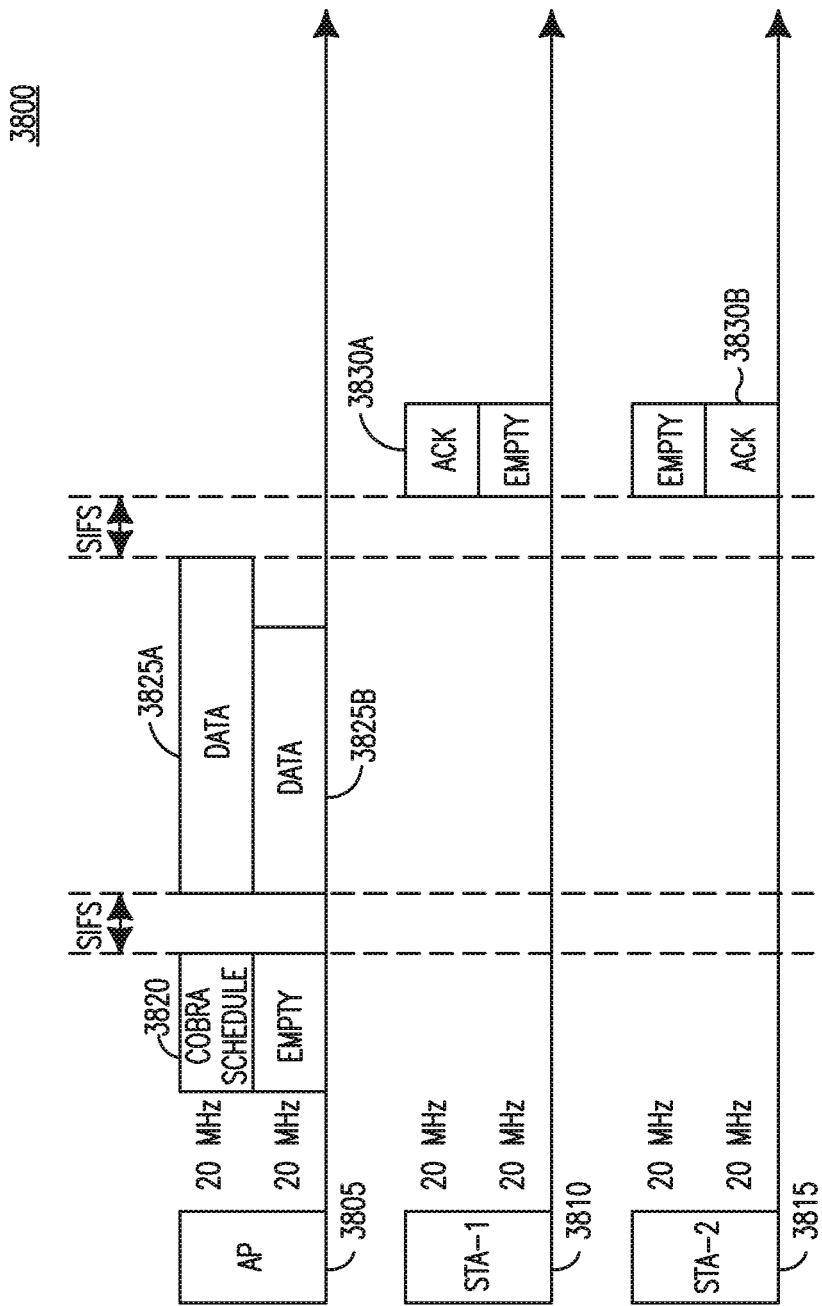
FIG. 38 is a diagram of a first example channel access scheme for standalone DL COBRA using a fixed or specific band assignment for downlink COBRA transmission of each STA without an ACK from the assigned STA.

FIG. 38 is a diagram of a first example channel access scheme for standalone DL COBRA using a fixed or specific band assignment for downlink COBRA transmission of each STA without an ACK from the assigned STAs. In this example, an AP 3805, a STA-1 3810 and a STA-2 3815 are shown. The AP 3805 may be operating on a 40 MHz channel, which may include two 20 MHz sub-channels. It should be noted that this is for illustrative purposes only and the AP may be operating on any channel size or configuration.

The AP 3805 may transmit a DL COBRA schedule frame 3820 containing the DL transmission schedule of each channel/band on corresponding channels/bands. As shown in FIG. 38, the AP may transmit the DL COBRA schedule frame 3820 on a preconfigured set of channels, here only the first channel of the set of two channels in this example. Alternatively, the AP may transmit a DL COBRA schedule frame which contains DL transmission schedule of all assigned channels for all target STAs on all assigned channels, or all channels in the system.

As in the examples above, if the STAs are configured in a group by previous control or management frames, the configured group may wake up at the beginning of the DL COBRA schedule frames transmitted by the AP and listen for the DL COBRA schedule frames on all channels or preconfigured channels/bands.

After receiving the valid DL COBRA schedule frame 3820 from the AP 3805, the STA-1 3810 and STA-2 3815 may tune their respective receivers to the assigned channels/bands to receive their respective downlink data frames.

The AP 3805 may start DL COBRA transmission a SIFS time after transmitting the DL COBRA schedule frame 3820, by transmitting DL data frames 3825*a*, 3825*b* to STA-1 3810 and STA-2 3815, respectively.

If the DL data frames 3825*a*, 3825*b* are received and decoded successfully, STA-1 3810 and STA-2 3815 may transmit ACKs 3830*a*, 3830*b* to the AP on channel/band where the corresponding DL data frame 3825*a*, 3825*b* is received.

Figure 39:
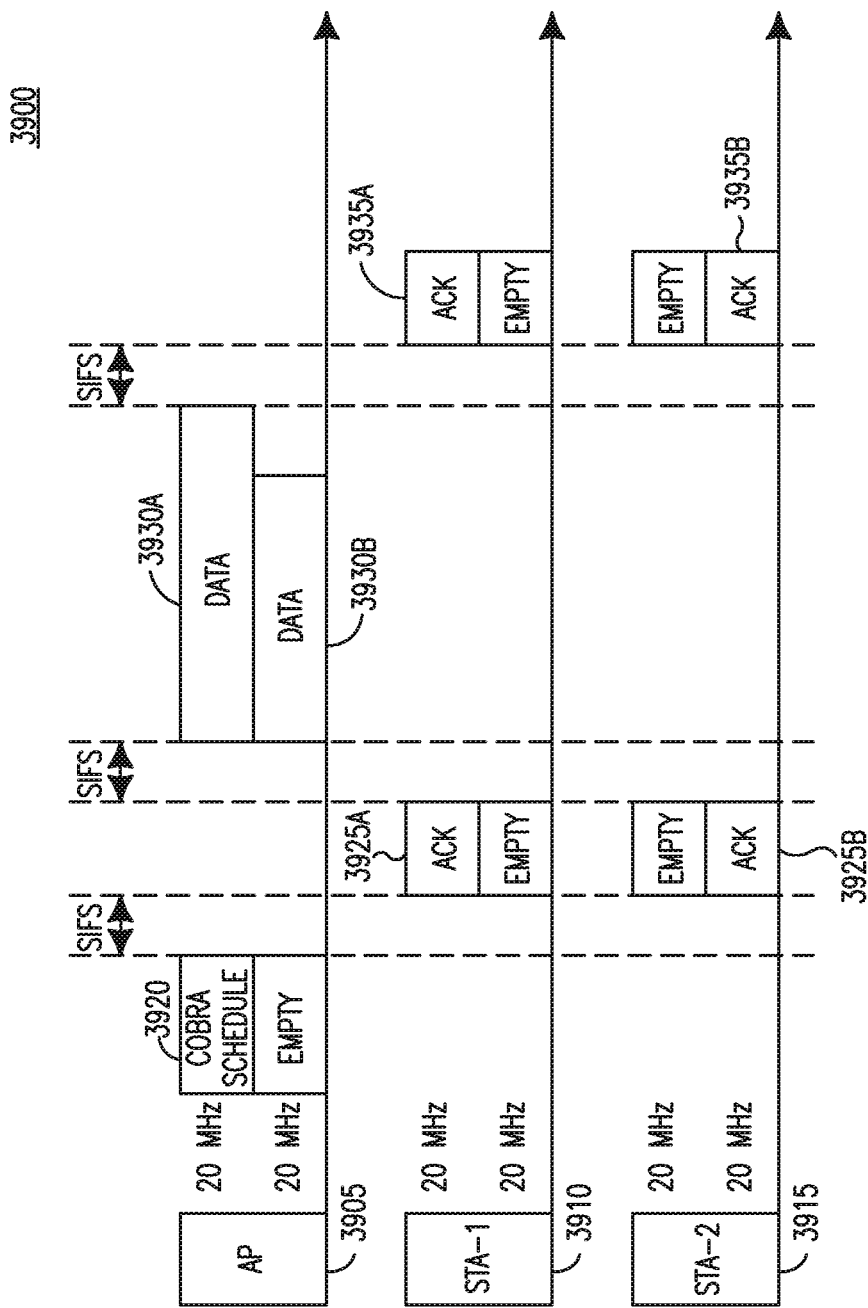
FIG. 39 is a diagram of a second example channel access scheme for standalone DL COBRA using a fixed or specific channel/band assignment for downlink COBRA transmission of each STA with an ACK from the assigned STAs.

FIG. 39 is a diagram of a second example channel access scheme for standalone DL COBRA using a fixed or specific channel/band assignment for downlink COBRA transmission of each STA with an ACK from the assigned STAs may be used. In this example, an AP 3905, a STA-1 3910 and a STA-2 3915 are shown. The AP 3905 may be operating on a 40 MHz channel, which may include two 20 MHz sub-channels. It should be noted that this is for illustrative purposes only and the AP may be operating on any channel size or configuration.

The AP 3905 may transmit a DL COBRA schedule frame 3920 containing the DL transmission schedule of each channel/band on corresponding channels/bands. As shown in FIG. 39, the AP may transmit the DL COBRA schedule frame 3920 on a preconfigured set of channels, here only the first channel of the set of two channels in this example. Alternatively, the AP may transmit a DL COBRA schedule frame which contains DL transmission schedule of all assigned channels for all target STAs on all assigned channels, or all channels in the system.

As in the examples above, if the STAs are configured in a group by previous control or management frames, the configured group may wake up at the beginning of the DL COBRA schedule frames transmitted by the AP and listen for the DL COBRA schedule frames on all channels or preconfigured channels/bands.

After receiving the valid DL COBRA schedule frame 3920 from the AP 3905, STA-1 3910 and STA-2 3915 may transmit ACKs 3925*a*, 3925*b* to the AP 3905 on their assigned channel(s) to acknowledge that each STA is ready to receive DL frames on the assigned channels. ACK frames 3925*a*, 3925*b* may contain NAV or duration information so that STAs near it may set their NAVs properly upon receiving the ACK. After receiving the DL COBRA schedule frame 3920 from the AP, and either before or after transmitting its ACK, STA-1 3910 and STA-2 3915 may tune their respective receivers to assigned channels/bands to receive their respective downlink data frames.

The AP 3905 may start DL COBRA transmission a SIFS time after receiving the ACK frames 3925*a*, 3925*b* by transmitting DL data frames 3930*a*, 3930*b* to STA-1 3910 and STA-2 3915, respectively. If the DL data frames 3930*a*, 3930*b* are received and decoded successfully, STA-1 3910 and STA-2 3915 may transmit ACKs 3935*a*, 3935*b* to the AP

3905 on channel/band where the corresponding DL data frames 3930a, 3930b is received.

Several methods for combined downlink/uplink COBRA channel access will now be described. In a first embodiment, a fixed or specific channel/band assignment for both uplink and downlink COBRA transmission is used. In a second embodiment, a fixed or specific channel/band assignment for downlink but frequency-selective channel/band assignment for uplink COBRA transmission may be used.

Figure 40:
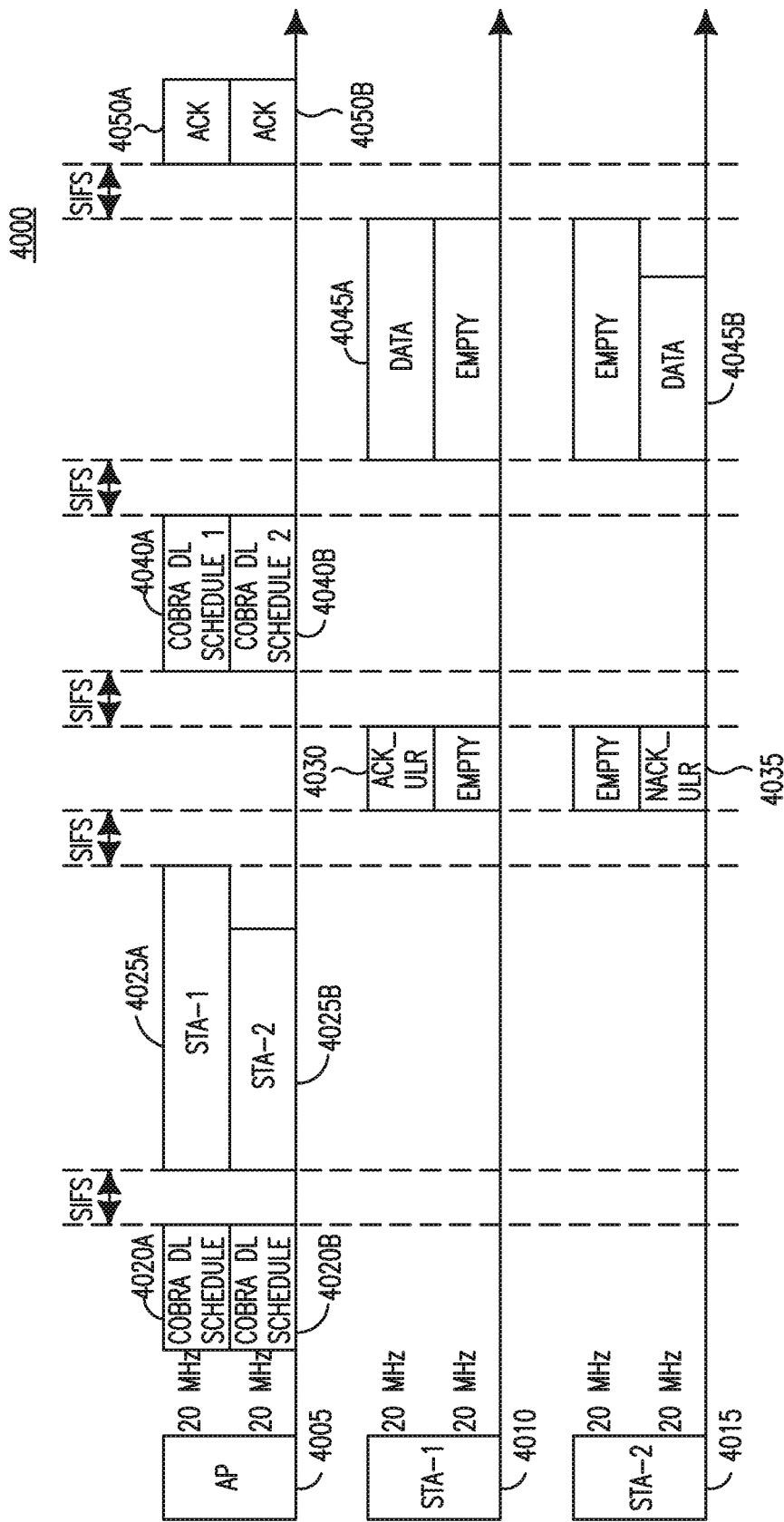
FIG. 40 is a diagram of a first example combined downlink/uplink COBRA channel access scheme using a fixed or specific channel/band assignment for both uplink and downlink COBRA transmission.

FIG. 40 is a diagram of a first example combined downlink/uplink COBRA channel access scheme using a fixed or specific channel/band assignment for both uplink and downlink COBRA transmission. In this example, an AP 4005, a STA-1 4010 and a STA-2 4015 are shown. The AP 4005 may be operating on a 40 MHz channel, which may include two 20 MHz sub-channels.

The AP 4005 may transmit DL COBRA schedule frames 4020a, 4020b, each of which contains DL transmission schedule of each channel/band on corresponding channel/band of STA-1 4010 and STA-2 4015. Alternatively, the AP may transmit a DL COBRA Schedule frame containing DL transmission schedule of all assigned channels for all target STAs on all assigned channels, or all channels in the system or a preconfigured set of channels.

As in the examples above, if the STAs are configured in a group by previous control or management frames, the configured group may wake up at the beginning of the DL COBRA schedule frames transmitted by the AP and listen for the DL COBRA schedule frames on all channels or preconfigured channels/bands.

After receiving the valid DL COBRA schedule frames 4020a, 4020b from the AP 4005, the STA-1 4010 and STA-2 4015 may tune their respective receivers to the assigned channels/bands to receive their respective downlink data frames.

The AP 4005 may start DL COBRA transmission a SIFS time after transmitting the DL COBRA schedule frames 4020a, 4020b, by transmitting DL data frames 4025a, 4025b to STA-1 4010 and STA-2 4015, respectively.

If a DL data frame is received and decoded successfully, the STA may transmit an ACK to the AP on the channel/band where the corresponding downlink data frame is received. If the receiving STA has uplink data to transmit, it may transmit an "ACK_ULR" frame on the channel/band where the corresponding downlink data frame is received. Alternatively, the receiving STA may transmit an ACK frame with the More Data field set to "1" or "has data". If a received data frame is not decoded successfully but the STA has uplink data to transmit, it may transmit an "NACK_ULR" frame on the channel/band where the corresponding downlink data frame is received.

In this example, STA-1 4010 successfully receives and decodes the DL date frame 4025a intended for it and also has uplink data to transmit, therefore STA-1 4010 transmits an ACK_ULR 4030 to AP 4005. However, the DL data frame 4025b intended for STA-2 4015 is not received or decoded successfully, but STA-2 4015 has uplink data to transmit. As a result, STA-2 4015 sends a NACK_URL frame 4035 to the AP 4005.

Upon receiving ULR frames 4030, 4035 from STA-1 4010 and STA-2 4015, the AP 4005 may determine channel assignments for UL COBRA transmissions and transmits COBRA UL Schedule frames 4040a, 4040b to STA-1 4010 and STA-2 4015 on their respectively assigned channels.

STAs that have transmitted ULR frames may listen on all channels or only channels configured previously. After receiving the COBRA UL schedule frames 4040a, 4040b, each of which contains the UL COBRA transmission information, STA-1 4010 and STA-2 4015 may each transmit its respective data frame 4045a, 4045b on the assigned channels/bands accordingly. The AP 4005 may confirm receipt by transmitting ACKs 4050a, 4050b.

Figure 41:
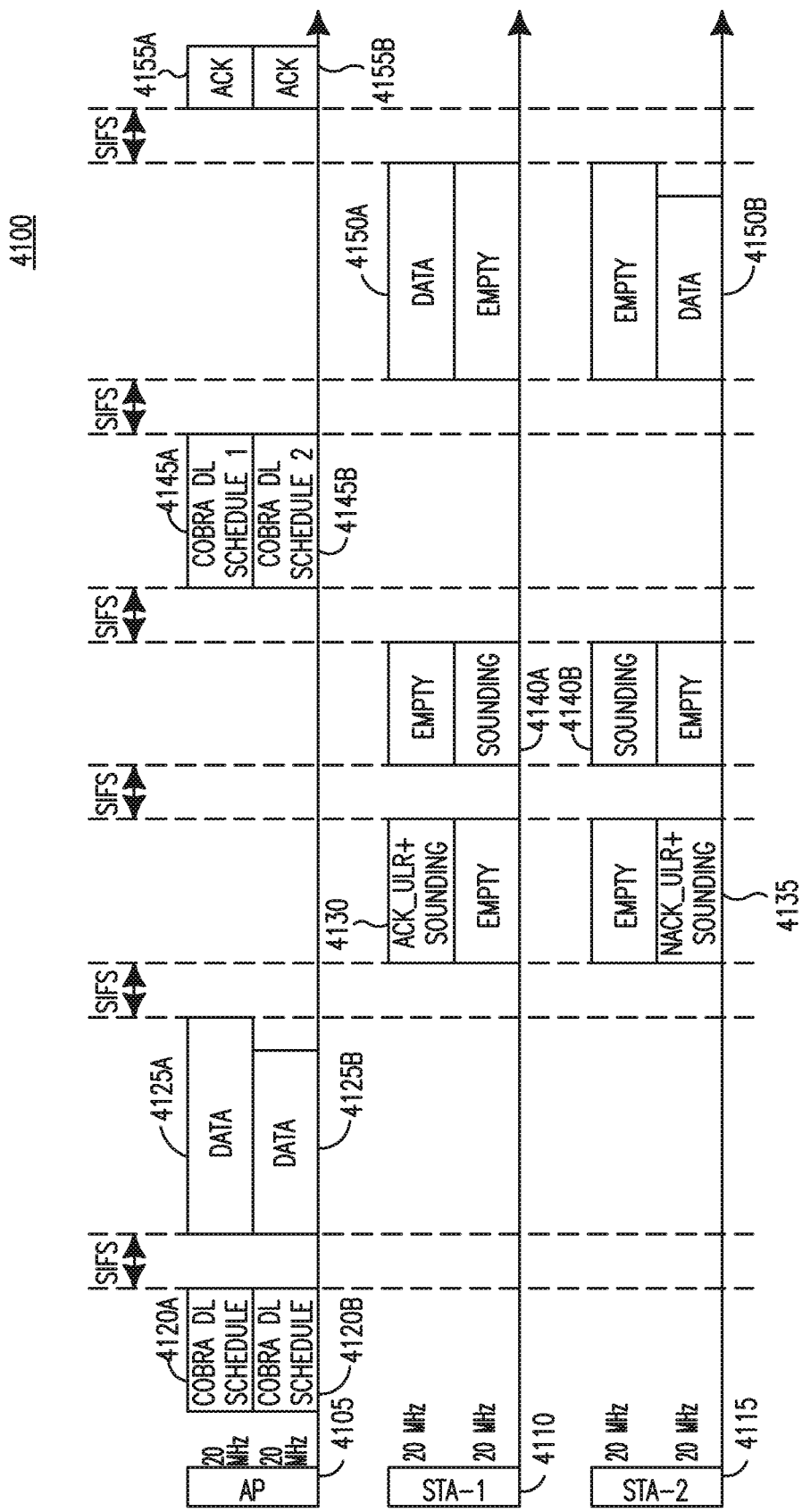
FIG. 41 is a diagram of a second example combined downlink/uplink COBRA channel access scheme using a fixed or specific channel/band assignment for downlink COBRA transmission and a frequency-selective channel/band assignment for uplink COBRA transmission.

FIG. 41 is a diagram of a second example combined downlink/uplink COBRA channel access scheme using a fixed or specific channel/band assignment for downlink COBRA transmission and a frequency-selective channel/band assignment for uplink COBRA transmission. In this example, an AP 4105, a STA-1 4110 and a STA-2 4115 are shown. The AP 4105 may be operating on a 40 MHz channel, which may include two 20 MHz sub-channels.

AP 4105 may transmit DL COBRA schedule frames 4120a, 4120b, each of which contains DL transmission schedule of each channel/band on corresponding channel/band of STA-1 4110 and STA-2 4115. Alternatively, the AP may transmit a DL COBRA Schedule frame containing the DL transmission schedule of all assigned channels for all target STAs on all assigned channels, or all channels in the system or a preconfigured set of channels.

As in the examples above, if the STAs are configured in a group by previous control or management frames, the configured group may wake up at the beginning of the DL COBRA schedule frames transmitted by the AP and listen for the DL COBRA schedule frames on all channels or preconfigured channels/bands.

After receiving the valid DL COBRA schedule frames 4120a, 4120b from the AP 4105, the STA-1 4110 and STA-2 4115 may tune their respective receivers to the assigned channels/bands to receive their respective downlink data frames.

The AP 4105 may start DL COBRA transmission a SIFS time after transmitting the DL COBRA schedule frames 4120a, 4120b, by transmitting DL data frames 4125a, 4125b to STA-1 4110 and STA-2 4115, respectively.

If a DL data frame is received and decoded successfully, the STA may transmit an ACK to the AP on the channel/band where the corresponding downlink data frame is received. If the STA has uplink data to transmit, it may transmit an "ACK_ULR" frame with sounding signals on the channel/band where the corresponding downlink data frame is received. Alternatively, it may transmit an ACK frame with the More Data field set to "1" or "has data" and with sounding signals.

If a DL data frame is not received and decoded successfully but the STA has uplink data to transmit, it may transmit an "NACK_ULR" frame with sounding signals on the channel/band where the corresponding downlink data frame is received. The STA may transmit sounding signals (such as NDP frames) on channels other than the channel/band where the corresponding downlink data frame is received. If there are multiple STAs that need to transmit ULR with sounding signals or sounding signals alone, their frames may be transmitted in an orthogonal manner (in time, frequency or code domain).

In this example, STA-1 4110 successfully receives and decodes the DL data frame 4125a intended for it and also has uplink data to transmit. STA-1 4110 transmits an ACK_ULR with sounding signals 4130 to AP 4105. However, the DL data frame 4125b intended for STA-2 4115 is not received or decoded successfully, but STA-2 4115 has uplink data to transmit. As a result, STA-2 4115 sends a NACK_URL frame with sounding signals 4135 to the AP 4105. STA-1 4110 also transmits sounding frames 4140a on the other 20 MHz channel assigned to STA-2 4115. Likewise, STA-2

4115 also transmits sounding frames 4140b on the other 20 MHz channel assigned to STA-1 4110.

Upon receiving ULR frames with sounding signals 4130, 4135 from STA-1 4110 and STA-2 4115, the AP 4105 may determine the channel assignment for UL COBRA transmissions. The AP 4105 may consider the channel quality (such as CQI) in making that determination. The AP 4105 may transmit COBRA UL Schedule frames 4145a, 4145b on each assigned channel.

STAs that have transmitted ULR frames may listen on all channels or only channels configured previously. After receiving the COBRA UL schedule frames 4145a, 4145b, each of which contains the UL COBRA transmission information, STA-1 4110 and STA-2 4115 may transmit their respective data frames 4150a, 4150b on the assigned channels/bands accordingly. The AP 4105 may confirm receipt by transmitting ACKs 4155a, 4155b.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 802.11 specific protocols, it is understood that the solutions described herein are not restricted to this scenario and are applicable to other wireless systems as well.

Although SIFS are used to indicate various inter frame spacing in the examples of the designs and procedures, all other inter frame spacing such as RIFS or other agreed time interval could be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A station (STA) comprising:
a receiver configured to receive a multi-user (MU) request to send (RTS) frame transmitted to a plurality of stations (STAs), the MU RTS frame comprising a duration field;
a transmitter configured to transmit, to an AP, a clear to send (CTS) frame in response to receiving the MU RTS frame;
the receiver configured to receive another frame transmitted to the plurality of STAs, the another frame comprising uplink (UL) transmission information, wherein the UL transmission information includes modulation and coding scheme (MCS) indicators and the UL transmission information indicates an allocation of frequency resources for the plurality of STAs;
the transmitter configured to transmit a data frame, modulated in accordance with one of the MCS indicators, using frequency resources of the frequency resources allocated for the plurality of STAs; and
the receiver configured to receive an acknowledgement frame that acknowledges receipt of the data frame.

2. The STA of claim 1, wherein the CTS frame is transmitted simultaneously with another CTS frame transmitted by another STA.

3. The STA of claim 1, wherein the acknowledgement frame is a block acknowledgement type frame.

4. The STA of claim 1, wherein the acknowledgement frame is sent to the plurality of STAs.

5. The STA of claim 1, wherein the CTS frame, the another frame comprising UL transmission information, the data frame and the acknowledgement frame are all protected via the duration field.

6. A method performed by an access point (AP), the method comprising:
transmitting a multi-user (MU) request to send (RTS) frame to a plurality of stations (STAs), the MU RTS frame comprising a duration field;
receiving, from the plurality of STAs, simultaneous clear to send (CTS) frames in response to transmitting the MU RTS frame;
transmitting, to the plurality of STAs, another frame comprising UL transmission information for transmission of data frames by the plurality of STAs, wherein the UL transmission information includes modulation and coding scheme (MCS) indicators and the UL transmission information indicates an allocation of frequency resources;
receiving, from the plurality of STAs, the data frames, wherein a first data frame of the data frames is modulated in accordance with a first MCS indicator of the MCS indicators and is received using first resources of the allocated frequency resources; wherein a second data frame of the data frames is modulated in accordance with a second MCS indicator of the MCS indicators and is received using second resources of the allocated frequency resources; and
transmitting an acknowledgement frame that acknowledges receipt of the data frames, to the plurality of STAs.

7. The method according to claim 6, wherein the CTS frames, the another frame comprising UL transmission information, the data frames and the acknowledgement frame are all protected via the duration field of the MU RTS frame.

8. The method according to claim 6, wherein the CTS frames, the another frame comprising UL transmission information, the data frames and the acknowledgement frame are all completed at or before a duration indicated by the duration field.

9. The method of claim 6, wherein the first MCS indicator and the second MCS indicator are different MCS indicators.

10. The method of claim 6, wherein the first resources and the second resources are different resources.

11. The method of claim 6, wherein the first resources and the second resources are overlapping resources.

12. The method of claim 6, wherein the another frame comprising UL transmission information comprises a plurality of data stream number indicators.

13. The method of claim 12, wherein the plurality of data stream number indicators include a first data stream number indicator and a second data stream number indicator, wherein the first data stream number indicator and the second data stream number indicator are different data stream number indicators.

14. An access point (AP) comprising:
a transmitter configured to transmit a multi-user (MU) request to send (RTS) frame to a plurality of stations (STAs), the MU RTS frame comprising a duration field;
a receiver configured to receive, from the plurality of STAs, simultaneous clear to send (CTS) frames in response to transmitting the MU RTS frame;
the transmitter configured to transmit, to the plurality of STAs, another frame comprising UL transmission information for transmission of data frames by the plurality of STAs, wherein the UL transmission information includes modulation and coding scheme (MCS) indicators and the UL transmission information indicates an allocation of frequency resources;
the receiver configured to receive, from the plurality of STAs, the data frames, wherein a first data frame of the data frames is modulated in accordance with a first MCS indicator of the MCS indicators and is received using first resources of the allocated frequency resources; wherein a second data frame of the data frames is modulated in accordance with a second MCS indicator of the MCS indicators and is received using second resources of the allocated frequency resources; and
the transmitter configured to transmit an acknowledgement frame that acknowledges receipt of the data frames, to the plurality of STAs.

15. The AP of claim 14, wherein the CTS frames, the another frame comprising UL transmission information, the data frames and the acknowledgement frame are all protected via the duration field of the MU RTS frame.

16. The AP of claim 14, wherein the CTS frames, the another frame comprising UL transmission information, the data frames and the acknowledgement frame are all completed at or before a duration indicated by the duration field.

17. The AP of claim 14, wherein the first MCS indicator and the second MCS indicator are different MCS indicators.

18. The AP of claim 14, wherein the first resources and the second resources are different resources.

19. The AP of claim 14, wherein the first resources and the second resources are overlapping resources.

20. The AP of claim 14, wherein the another frame comprising UL transmission information comprises a plurality of data stream number indicators.

\* \* \* \* \*